(12) United States Patent
Um et al.

(10) Patent No.: US 10,856,328 B2
(45) Date of Patent: Dec. 1, 2020

(54) METHOD FOR COMMUNICATING IN NETWORK SUPPORTING LICENSED AND UNLICENSED BANDS

(71) Applicant: Electronics And Telecommunications Research Institute, Daejeon (KR)

(72) Inventors: Jung Sun Um, Daejeon (KR); Hoi Yoon Jung, Daejeon (KR); Seung Keun Park, Daejeon (KR); Sung Jin Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 39 days.

(21) Appl. No.: 15/771,490

(22) PCT Filed: Feb. 1, 2017

(86) PCT No.: PCT/KR2017/001078
§ 371 (c)(1),
(2) Date: Apr. 27, 2018

(87) PCT Pub. No.: WO2017/135674
PCT Pub. Date: Aug. 10, 2017

(65) Prior Publication Data
US 2018/0317256 A1    Nov. 1, 2018

(30) Foreign Application Priority Data

Feb. 4, 2016 (KR) .................. 10-2016-0014475
Mar. 31, 2016 (KR) .................. 10-2016-0039363
(Continued)

(51) Int. Cl.
*H04W 74/08* (2009.01)
*H04L 5/00* (2006.01)
(Continued)

(52) U.S. Cl.
CPC .......... *H04W 74/0808* (2013.01); *H04L 5/00* (2013.01); *H04L 27/0006* (2013.01);
(Continued)

(58) Field of Classification Search
CPC . H04W 74/0808; H04W 16/14; H04W 48/10; H04W 72/10; H04W 72/1294; H04W 72/0446; H04L 27/262
See application file for complete search history.

(56) References Cited

U.S. PATENT DOCUMENTS 8,817,719 B2    8/2014  Behravan et al.
9,240,852 B2    1/2016  Yang et al.
(Continued)

FOREIGN PATENT DOCUMENTS

KR    10-2014-0010450 A    1/2014
KR    10-2014-0017517 A    2/2014
WO    WO 2015/174748 A1    11/2015

OTHER PUBLICATIONS

International Search Report dated Feb. 1, 2017 in Corresponding International Patent Application No. PCT/KR2017/001078 (3 pages in Korea).
(Continued)

*Primary Examiner* — Eric Myers
(74) *Attorney, Agent, or Firm* — NSIP Law

(57) ABSTRACT

Disclosed is a method for communicating in a network supporting licensed and unlicensed bands. A terminal operation method comprises the steps of: detecting a control channel of a subframe #n transmitted from a base station; obtaining, from the control channel, a DCI for an uplink grant; executing channel sensing on the basis of channel connection-related information included in the DCI; and transmitting, to the base station, a subframe #(n+1) if the result of executing channel sensing is an idle state. Thus, the
(Continued)

performance of the communication network may be improved.

20 Claims, 24 Drawing Sheets

(30)  Foreign Application Priority Data

May 10, 2016 (KR) .................. 10-2016-0057229
Aug. 12, 2016 (KR) .................. 10-2016-0102966

(51) Int. Cl.
| | | |
|---|---|---|
| H04L 27/00 | (2006.01) | |
| H04L 27/26 | (2006.01) | |
| H04W 16/14 | (2009.01) | |
| H04W 48/10 | (2009.01) | |
| H04W 72/10 | (2009.01) | |
| H04W 72/12 | (2009.01) | |
| H04W 84/12 | (2009.01) | |
| H04W 72/04 | (2009.01) | |

(52) U.S. Cl.
CPC ........ *H04L 27/2602* (2013.01); *H04L 27/262* (2013.01); *H04W 16/14* (2013.01); *H04W 48/10* (2013.01); *H04W 72/10* (2013.01); *H04W 72/1294* (2013.01); *H04L 5/001* (2013.01); *H04L 5/005* (2013.01); *H04L 5/0051* (2013.01); *H04W 72/0446* (2013.01); *H04W 72/1289* (2013.01); *H04W 84/12* (2013.01)

(56) References Cited

U.S. PATENT DOCUMENTS

| | | |
|---|---|---|
| 2014/0036818 A1 | 2/2014 | Koskela et al. |
| 2014/0036853 A1 | 2/2014 | Kim et al. |
| 2015/0023315 A1 | 1/2015 | Yerramalli et al. |
| 2015/0078279 A1 | 3/2015 | Ko et al. |
| 2015/0085794 A1 | 3/2015 | Chen et al. |
| 2015/0131536 A1 | 5/2015 | Kaur et al. |
| 2015/0201431 A1 | 7/2015 | Um et al. |
| 2015/0349931 A1 | 12/2015 | Damnjanovic et al. |
| 2016/0050667 A1* | 2/2016 | Papasakellariou .... H04L 5/0053 370/329 |
| 2017/0373914 A1* | 12/2017 | Harada ..................... H04J 1/00 |
| 2018/0288790 A1* | 10/2018 | Kim .................. H04W 72/1278 |

OTHER PUBLICATIONS

Alcatel-Lucent Shanghai Bell, et al, "LBT and Frame Structure Design for LAA with DL and UL," 3GPP TSG RAN WG1 Meeting #81, R1-152990, Fukuoka, Japan, May 25-29, 2015, 4 pages in English.

* cited by examiner

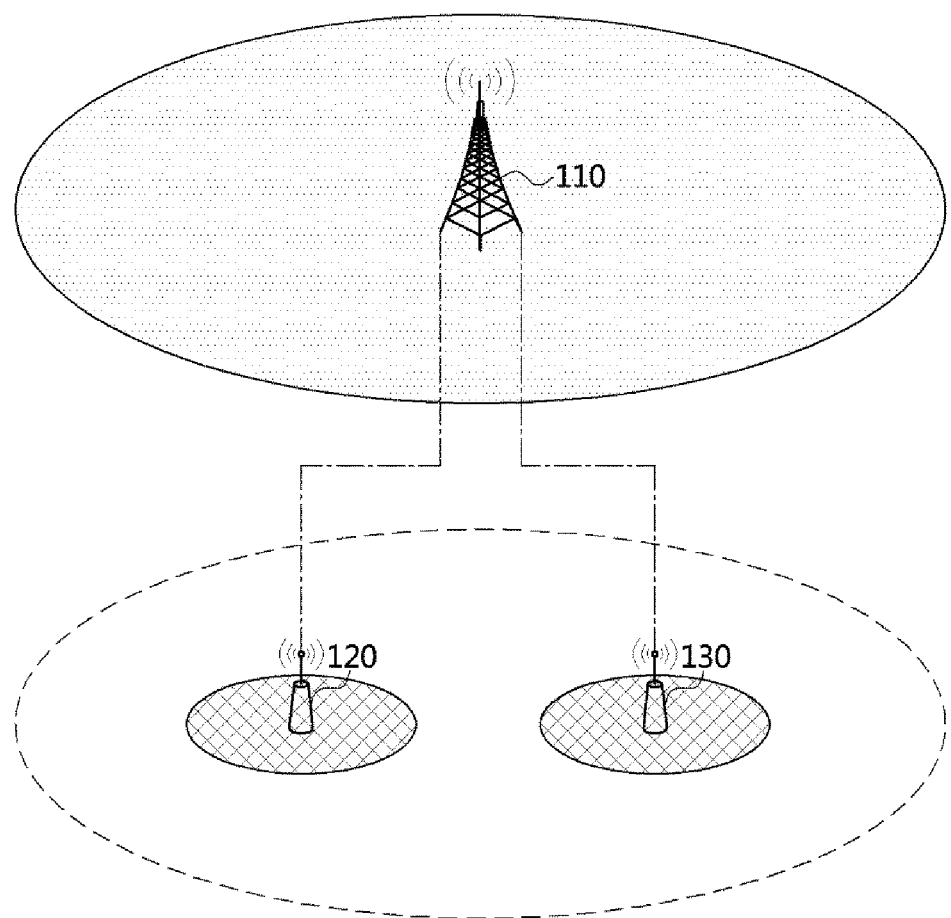
【Figure 1】

【Figure 2】
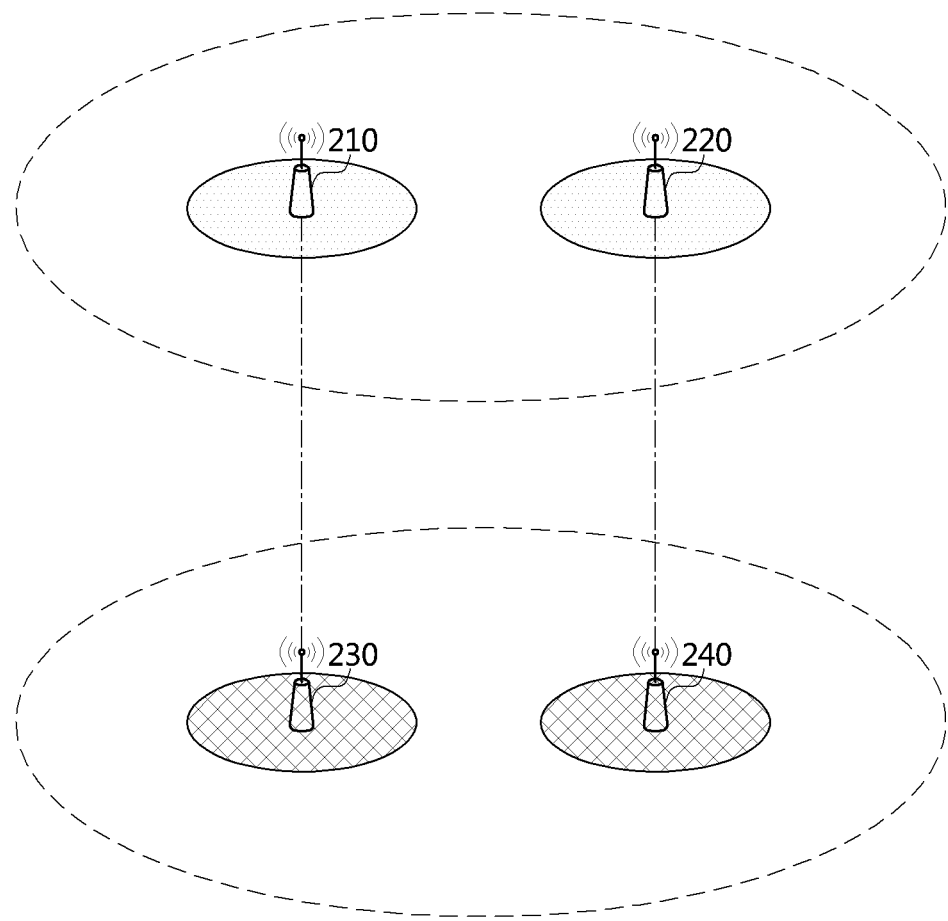

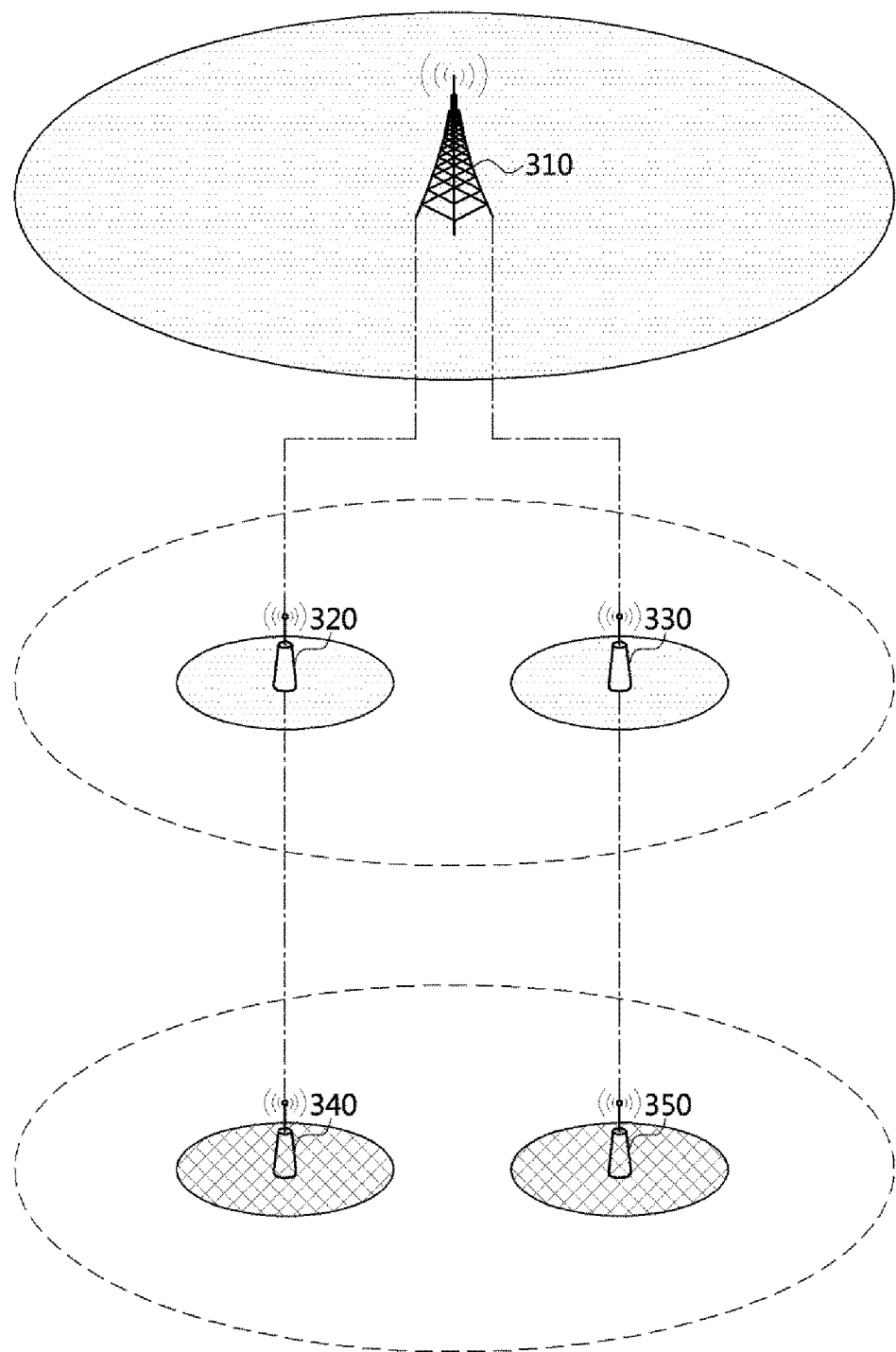
[Figure 3]

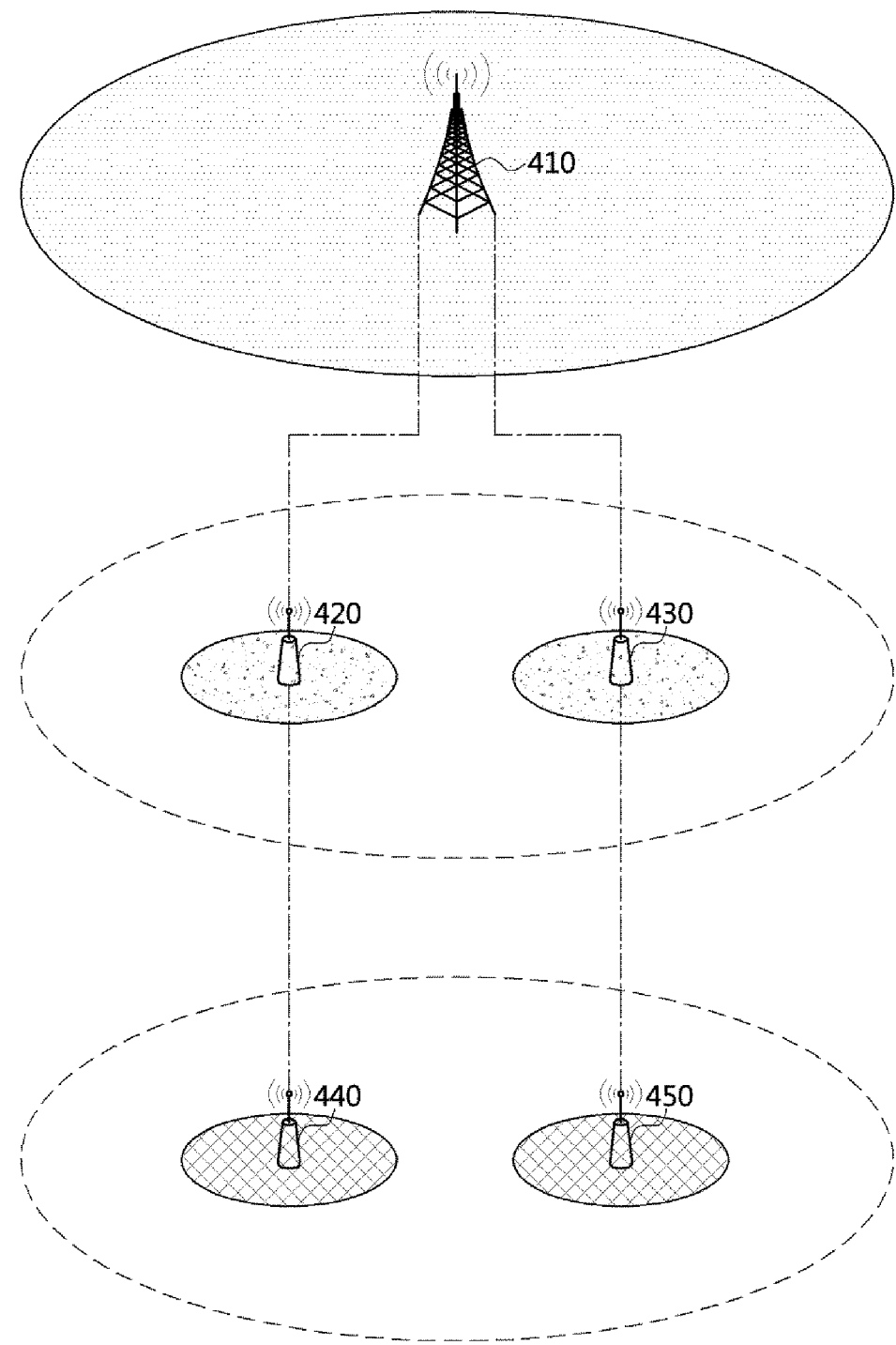
【Figure 4】

[Figure 5]
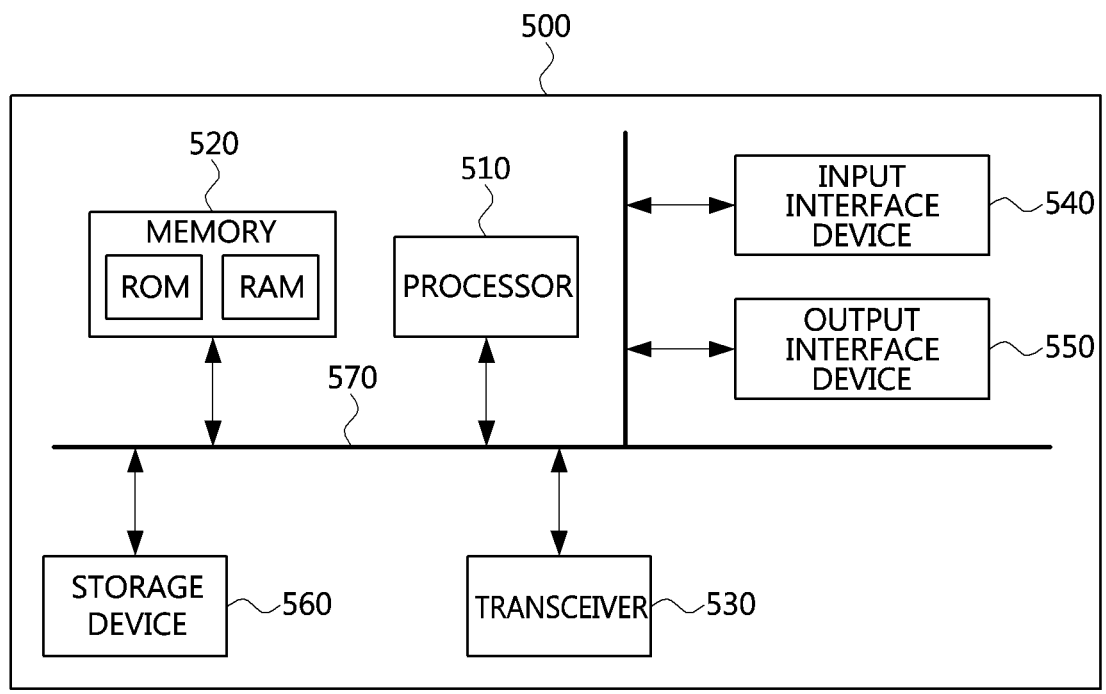
[Figure 6]
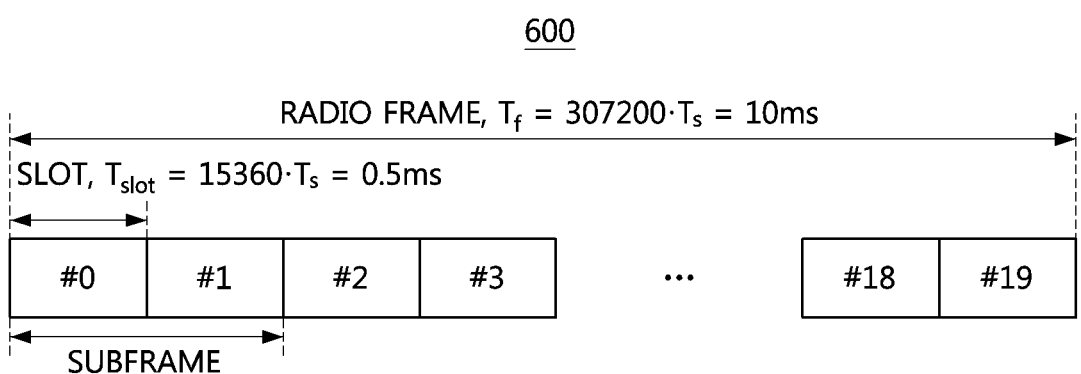

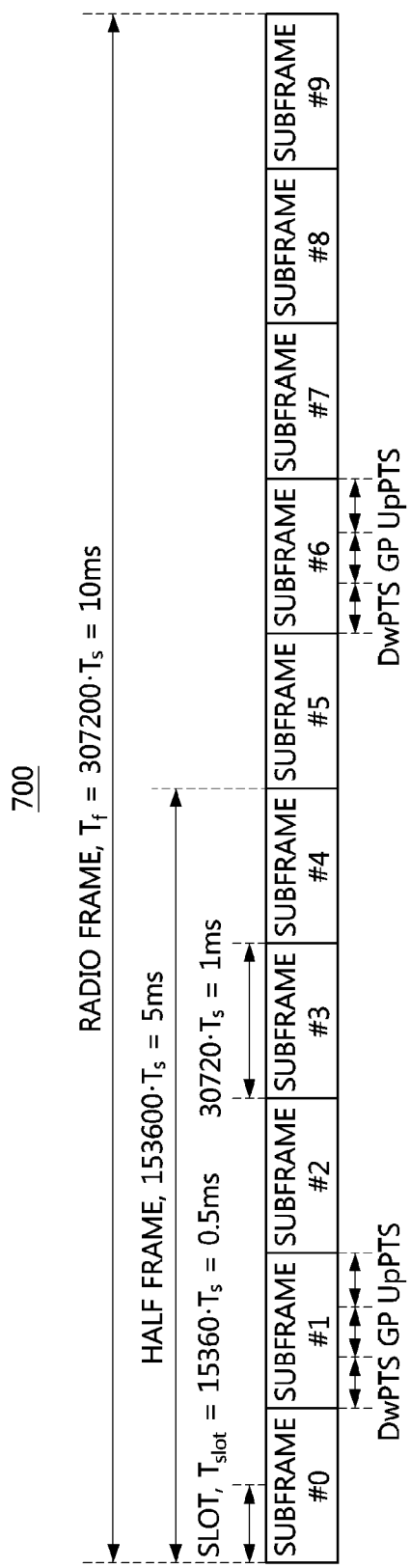
[Figure 7]

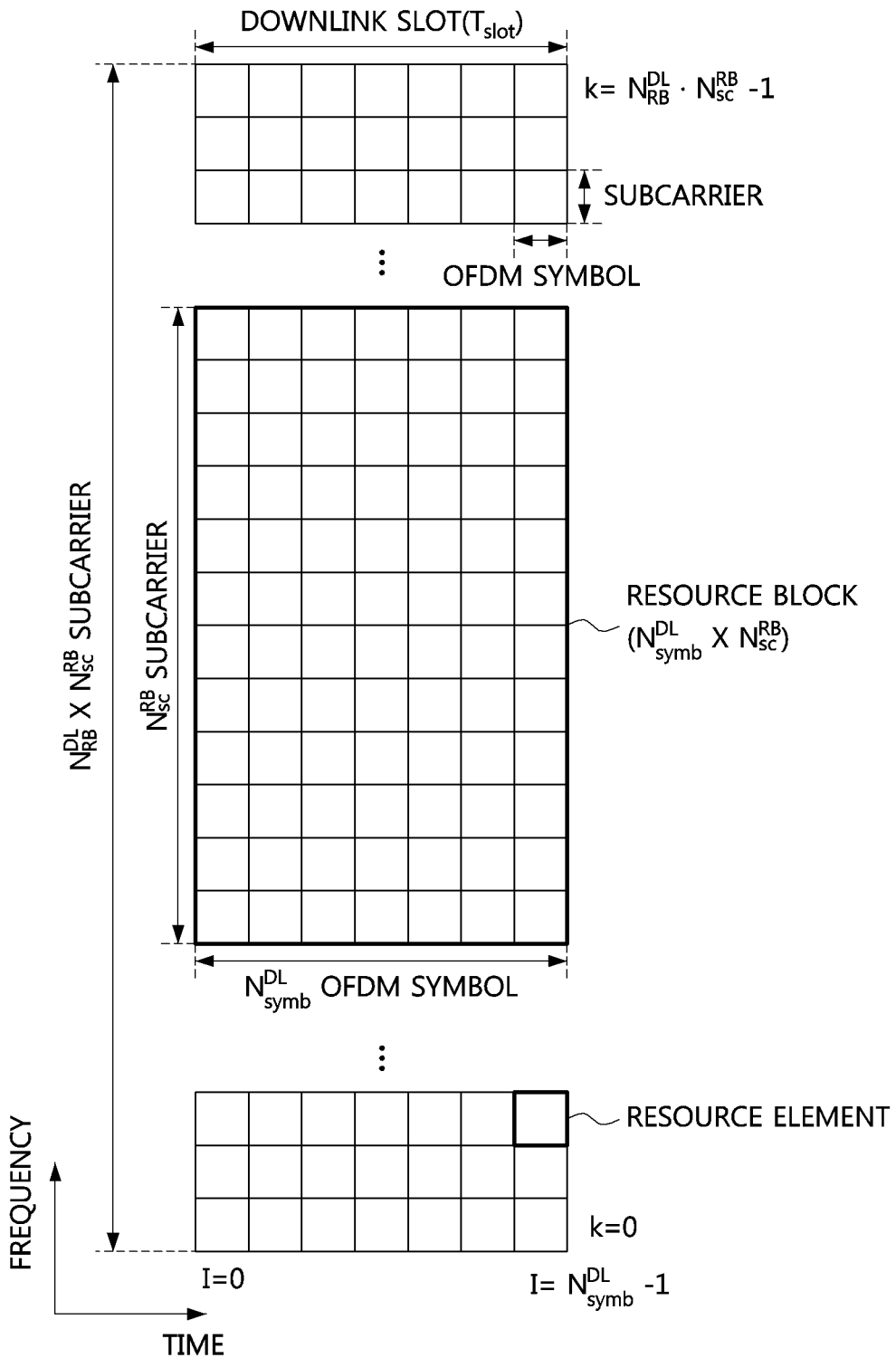

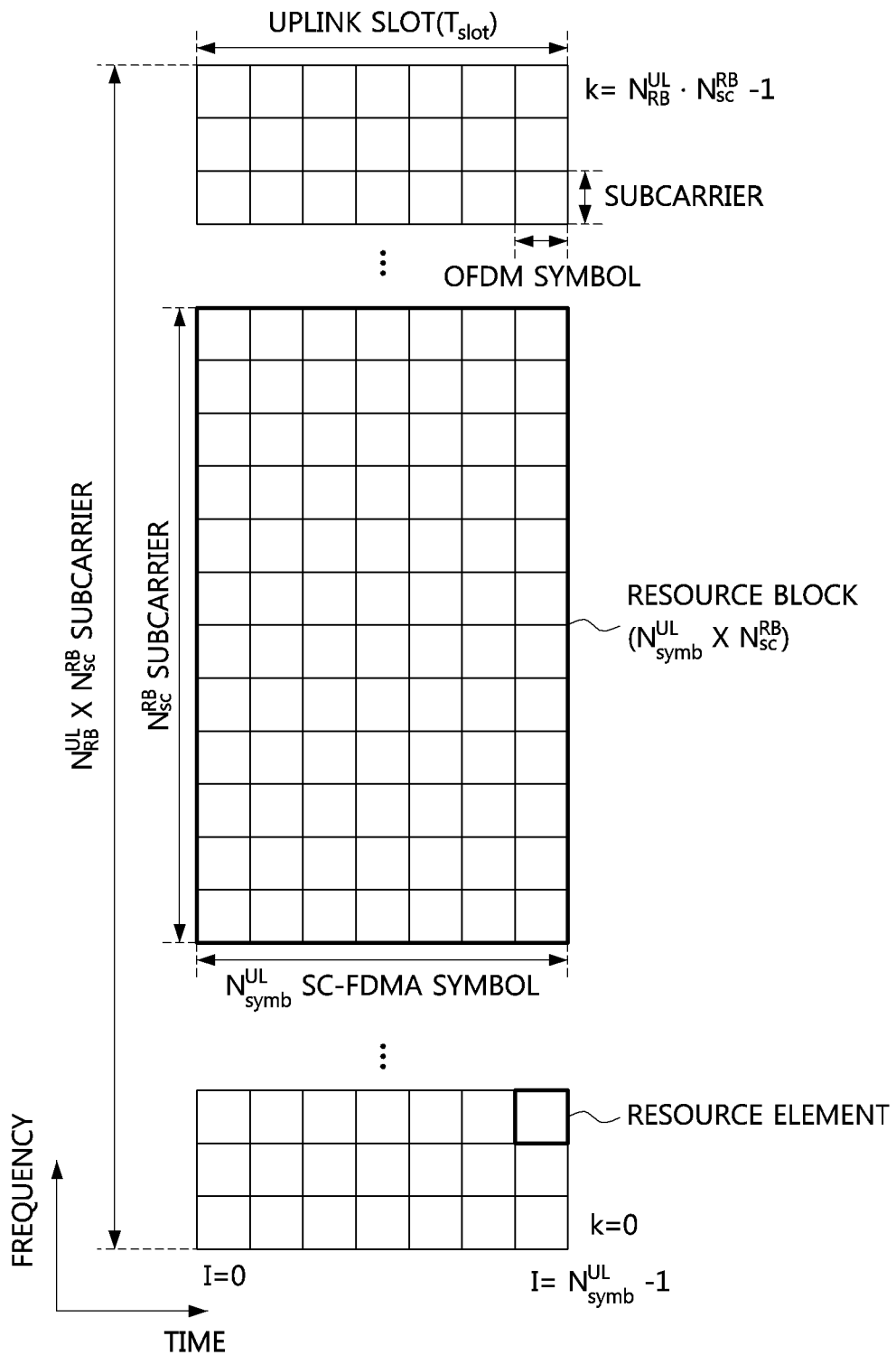

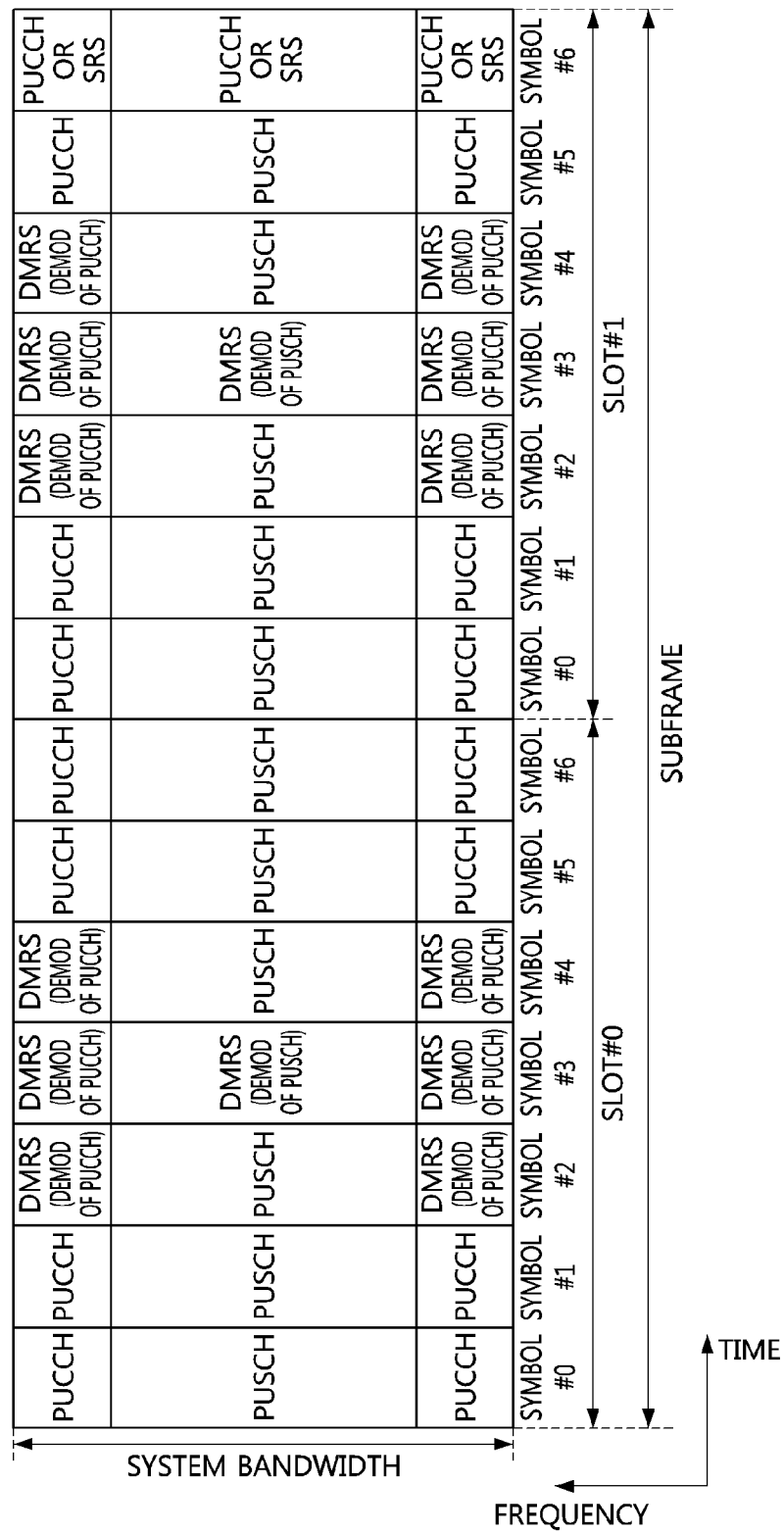
[Figure 10]

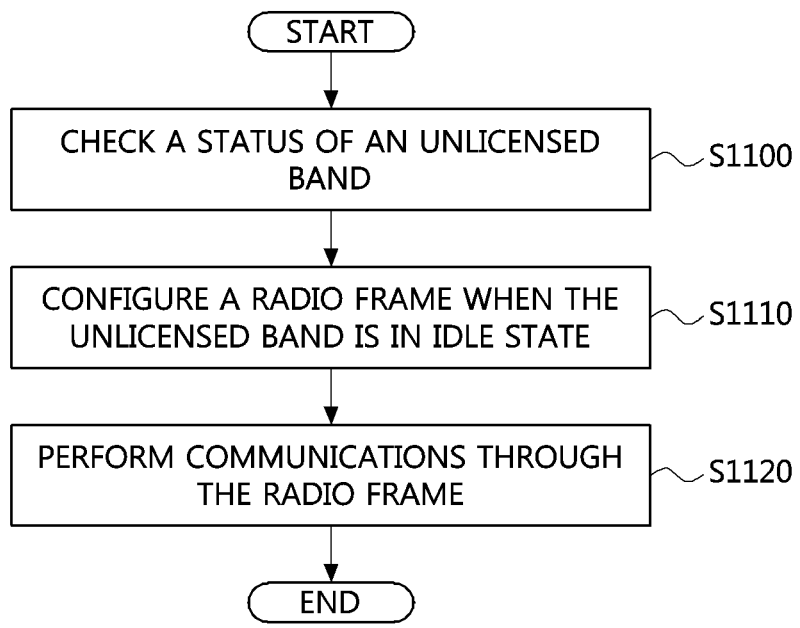
【Figure 11】

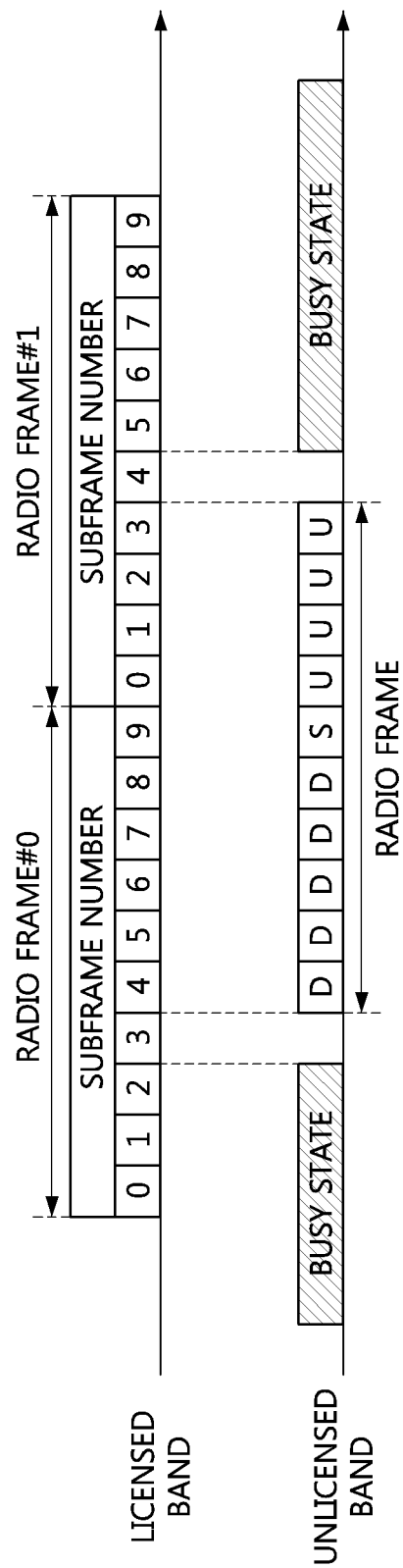
[Figure 12]

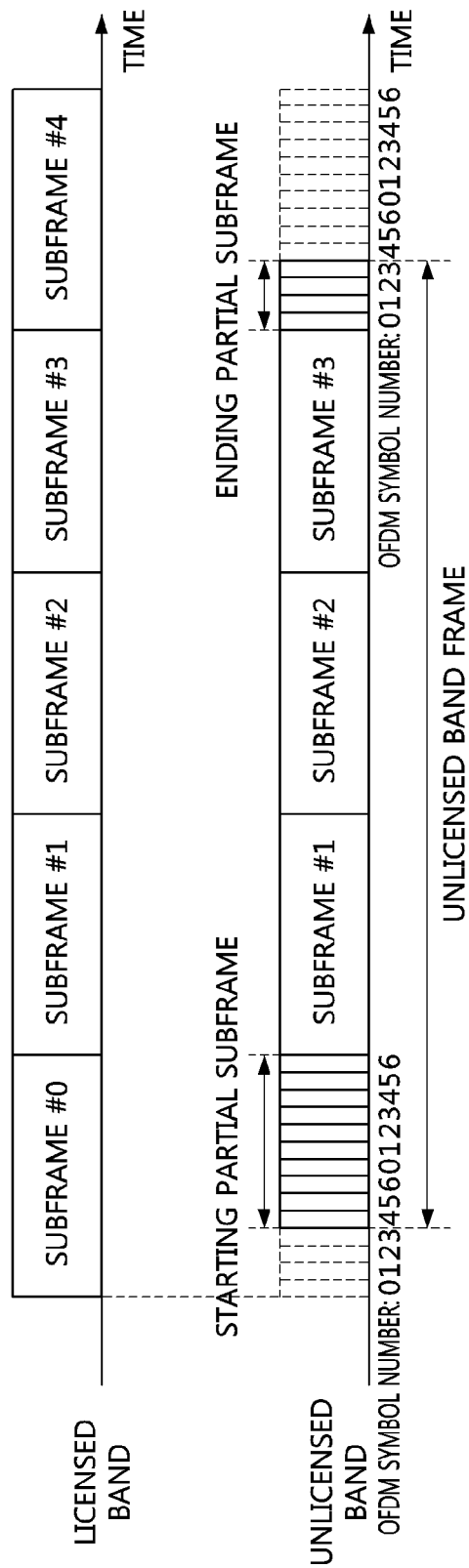
[Figure 13]

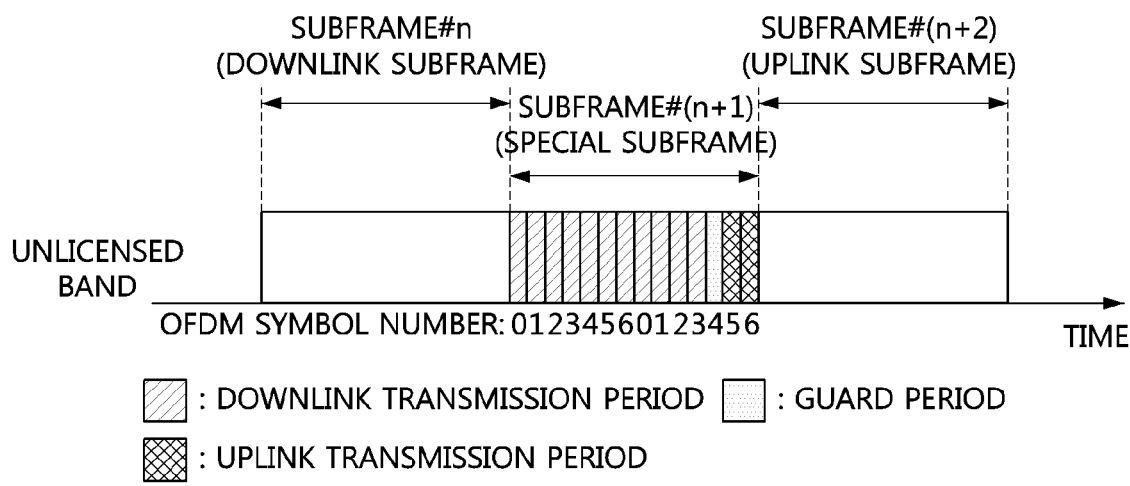

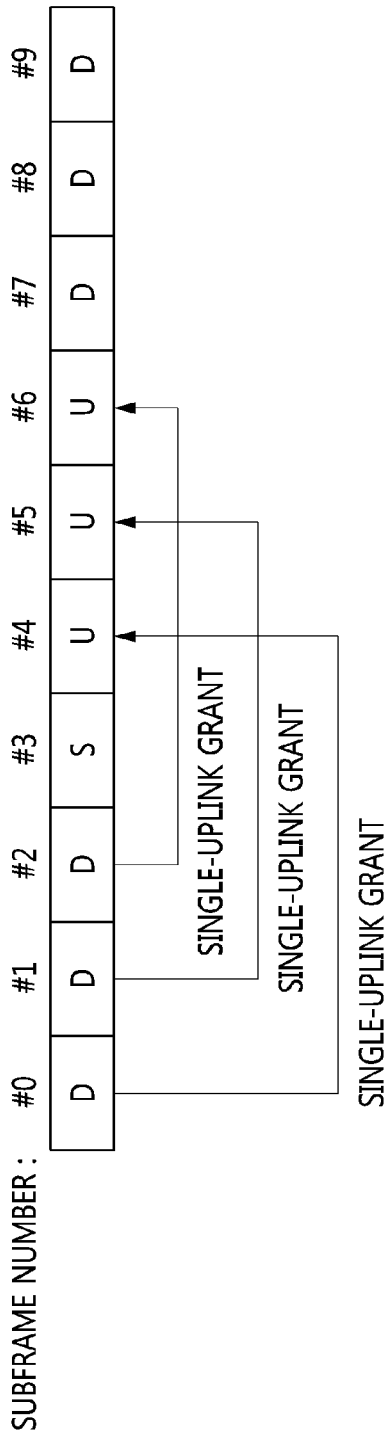
[Figure 15]

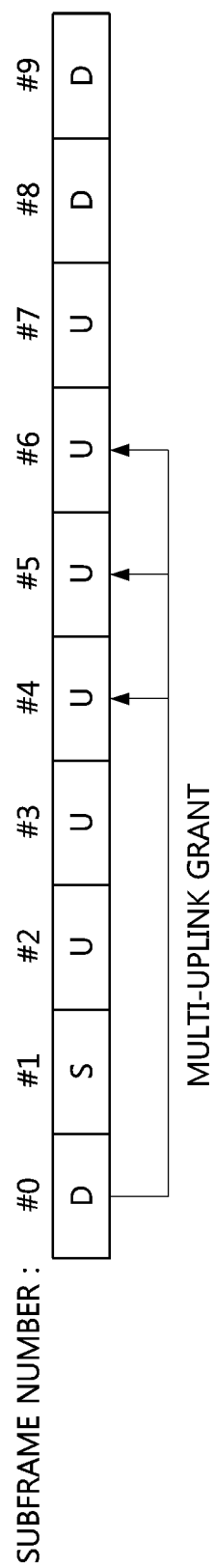
[Figure 16]

[Figure 17]
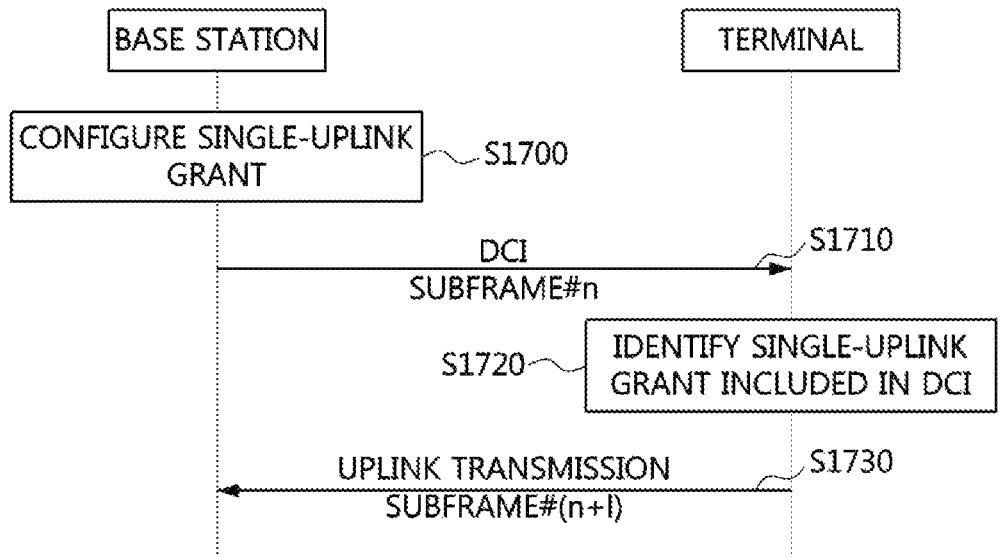
[Figure 18]
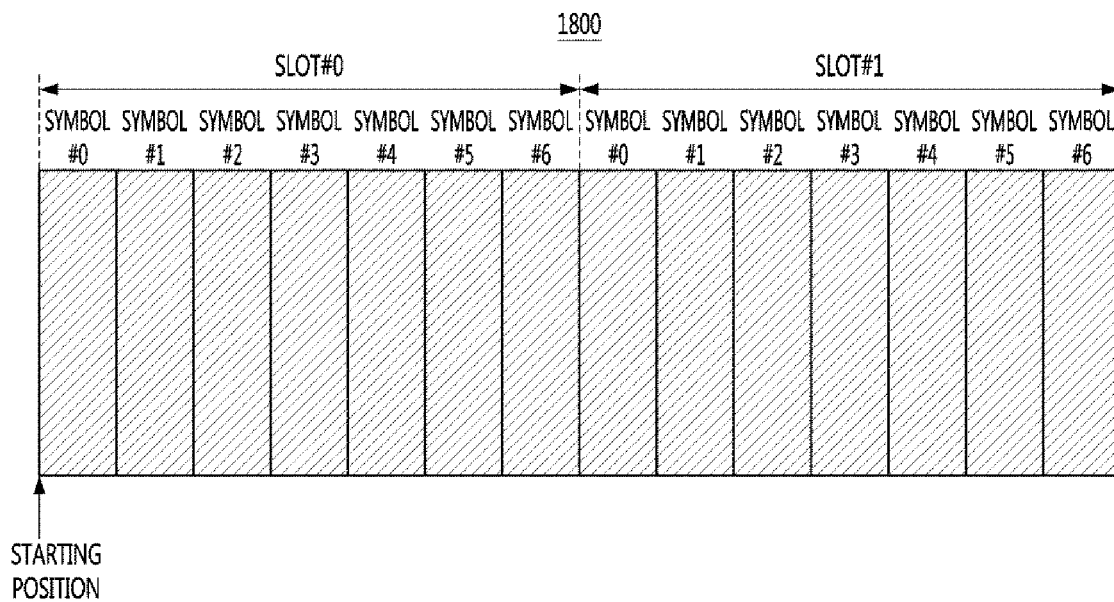

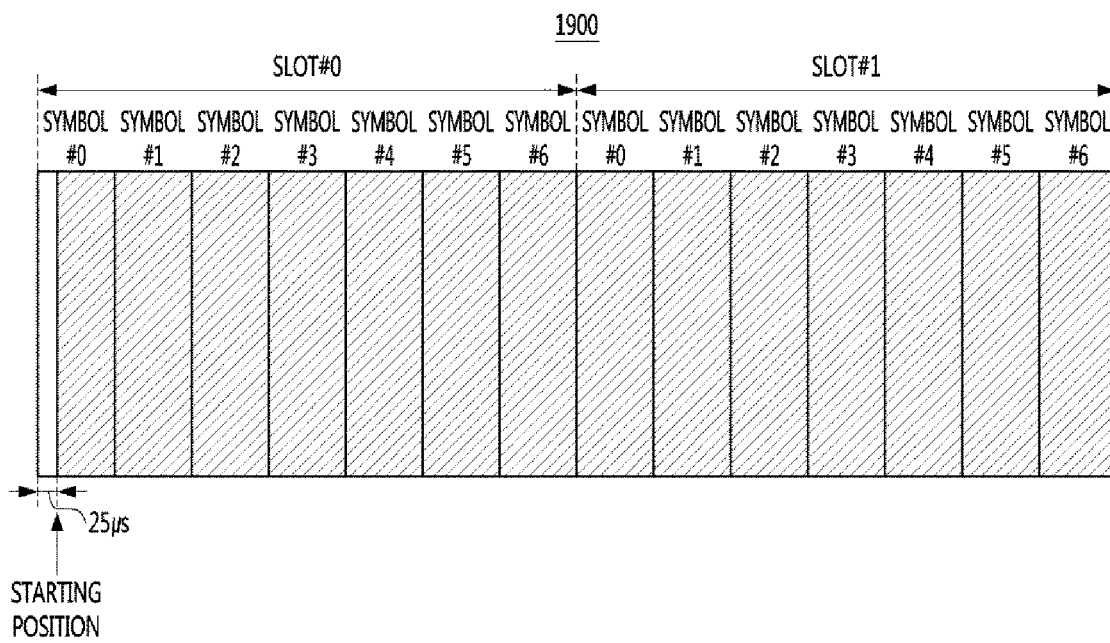
【Figure 19】
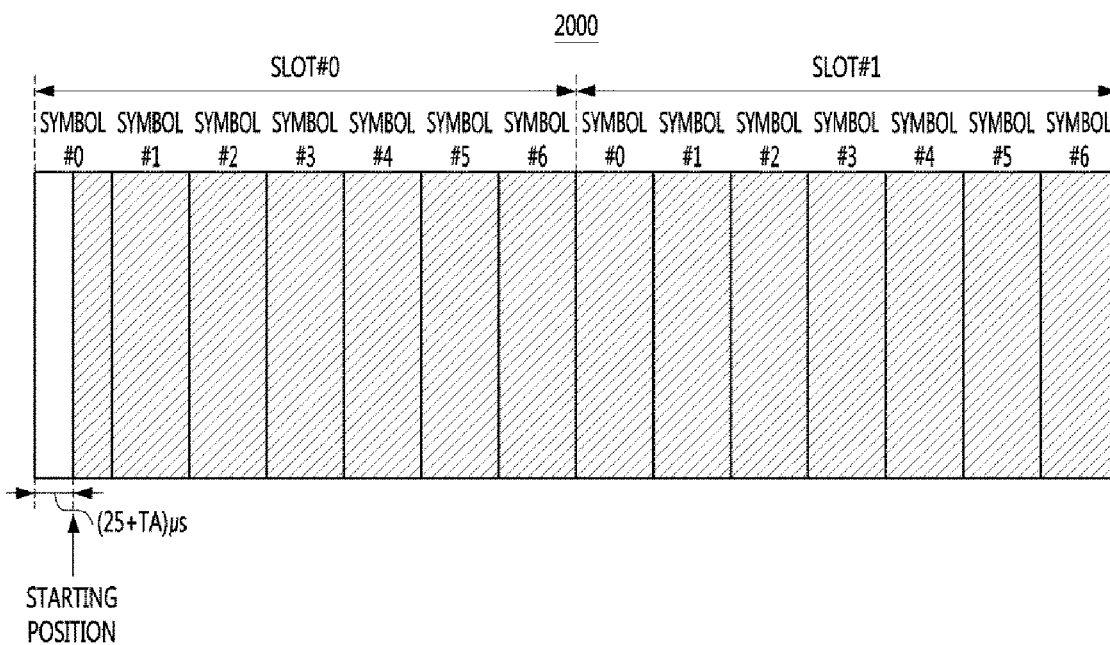
【Figure 20】

【Figure 21】
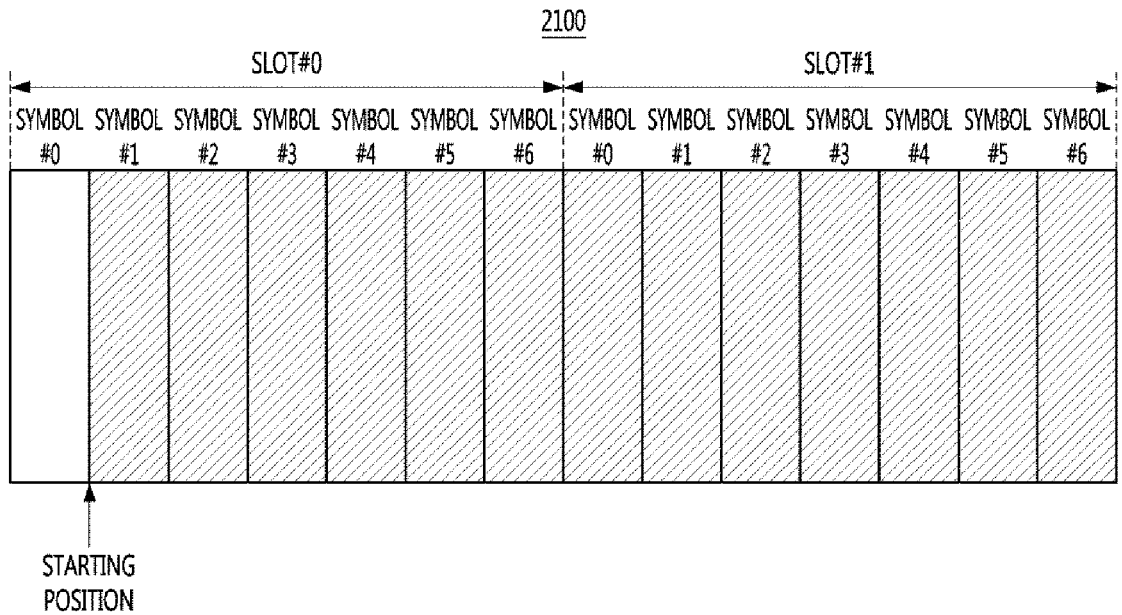
【Figure 22】
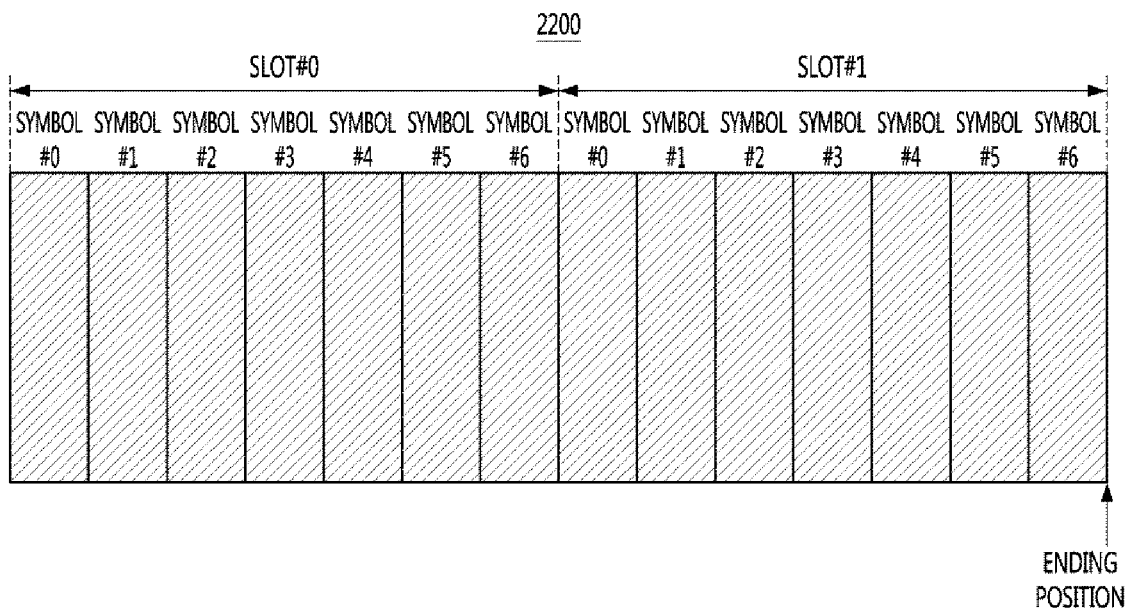

[Figure 23]
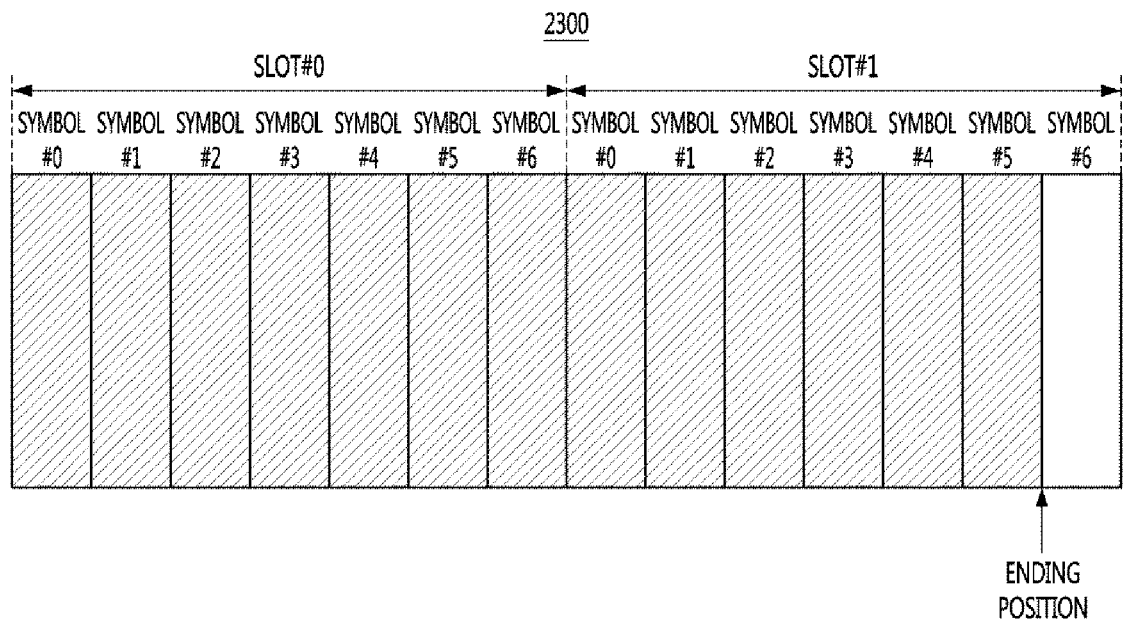
[Figure 24]
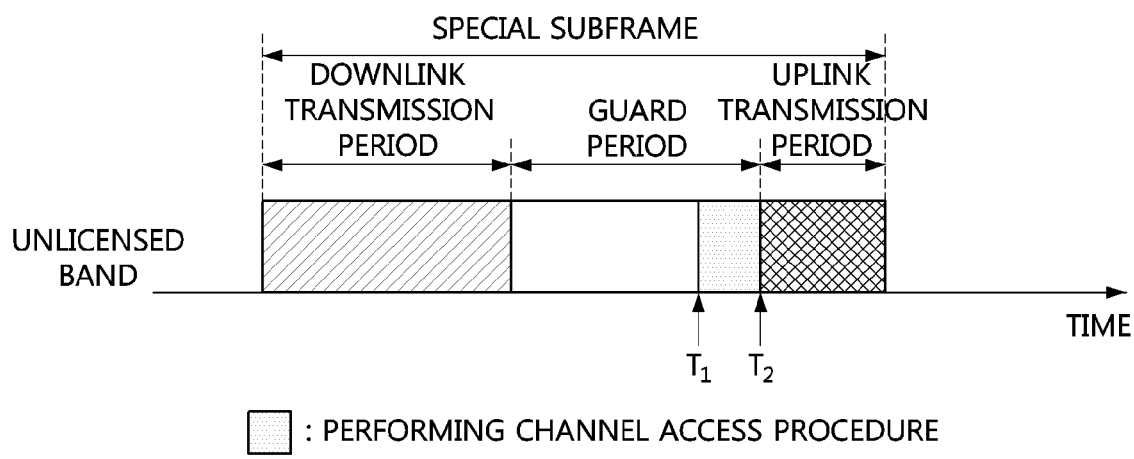

[Figure 25]
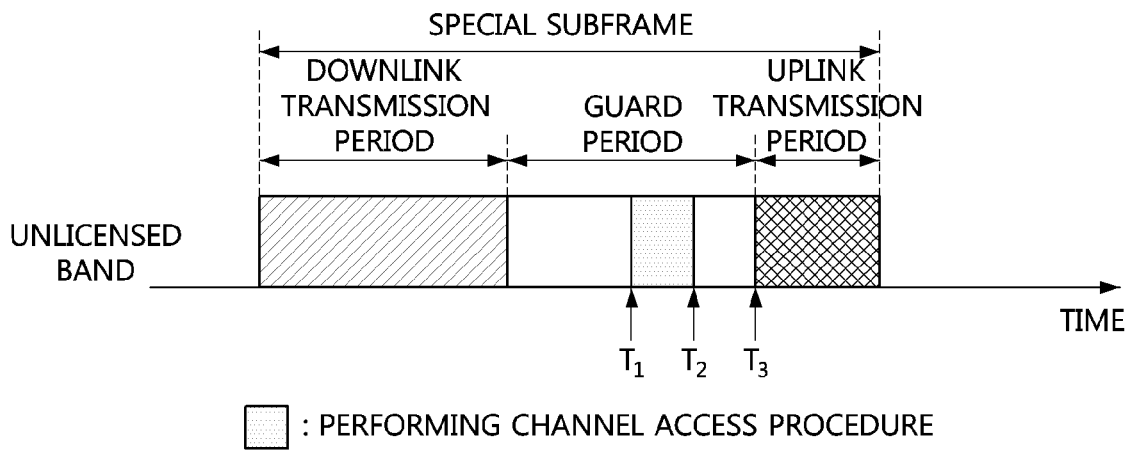
[Figure 26]
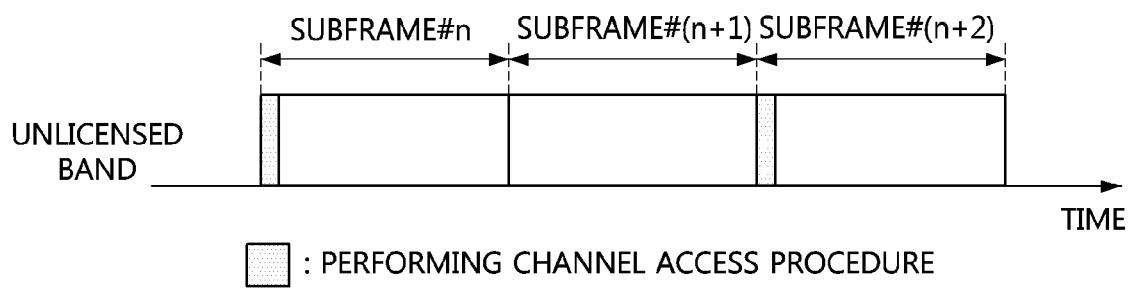
[Figure 27]
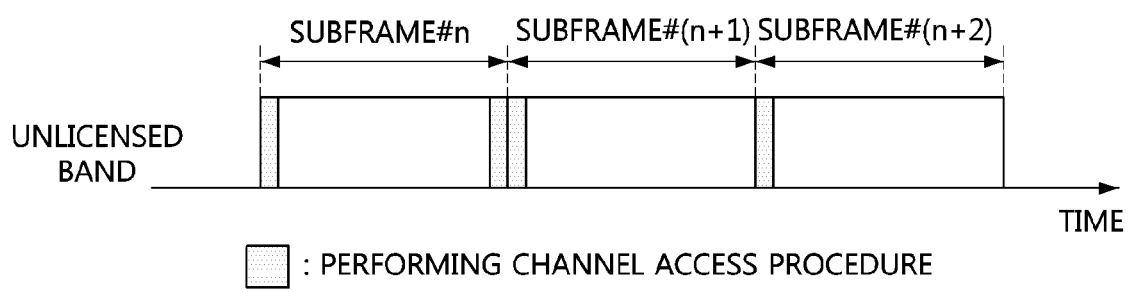

【Figure 28】
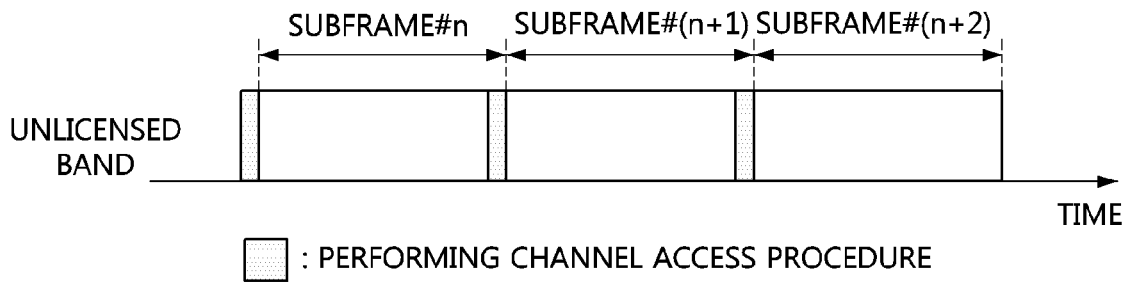
【Figure 29】
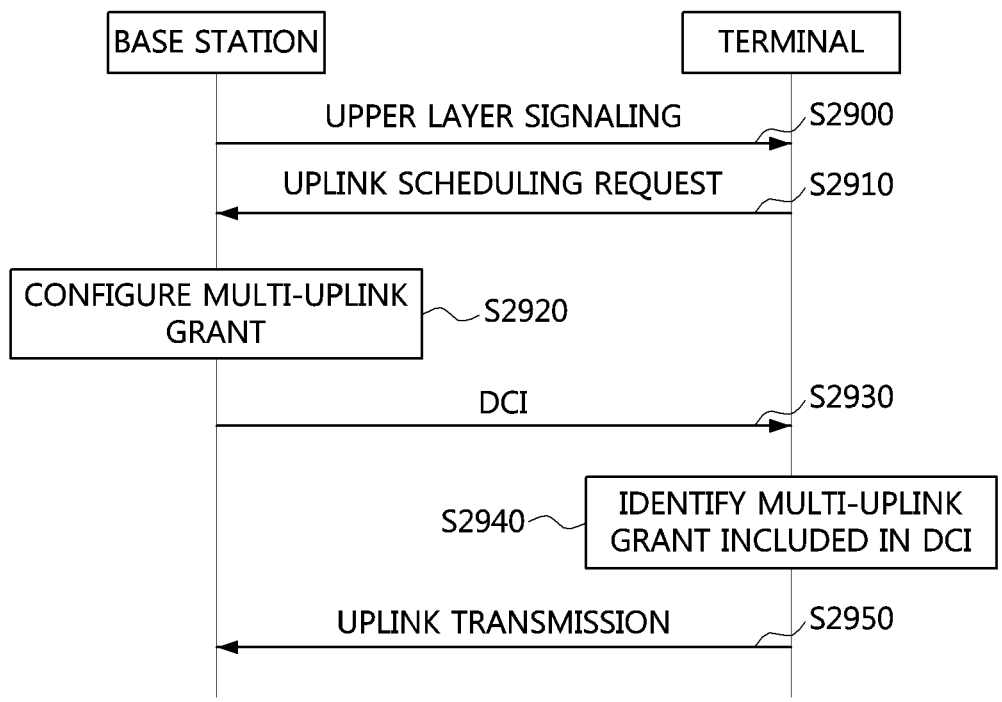

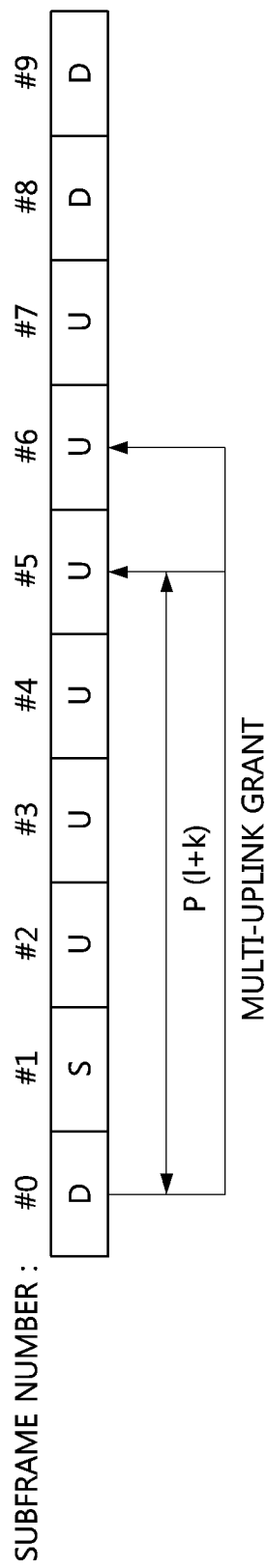
[Figure 30]

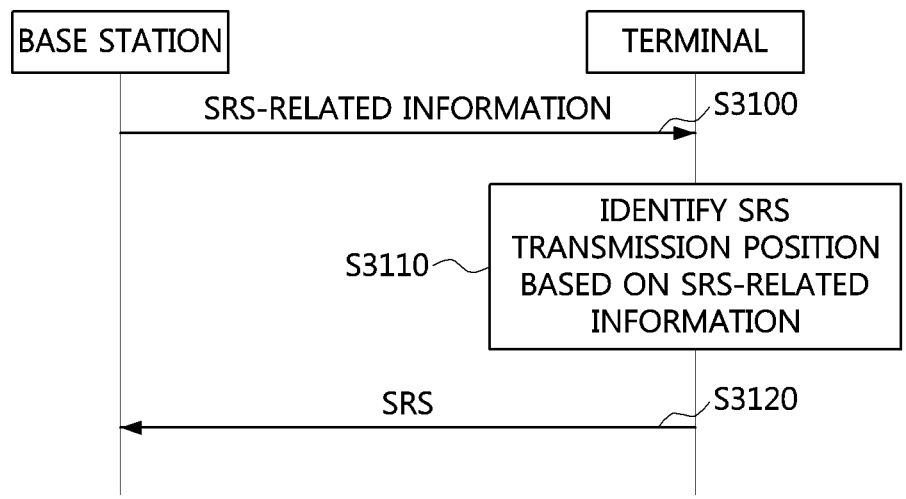
[Figure 31]

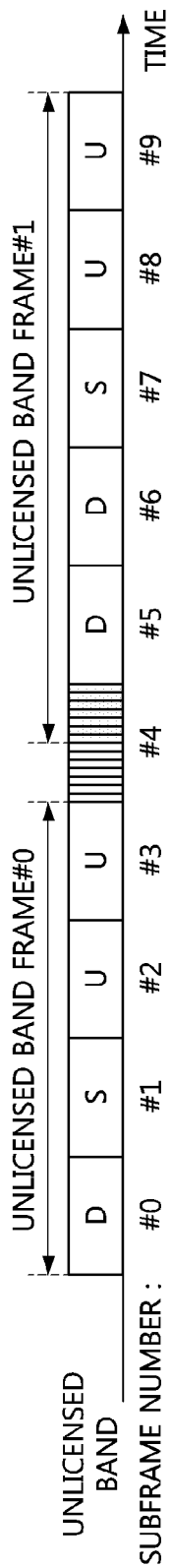
[Figure 32]

METHOD FOR COMMUNICATING IN NETWORK SUPPORTING LICENSED AND UNLICENSED BANDS

CROSS REFERENCE TO RELATED APPLICATIONS

This application is a U.S. National Stage Application of International Application No. PCT/KR2017/001078, filed on Feb. 1, 2017, which claims the benefit under 35 USC 119(a) and 365(b) of Korean Patent Application No. 10-2016-0014475 filed on Feb. 4, 2016, Korean Patent Application No. 10-2016-0039363 filed on Mar. 31, 2016, Korean Patent Application No. 10-2016-0057229 filed on May 10, 2016, and Korean Patent Application No. 1 0-201 6-01 02966 filed on Aug. 12, 2016 in the Korean Intellectual Property Office, the entire disclosure of which is incorporated herein by reference for all purposes.

TECHNICAL FIELD

The present invention relates to a communication method in a network supporting licensed and unlicensed bands, and more particularly to a communication method based on a frame (e.g., radio frame or subframe) configured for unlicensed bands.

BACKGROUND ART

Various wireless communication technologies are being developed in accordance with advancement of information communication technologies. Wireless communication technologies may be generally classified into technologies using licensed bands and technologies using unlicensed bands (e.g., industrial-scientific-medical (ISM) band) according to bands used by respective technologies. Since a licensed band is exclusively used by a specific operator, the technology using the licensed band may provide better reliability, communication quality, etc. than that using an unlicensed band.

There exists, as a representative cellular communication technology using a licensed band, a Long Term Evolution (LTE) or LTE-Advanced (LTE-A) standardized in a 3rd generation partnership project (3GPP). Thus, a base station or a user equipment (UE) supporting LTE or LTE-A may transmit or receive signals through a licensed band. Also, there exists, as a representative wireless communication technology using an unlicensed band, a wireless local area network (WLAN) defined in IEEE 802.11. Thus, an access point or a station supporting the WLAN may transmit or receive signals through the unlicensed band.

Meanwhile, as mobile traffics are increasing explosively, additional licensed bands are required in order to process such the increasing mobile traffics through licensed bands. However, licensed bands are limited resources. Since a licensed band is obtained usually through an auction held among operators, astronomical investment may be demanded for obtaining an additional licensed band. In order to resolve the above-described problem, a method for providing LTE or LTE-A services through an unlicensed band may be considered.

In the case that the LTE (or LTE-A) services are provided through the unlicensed band, coexistence with the communication nodes (e.g., access points, stations, etc.) supporting the WLAN is needed. For the coexistence in the unlicensed band, a communication node (e.g., base station, UE, etc.) supporting the LTE (or LTE-A) may occupy the unlicensed band based on an LBT (listen before talk) scheme. In this case, the communication node supporting the LTE (or LTE-A, etc.) may not be able to transmit a signal at a desired point in time. Also, a signal transmitted from the communication node supporting the LTE (or LTE-A, etc.) in the unlicensed band may interfere with a signal transmitted from the communication node supporting the WLAN. Therefore, there is a need for communication methods that considers discontinuous channel characteristics in the communication network supporting the unlicensed band.

Meanwhile, this description on the related arts is written for understanding of the background of the present disclosure. Thus, information on other than conventional technologies, which are already known to those skilled in this technology domain to which the technologies of the present disclosure belong, may be included in this description.

DISCLOSURE

Technical Problem

The purpose of the present disclosure for resolving the above-described problem is to provide a communication method in a network supporting licensed and unlicensed bands.

Technical Solution

An operation method of a terminal in a communication network according to a first embodiment of the present disclosure for achieving the above-described purpose may comprise detecting a control channel of a subframe #n transmitted from a base station; obtaining a downlink control information (DCI) for an uplink grant from the control channel; performing channel sensing based on channel access related information included in the DCI; and transmitting a subframe #(n+l) to the base station when a result of the channel sensing is determined to be an idle state, wherein each of the subframe #n and the subframe #(n+l) is an unlicensed band subframe, n is an integer equal to or greater than 0, and l is an integer equal to or greater than 4.

Here, the channel access related information may include a channel access type, wherein a channel access type 1 indicates that the channel sensing is performed during a period corresponding to a backoff counter selected within a contention window, and a channel access type 2 indicates that the channel sensing is performed during a preconfigured period.

Here, the preconfigured period may be 25 μs or 25 μs+timing advance (TA).

Here, a size of the contention window may be configured based on a channel access priority.

Here, the DCI may further include a new data indicator (NDI), and a size of the contention window is configured based on the NDI.

Here, the DCI may further include a starting position of a physical uplink shared channel (PUSCH) included in a subframe scheduled by the DCI.

Here, the starting position may be a first symbol of a first slot of the subframe scheduled by the DCI, a time point after 25 μs from a starting position of the first symbol, a time point after 25 μs+timing advance (TA) from the starting position of the first symbol, or a second symbol of the first slot.

Here, the DCI may further include an ending position of a physical uplink shared channel (PUSCH) included in a subframe scheduled by the DCI.

Here, the ending position may be a last symbol of a second slot of a subframe scheduled by the DCI or a symbol which is prior to the last symbol in the second slot.

An operation method of a base station in a communication network according to a second embodiment of the present disclosure for achieving the above-described purpose may comprise generating a downlink control information (DCI) including a channel access related information; transmitting the DCI to a terminal via a subframe #n; and receiving a subframe #(n+1) scheduled by the DCI from the terminal, wherein the subframe #(n+1) is received from the terminal when a result of a channel sensing based on the channel access related information is determined to be an idle state, n is an integer equal to or greater than 0, and 1 is an integer equal to or greater than 4.

Here, the channel access related information may include a channel access type, wherein a channel access type 1 indicates that the channel sensing is performed during a period corresponding to a backoff counter selected within a contention window, and a channel access type 2 indicates that the channel sensing is performed during a preconfigured period.

Here, the preconfigured period may be 25 μs or 25 μs+timing advance (TA).

Here, the DCI may further include a starting position of a physical uplink shared channel (PUSCH) included in a subframe scheduled by the DCI.

Here, the starting position may be a first symbol of a first slot of the subframe scheduled by the DCI, a time point after 25 μs from a starting position of the first symbol, a time point after 25 μs+timing advance (TA) from the starting position of the first symbol, or a second symbol of the first slot.

Here, the DCI may further include an ending position of a physical uplink shared channel (PUSCH) included in a subframe scheduled by the DCI.

Here, the ending position may be a last symbol of a second slot of a subframe scheduled by the DCI or a symbol which is prior to the last symbol in the second slot.

A terminal constituting a communication network according to a third embodiment of the present disclosure for achieving the above-described purpose may comprise a processor and a memory storing at least one instruction executed by the processor. Also, the at least one instruction may be configured to detect a control channel of a subframe #n transmitted from a base station; obtain a downlink control information (DCI) for an uplink grant from the control channel; perform channel sensing based on channel access related information included in the DCI; and transmit a subframe #(n+1) to the base station when a result of the channel sensing is determined to be an idle state. Also, each of the subframe #n and the subframe #(n+1) is an unlicensed band subframe, n is an integer equal to or greater than 0, and 1 is an integer equal to or greater than 4.

Here, the channel access related information may include a channel access type, wherein a channel access type 1 indicates that the channel sensing is performed during a period corresponding to a backoff counter selected within a contention window, and a channel access type 2 indicates that the channel sensing is performed during a preconfigured period.

Here, the DCI may further include a starting position of a physical uplink shared channel (PUSCH) included in a subframe scheduled by the DCI.

Here, the DCI may further include an ending position of a physical uplink shared channel (PUSCH) included in a subframe scheduled by the DCI.

Advantageous Effects

According to the present disclosure, the efficiency of channel use in the unlicensed band can be improved. Thus, the performance of the communication network can be improved.

DESCRIPTION OF DRAWINGS

FIG. 1 is a conceptual diagram illustrating a first embodiment of a wireless communication network.

FIG. 2 is a conceptual diagram illustrating a second embodiment of a wireless communication network.

FIG. 3 is a conceptual diagram illustrating a third embodiment of a wireless communication network.

FIG. 4 is a conceptual diagram illustrating a fourth embodiment of a wireless communication network.

FIG. 5 is a block diagram illustrating an embodiment of a communication node constituting a wireless communication network.

FIG. 6 is a conceptual diagram illustrating an embodiment of a type 1 frame.

FIG. 7 is a conceptual diagram illustrating an embodiment of a type 2 frame.

FIG. 8 is a conceptual diagram illustrating an embodiment of a resource grid of a slot included in a downlink subframe.

FIG. 9 is a conceptual diagram illustrating an embodiment of a resource grid of slots included in an uplink subframe;

FIG. 10 is a conceptual diagram illustrating an embodiment of an uplink subframe configuration;

FIG. 11 is a flowchart showing an embodiment of a communication method based on a variable subframe configuration;

FIG. 12 is a conceptual diagram illustrating an embodiment of a radio frame in an unlicensed band;

FIG. 13 is a conceptual diagram illustrating a first embodiment of an unlicensed band frame;

FIG. 14 is a conceptual diagram illustrating an embodiment of a special subframe of an unlicensed band;

FIG. 15 is a conceptual diagram illustrating an embodiment of a subframe scheduled by a single-uplink grant in an unlicensed band;

FIG. 16 is a conceptual diagram illustrating a first embodiment of a subframe scheduled by a multi-uplink grant in an unlicensed band;

FIG. 17 is a sequence chart illustrating a communication method based on a single-uplink grant in an unlicensed band;

FIG. 18 is a conceptual diagram illustrating a first embodiment of a starting position of an uplink subframe;

FIG. 19 is a conceptual diagram illustrating a second embodiment of a starting position of an uplink subframe;

FIG. 20 is a conceptual diagram illustrating a third embodiment of a starting position of an uplink subframe;

FIG. 21 is a conceptual diagram illustrating a fourth embodiment of a starting position of an uplink subframe;

FIG. 22 is a conceptual diagram illustrating a first embodiment of an ending position of an uplink subframe;

FIG. 23 is a conceptual diagram illustrating a second embodiment of an ending position of an uplink subframe;

FIG. 24 is a conceptual diagram illustrating a first embodiment of a channel access procedure performed in a guard period;

FIG. 25 is a conceptual diagram illustrating a second embodiment of a channel access procedure performed in a guard period;

FIG. 26 is a conceptual diagram illustrating a first embodiment of an execution time at which a channel access procedure is performed;

FIG. 27 is a conceptual diagram illustrating a second embodiment of an execution time at which a channel access procedure is performed;

FIG. 28 is a conceptual diagram illustrating a third embodiment of an execution time at which a channel access procedure is performed;

FIG. 29 is a sequence chart illustrating a communication method based on a multi-uplink grant in an unlicensed band;

FIG. 30 is a conceptual diagram illustrating a second embodiment of a subframe scheduled by a multi-uplink grant in an unlicensed band;

FIG. 31 is a sequence chart illustrating a first embodiment of a SRS transmission method in an unlicensed band; and FIG. 32 is a conceptual chart illustrating a second embodiment of an unlicensed band frame.

MODE FOR INVENTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first embodiment of a wireless communication network.

Referring to FIG. 1, a first base station 110 may support cellular communications (e.g., Long Term Evolution (LTE), LTE-Advanced (LTE-A), Licensed Assisted Access (LAA), etc.) standardized in a 3rd Generation Partnership Project (3GPP). The first base station 110 may support technologies such as a Multiple Input Multiple Output (MIMO) (e.g., Single-User (SU)-MIMO, Multi-User (MU)-MIMO, massive MIMO, etc.), a Coordinated multi-point transmission/reception (CoMP), a Carrier Aggregation (CA), etc. The first base station 110 may operate in a licensed band (F1), and form a macro cell. The first base station 100 may be connected to other base stations (e.g., a second base station 120, a third base station 130, etc.) through ideal backhaul links or non-ideal backhaul links.

The second base station 120 may be located in coverage of the first base station 110. Also, the second base station 120 may operate in an unlicensed band F3, and form a small cell. The third base station 130 may also be located in coverage of the first base station 110. The third base station 130 may operate in the unlicensed band F3, and form a small cell. The second base station 120 and the third base station 130 each may support a Wireless Local Area Network (WLAN) standardized in an Institute of Electrical and Electronics Engineers (IEEE) 802.11. Each user equipment (UE) connected to the first base station 110 may transmit and receive signals through a CA using the licensed band F1 and the unlicensed band F3.

FIG. 2 is a conceptual diagram illustrating a second embodiment of a wireless communication network.

Referring to FIG. 2, each of a first base station 210 and a second base station 220 may support cellular communications (e.g., LTE, LTE-A, LAA, etc.). Each of the first base station 210 and the second base station 220 may support MIMO (e.g. SU-MIMO, MU-MIMO, massive MIMO, etc.), CoMP, CA, etc. Also, each of the base stations 210 and 220 may operate in the licensed band F1, and form each small cell. Each of the base stations 210 and 220 may be located in coverage of a base station forming a macro cell. The first base station 210 may be connected with a third base station 230 through an ideal backhaul link or a non-ideal backhaul link. Also, the second base station 220 may be connected with a fourth base station 240 through an ideal backhaul link or a non-ideal backhaul link.

The third base station 230 may be located in coverage of the first base station 210. The third base station 230 may operate in the unlicensed band F3, and form a small cell. The fourth base station 240 may be located in coverage of the second base station 220. The fourth base station 240 may operate in the unlicensed band F3, and form a small cell. Each of the base stations 230 and 240 may support WLAN standardized in IEEE 802.11. Each of the first base station 210, a UE connected to the first base station 210, the second base station 220, and a UE connected to the second base station 220 may transmit and receive signals through a CA using the licensed band F1 and the unlicensed band F3.

FIG. 3 is a conceptual diagram illustrating a third embodiment of a wireless communication network.

Referring to FIG. 3, each of a first base station 310, a second base station 320, and a third base station 330 may support cellular communications (e.g., LTE, LTE-A, LAA, etc.). Each of the first base station 310, the second base station 320, and the third base station 330 may support MIMO (e.g., SU-MIMO, MU-MIMO, massive MIMO, etc.), CoMP, CA, etc. The first base station 310 may operate in the licensed band F1, and form a macro cell. The first base station 310 may be connected to other base stations (e.g., the second base station 320, the third base station 330, etc.) through ideal backhaul links or non-ideal backhaul links. The second base station 320 may be located in coverage of the first base station 310. The second base station 320 may operate in the licensed band F1, and form a small cell. The third base station 330 may be located in coverage of the first base station 310. The third base station 330 may operate in the licensed band F1, and form a small cell.

The second base station 320 may be connected with a fourth base station 340 through an ideal backhaul link or a non-ideal backhaul link. The fourth base station 340 may be located in coverage of the second base station 320. The fourth base station 340 may operate in the unlicensed band F3, and form a small cell. The third base station 330 may be connected with a fifth base station 350 through an ideal backhaul link or a non-ideal backhaul link. The fifth base station 350 may be located in coverage of the third base station 330. The fifth base station 350 may operate in the unlicensed band F3, and form a small cell. Each of the base stations 340 and 350 may support WLAN standardized in IEEE 802.11.

Each of the first base station 310, a UE (not-depicted) connected to the first base station 310, the second base station 320, a UE (not-depicted) connected to the second base station 320, the third base station 330, and a UE (not-depicted) connected to the third base station 330 may transmit and receive signals through a CA using the licensed band F1 and the unlicensed band F3.

FIG. 4 is a conceptual diagram illustrating a fourth embodiment of a wireless communication network.

Referring to FIG. 4, each of a first base station 410, a second base station 420, and a third base station 430 may support cellular communications (e.g., LTE, LTE-A, LAA, etc.). Each of the first base station 410, the second base station 420, and the third base station 430 may support MIMO (e.g., SU-MIMO, MU-MIMO, massive MIMO, etc.), CoMP, CA, etc. The first base station 410 may operate in the licensed band F1, and form a macro cell. The first base station 410 may be connected to other base stations (e.g. the second base station 420, the third base station 430, etc.) through ideal backhaul links or non-ideal backhaul links. The second base station 420 may be located in coverage of the first base station 410. The second base station 420 may operate in the licensed band F2, and form a small cell. The third base station 430 may be located in coverage of the first base station 410. The third base station 430 may operate in the licensed band F2, and form a small cell. Each of the second base station 420 and the third base station 430 may operate in the licensed band F2 different from the licensed band F1 in which the first base station 410 operates.

The second base station 420 may be connected with a fourth base station 440 through an ideal backhaul link or a non-ideal backhaul link. The fourth base station 440 may be located in coverage of the second base station 420. The fourth base station 440 may operate in the unlicensed band F3, and form a small call. The third base station 430 may be connected with a fifth base station 450 through an ideal backhaul link or a non-ideal backhaul link. The fifth base station 450 may be located in coverage of the third base station 430. The fifth base station 450 may operate in the unlicensed band F3, and form a small cell. Each of the base stations 440 and 450 may support WLAN standardized in IEEE 802.11.

Each of the first base station 410 and a UE (not-depicted) connected to the first base station 410 may transmit and receive signals through a CA using the licensed band F1 and the unlicensed band F3. Each of the second base station 420, a UE (not-depicted) connected to the second base station 420, the third base station 430, and a UE (not-depicted) connected to the third base station 430 may transmit and receive signals through a CA using the licensed band F2 and the unlicensed band F3.

The above-described communication nodes constituting a wireless communication network (e.g., a base station, a UE, etc.) may transmit signals according to a Listen-Before-Talk (LBT) procedure in the unlicensed band. That is, the communication node may determine whether the unlicensed band is occupied or not by performing an energy detection operation. The communication node may transmit a signal when the unlicensed band is determined to be in an idle state. In this case, the communication node may transmit a signal when the unlicensed band is maintained as in the idle state during a contention window according to a random backoff operation. On the contrary, when the unlicensed band is determined as a busy state, the communication node may not transmit a signal.

Alternatively, the communication entity may transmit a signal based on a Carrier Sensing Adaptive Transmission (CSAT) operation. That is, the communication node may transmit a signal based on a pre-configured duty cycle. The communication node may transmit a signal when a current duty cycle is a duty cycle assigned for communication nodes supporting cellular communications. On the contrary, the communication node may not transmit a signal when a current duty cycle is a duty cycle assigned for communication nodes supporting other communications (e.g., WALN, etc.) except cellular communications. The duty cycle may be determined adaptively based on the number of communication nodes existing and supporting WLAN in the unlicensed band, a usage state of the unlicensed band, etc.

The communication node may perform discontinuous transmission in the unlicensed band. For example, if a maximum transmission duration or a maximum channel occupancy time is configured for the unlicensed band, the communication node may transmit signals during the maximum transmission duration or the maxim channel occupancy time. In a case that the communication node cannot transmit whole signals during the current maximum transmission duration (or, maximum channel occupancy time), the communication node may transmit the rest of signals in a next maximum transmission duration. Also, the communication node may select a carrier having relatively smaller interferences among unlicensed bands, and operate in the selected carrier. Also, in the case that the communication node transmits signals in the unlicensed band, transmission power can be controlled in order to reduce interferences to other communication nodes.

On the other hand, the communication node may support communication protocols based on code division multiple access (CDMA), wideband CDMA (WCDMA), time division multiple access (TDMA), frequency division multiple access (FDMA), single carrier TDMA (SC-FDMA), orthogonal frequency division multiplexing (OFDM), or orthogonal frequency division multiple access (OFDMA).

A base station among communication nodes may be referred to as a Node-B (NB), an evolved Node-B (eNB), a base transceiver station (BTS), a radio base station, a radio transceiver, an access point (AP), or an access node. Also, a user equipment (UE) among communication nodes may be referred to as a terminal, an access terminal, a mobile terminal, a station, a subscriber station, a portable subscriber station, a mobile station, a node, or a device. The communication node may have a structure which will be described below.

FIG. 5 is a block diagram illustrating an embodiment of a communication node constituting a wireless communication network.

Referring to FIG. 5, a communication node 500 may include at least one processor 510, a memory 520 and a transceiver 530 connected to a network and performing communication. Further, the communication node 500 may include an input interface unit 540, an output interface unit 550, and a storage 560. The respective components included in the communication node 500 may be connected via a bus 570 to communicate with each other.

The processor 510 may perform a program command stored in the memory 520 and/or the storage 560. The processor 510 may be a central processing unit (CPU), a graphics processing unit (GPU) or a dedicated processor in which the methods according to embodiments of the present disclosure are performed. The memory 520 and the storage 560 may include a volatile storage medium and/or a non-volatile storage medium.

For example, the memory 520 may include a read only memory (ROM) and/or a random access memory (RAM).

Operation methods of the communication node in the wireless communication network will be described below. Although a method (e.g., signal transmission or reception) performed by a first communication node will be described, a second communication node corresponding thereto may perform a method (e.g., signal reception or transmission) corresponding to the method performed by the first communication node. That is, when an operation of the UE is described, the base station corresponding thereto may perform an operation corresponding to the operation of the UE. On the contrary, when an operation of the base station is described, the UE may perform an operation corresponding to an operation of the base station.

Meanwhile, a carrier aggregation may be applied to at least one of unlicensed band cells and at least one of licensed band cells. Configuration, addition, modification, or release of the unlicensed band cell may be performed through a radio resource control (RRC) signaling (e.g., transmission and reception of 'RRCConnectionReconfiguration' messages (hereinafter, referred to as a 'RRC message')). The RRC message may be transmitted to a UE through the licensed band cell, and may include information required for management and operation of the unlicensed band cell.

Unlike the licensed band cell, the period in which a signal can be continuously transmitted in the unlicensed band cell may be limited within the maximum transmission duration. Further, when a signal is transmitted based on the LBT, the signal may be transmitted when transmission of another communication node is completed. In the case that LTE (or, LTE-A) services are provided in the unlicensed band cell, transmission of communication nodes supporting the LTE (or LTE-A) may have aperiodic, discontinuous, opportunistic characteristics. Based on these characteristics, a signal transmitted continuously by a communication node supporting the LTE (or LTE-A) for a certain time period in the unlicensed band may be referred to as 'unlicensed band burst'.

Also, a contiguous set of subframes consisting of a combination of at least one of a channel defined in the licensed band (e.g., a physical control format indicator channel (PCFICH), a physical hybrid automatic repeat request (ARQ) indicator channel (PHICH), a physical downlink control channel (PDCCH), a physical multicast channel (PMCH), a physical uplink control channel (PUCCH), a physical uplink shared channel (PUSCH), etc.) and a signal (e.g., a synchronization signal, a reference signal, etc.) may be transmitted over the unlicensed band. In this case, transmission of the subframes may be referred to as 'unlicensed band transmission'.

Frames used for the transmission in the unlicensed band may be classified into a downlink (DL) unlicensed band burst frame, an uplink (UL) unlicensed band burst frame, and a UL/DL unlicensed band burst frame. The DL unlicensed band burst frame may include a subframe to which the unlicensed band transmission is applied, and may further include an 'unlicensed band signal'. In the DL unlicensed band burst frame, the unlicensed band signal may be located before the subframe to which the unlicensed band transmission is applied. The unlicensed band signal may be configured to match a timing of a subframe (or a timing of an OFDM symbol) to which the unlicensed band transmission is applied to a timing of a subframe (or a timing of an OFDM symbol) in the licensed band. Also, the unlicensed band signal may be used for automatic gain control (AGC), synchronization acquisition, channel estimation, etc. required for reception of data based on the unlicensed band transmission.

Meanwhile, the cellular communication network (e.g. LTE network) may support frequency division duplexing (FDD) or time division duplexing (TDD). A frame based on FDD may be defined as a type 1 frame, and a frame based on TDD may be defined as a type 2 frame.

FIG. 6 is a conceptual diagram illustrating an embodiment of a type 1 frame. Referring to FIG. 6, a radio frame 600 may comprise 10 subframes, and each subframe may comprise two slots. Thus, the radio frame 600 may comprise 20 slots (e.g. slot #0, slot #1, slot #2, slot #3, . . . , slot #18, and slot #19). The length ($T_f$) of the radio frame 600 may be 10 milliseconds (ms). Also, the length of each subframe may be 1 ms. Also, the length ($T_{slot}$) of each slot may be 0.5 ms. Here, Ts may be $1/30,720,000$ second.

Each slot may comprise a plurality of OFDM symbols in time domain, and comprise a plurality of resource blocks (RBs) in frequency domain. Each resource block may comprise a plurality of subcarriers in frequency domain. The number of OFDM symbols constituting each slot may be determined according to configuration of a cyclic prefix (CP). The CP may be classified into a normal CP and an extended CP. If the normal CP is used, each slot may comprise 7 OFDM symbols, and each subframe may comprise 14 OFDM symbols. If the extended CP is used, each slot may comprise 6 OFDM symbols, and each subframe may comprise 12 OFDM symbols.

FIG. 7 is a conceptual diagram illustrating an exemplary embodiment of a type 2 frame.

Referring to FIG. 7, a radio frame 700 may comprise two half frames, and each half frame may comprise 5 subframes. Thus, the radio frame 700 may comprise 10 subframes. The length ($T_f$) of the radio frame 700 may be 10 ms, and the length of each half frame may be 5 ms. The length of each subframe may be 1 ms. Here, $T_s$ may be 1/30,720,000 second.

The radio frame 700 may include at least one downlink subframe, at least one uplink subframe, and at least one special subframe. Each of the downlink subframe and the uplink subframe may comprise two slots. The length (Tslot) of each slot may be 0.5 ms. Each of subframe #1 and subframe #6, among subframes constituting the radio frame 700, may be a special subframe. Each special subframe may include a downlink pilot time slot (DwPTS), a guard period (GP), and an uplink pilot time slot (UpPTS).

The numbers and positions of the downlink subframes, the uplink subframes, and the special subframes included in the radio frame 700 may be changed as needed. The 'uplink-downlink (UL-DL) configuration' for 10 subframes included in the radio frame 700 may be set based on Table 1. In Table 1, 'D' may indicate a downlink subframe, may indicate an uplink subframe, and 'S' may indicate a special subframe.

TABLE 1

| UL-DL configuration | UL-DL switching cycle | Subframe number |  |  |  |  |  |  |  |  |  |
|---|---|---|---|---|---|---|---|---|---|---|---|
|  |  | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The DwPTS may be regarded as being included in a downlink period and may be used for UE cell search, time and frequency synchronization acquisition, and the like. A PDSCH, a PDCCH, a primary synchronization signal (PSS), a reference signal, and the like may be transmitted in the DwPTS identically or similarly to the general downlink subframe.

The GP may be used for resolving interference problem of uplink data transmission caused by downlink data reception delay. Also, the GP may include a time required for switching from a downlink data reception operation to an uplink data transmission operation. The UpPTS may be regarded as being included an uplink period and may be used for uplink channel estimation, time and frequency synchronization acquisition, and the like. A physical random access channel (PRACH), a sounding reference signal (SRS), or the like may be transmitted in the UpPTS.

The lengths of the DwPTS, the GP, and the UpPTS included in the special subframe may be variably adjusted as needed. Table 2 may be an embodiment of the configuration of the special subframe (e.g., the configuration of the DwPTS and the UpPTS). A period excluding the DwPTS and the UpPTS in a subframe having a length of 1 ms may be set as the GP. In Table 2, $T_s$ may be a base time unit and may be set to 1/(15000×2048) seconds.

TABLE 2

| Special subframe configuration | Normal CP for DL | | | Extended CP for DL | | |
|---|---|---|---|---|---|---|
| | | UpPTS | | | UpPTS | |
| | DwPTS | Normal CP for UL | Extended CP for UL | DwPTS | Normal CP for UL | Extended CP for UL |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | 4384 · $T_s$ | 5120 · $T_s$ |
| 4 | 26336 · $T_s$ | | | 7680 · $T_s$ | | |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Table 3 below may be a configuration of a special subframe in a case where a normal CP is used for both the downlink and uplink in the special subframe configurations of Table 2. The numbers described in the 'DwPTS' field, 'GP' field, and 'UpPTS' field in Table 3 may indicate the number of OFDM symbols for each. For example, if a subframe includes 14 OFDM symbols and a 'special subframe configuration 0' in Table 3 is used, the special subframe may include a DwPTS comprising 3 OFDM symbols, a GP comprising 10 OFDM symbols, and an UpPTS including 1 OFDM symbol.

TABLE 3

| Special subframe configuration | Number of OFDM symbols | | |
|---|---|---|---|
| | DwPTS | GP | UpPTS |
| 0 | 3 | 10 | 1 |
| 1 | 9 | 4 | 1 |
| 2 | 10 | 3 | 1 |
| 3 | 11 | 2 | 1 |
| 4 | 12 | 1 | 1 |
| 5 | 3 | 9 | 2 |
| 6 | 9 | 3 | 2 |
| 7 | 10 | 2 | 2 |

TABLE 3-continued

| Special subframe configuration | Number of OFDM symbols | | |
|---|---|---|---|
| | DwPTS | GP | UpPTS |
| 8 | 11 | 1 | 2 |
| 9 | 6 | 6 | 2 |

FIG. 8 is a conceptual diagram illustrating an embodiment of a resource grid of a slot included in a downlink subframe.

Referring to FIG. 8, 1 may indicate an OFDM symbol index, and k may indicate a subcarrier index. $N_{RB}^{DL}$ may indicate the number of resource blocks in the downlink. $N_{symb}^{DL}$ may indicate the number of OFDM symbols in a downlink slot (or resource block). $N_{SC}^{RB}$ may indicate the number of subcarriers in the resource block.

When the normal CP is used, each resource block (RB) of a slot included in a downlink subframe or an uplink subframe may comprise 7 OFDM symbols in time domain, and 12 subcarriers in frequency domain. In this case, a resource defined by a single OFDM symbol in time domain and a single subcarrier in frequency domain may be referred to as a resource element (RE).

In downlink transmission of a cellular communication network (e.g. LTE network), allocation of resources for a UE may be performed in unit of RBs, and mapping of reference signals and synchronization signals may be performed in unit of REs.

FIG. 9 is a conceptual diagram illustrating an embodiment of a resource grid of slots included in an uplink subframe.

Referring to FIG. 9, 1 may indicate a single carrier-frequency division multiple access (SC-FDMA) symbol index and k may indicate a subcarrier index. $N_{RB}^{UL}$ may indicate the number of resource blocks in the uplink. $N_{symb}^{UL}$ may indicate the number of SC-FDMA symbols in an uplink slot (or resource block). $N_{SC}^{RB}$ may indicate the number of subcarriers in the resource block.

When the normal CP is used, the resource block included in the uplink subframe may include 7 SC-FDMA symbols in time domain and 12 subcarriers in frequency domain. In this case, a resource defined by a single SC-FDMA symbol in time domain and a single subcarrier in frequency domain may be referred to as a resource element (RE).

FIG. 10 is a conceptual diagram illustrating an embodiment of an uplink subframe configuration.

Referring to FIG. 10, when the normal CP is used, an uplink subframe may include 14 SC-FDMA symbols. The uplink subframe may include a PUCCH, a PUSCH, a demodulation reference signal (DMRS), an SRS, and the like. The DMRS and the SRS used for demodulating the PUCCH and the PUCCH may be transmitted through edge regions of the frequency domain of the uplink subframe. The resources (e.g., the number of resource blocks, the number of SC-FDMA symbols, the position of frequency resource, and the position of time resource) allocated to the DMRS and SRS used for demodulating PUCCH and the PUCCH may variable according to system configuration.

A DMRS, an SRS, and the like used for demodulating the PUSCH and the PUSCH may be transmitted through resources (e.g., resource blocks) to which the PUCCH is not allocated in the uplink subframe. For example, a DMRS used for demodulating PUSCH is configured in the middle SC-FDMA symbol for each slot (e.g., SC-FDMA symbol #3 in slot #0, SC-FDMA symbol #3 in slot #1). The SRS may be configured in the last SC-FDMA symbol of the subframe (e.g., SC-FDMA symbol #6 in slot #1). If the SRS is not configured in the SC-FDMA symbol #6 of the slot #1, the PUCCH and the PUSCH may be transmitted through the SC-FDMA symbol #6 of the slot #1.

Hereinafter, a frame (e.g., a radio frame, a subframe) in which downlink communication and uplink communication are performed in the same frequency band of the unlicensed band will be described. In an FDD communication network (e.g., a type 1 frame-based communication network) supporting the licensed band, downlink communication and uplink communication may be performed according to a frequency band irrespective of a subframe number. For example, a downlink communication may be performed through radio frames (e.g., subframes #0 to #9) in a downlink frequency band (e.g., frequency band #1), and uplink communication may be performed through radio frames (e.g., subframe #0 to subframe #9) in an uplink frequency band (e.g., frequency band #2).

In a TDD communication network (e.g., a type 2 frame-based communication network) supporting the licensed band, uplink communication may be performed through uplink subframes according to the UL-DL configuration, and downlink communication may be performed through downlink subframes according to the UL-DL configuration. For example, when the UL-DL configuration 0 of Table 1 is used, downlink communication may be performed through subframes #0 and #5, and uplink communication may be performed through subframes #2 to #4 and #7 to #9.

Meanwhile, since the unlicensed band can be shared by a plurality of users, it is difficult to use fixed uplink subframes and fixed downlink subframes based on the UL-DL configurations in Table 1. Therefore, in the communication network supporting the unlicensed band, the uplink subframes and the downlink subframes may be variably configured.

FIG. 11 is a flowchart showing an embodiment of a communication method based on a variable subframe configuration.

Referring to FIG. 11, a base station may be the base station shown in FIGS. 1 to 4, and a terminal may be connected to the base station. Each of the base station and the terminal may support cellular communications (e.g., LTE, LTE-A, LAA, eLAA, etc. defined in the 3GPP standard) and operate in the unlicensed band and the licensed band. Also, each of the base station and the terminal may be the same as or similar to the communication node 500 shown in FIG. 5.

The base station may check a status of a channel (e.g., unlicensed band) by performing a channel access procedure (e.g., an LBT procedure) (S1100). For example, the base station may select a backoff counter within a contention window and may identify the channel status (e.g., sense the channel) for a period corresponding to the selected backoff counter. Alternatively, the base station may identify the channel status (e.g., sense the channel) for a predetermined period (e.g., 25 μs or (25+timing advance (TA)) μs).

If it is determined that the channel status is an idle state, the base station may configure a radio frame including at least one of uplink subframe, downlink subframe, and special subframe (S1110). The length of the radio frame may be set to be less than a preset maximum length. The preset maximum length may be 10 ms. In the radio frame, the numbers of uplink subframes, downlink subframes, and special subframes may be respectively configured variably. The radio frame configured by the base station in the unlicensed band may be as follows.

FIG. 12 is a conceptual diagram illustrating an embodiment of a radio frame in an unlicensed band.

Referring to FIG. 12, since the channel status is a busy state in a period of an unlicensed band which corresponds to subframes #0 to #2 in a radio frame #0 of a licensed band, the base station may configure a radio frame after the busy state in the unlicensed band period. If the preset maximum length is 10 ms and the length of one subframe is 1 ms, the base station may configure a radio frame including 10 or fewer subframes. For example, a radio frame may include five downlink subframes, one special subframe, and four uplink subframes.

Referring again to FIG. 11, the base station may perform communications through the configured radio frame (S1120). For example, the base station may perform downlink communication through the downlink subframes in the unlicensed band and perform uplink communication through the uplink subframes in the licensed band.

Meanwhile, the base station may transmit a downlink signal in a downlink subframe (e.g., D shown in FIG. 12). The terminal may determine that a subframe #n is a downlink subframe when the downlink signal is received in the subframe #n. Here, n may be an integer equal to or greater than 0. The base station may not transmit a signal in an uplink subframe (e.g., U shown in FIG. 12). The terminal may determine that the subframe #n is an uplink subframe or a non-valid subframe when no signal is detected in the subframe #n. Alternatively, the terminal may determine that the subframe #n is an uplink subframe when receiving an uplink grant for scheduling the subframe #n. The terminal may transmit an uplink signal in the subframe #n when the subframe #n is determined to be the uplink subframe.

When the channel is occupied by another communication node, a starting time of the subframe #n in the unlicensed band may not coincide with a starting time of the subframe #n in the licensed band. In this case, if the communication node does not occupy the subframe #n of the unlicensed band to perform communication from the subframe #(n+1) of the unlicensed band, the subframe #n of the unlicensed band may be occupied by another communication node. Therefore, communication may not be performed in the subframe #(n+1) of the unlicensed band. In order to resolve this problem, the communication node may transmit an arbitrary signal for channel occupancy in the subframe #n of the unlicensed band. In this case, the efficiency of channel use may be reduced.

In order to solve this problem, a subframe may be configured from a time when the channel can be used in the unlicensed band, and communication may be performed in the configured subframe. In the unlicensed band, the subframe may be configured as follows.

FIG. 13 is a conceptual diagram illustrating a first embodiment of an unlicensed band frame.

Referring to FIG. 13, the timing of the subframe (or slot, OFDM symbol, etc.) of the licensed band may be the same as the timing of the subframe (or slot, OFDM symbol, etc.) of the unlicensed band. The unlicensed band frame may comprise a plurality of subframes. Among the plurality of subframes included in the unlicensed band frame, a first subframe in time domain may be referred to as a starting subframe. Also, a first downlink subframe in time domain among consecutive downlink subframes included in the unlicensed band frame may be referred to as a starting downlink subframe (or a starting subframe). Among the consecutive uplink subframes included in the unlicensed band frame, a first uplink subframe in time domain may be referred to as a starting uplink subframe (or a starting subframe).

Among the plurality of subframes included in the unlicensed band, a last subframe in time domain may be referred to as an ending subframe. Also, among the consecutive downlink subframes included in the unlicensed band frame, a last downlink subframe in time domain may be referred to as an ending downlink subframe (or an ending subframe). Among the consecutive uplink subframes included in the unlicensed band frame, a last uplink subframe in time domain may be referred to as an ending uplink subframe (or an ending subframe).

A subframe having a length of less than 1 ms among the plurality of subframes included in the unlicensed band frame may be referred to as a partial subframe. Also, a downlink subframe having a length of less than 1 ms among the downlink subframes included in the unlicensed band frame may be referred to as a partial downlink subframe (or partial subframe). An uplink subframe having a length of less than 1 ms among the uplink subframes included in the unlicensed band frame may be referred to as a partial uplink subframe (or partial subframe). If the length of the first subframe in time domain among the plurality of subframes included in the unlicensed band is less than 1 ms, the first subframe may be referred to as a starting partial subframe (or partial subframe). If the length of the last subframe in time domain among the plurality of subframes included in the unlicensed band is less than 1 ms, the last subframe may be referred to as an ending partial subframe (or partial subframe).

The unlicensed band frame may include a starting subframe, a subframe #1, a subframe #2, a subframe #3 and an ending subframe. When the normal CP is used, each of subframe #1, subframe #2 and subframe #3 may comprise 14 symbols. For example, the length of each of subframe #1, subframe #2 and subframe #3 may be 1 ms. The configuration of each of subframe #1, subframe #2 and subframe #3 in the unlicensed band may be the same as that of subframe #1, subframe #2 and subframe #3 in the licensed band.

When the normal CP is used, the number of symbols included in each of the starting partial subframe and the ending partial subframe may be less than 14. For example, the length of each of the starting partial subframe and the ending partial subframe may be less than 1 ms. In the subframe #0 of the unlicensed band, if an interval from the symbol #4 of the first slot to the symbol #6 of the second slot is available, the starting partial subframe may include the symbol #4 of the first slot to the symbol #6 of the second slot. That is, the starting partial subframe may include 10 symbols.

Meanwhile, the maximum length of the unlicensed band frame may be limited to a specific value. In this case, the length of the ending subframe of the unlicensed band frame may be less than 1 ms. For example, if the maximum length of the unlicensed band frame is 4 ms and the starting partial subframe includes 10 symbols, the ending partial subframe may include 4 symbols.

Meanwhile, the structure of the ending subframe (e.g., the ending partial subframe) in the unlicensed band may be the same as or similar to the structure of the existing DwPTS. In the unlicensed band, the length of the ending subframe may be set dynamically according to the channel characteristics, and the base station may transmit length information of the ending subframe to the terminal. For example, the base station may generate downlink control information (DCI) (e.g., common DCI) including the length information of the ending subframe, and transmit the generated DCI through at least one of PDCCH and enhanced PDCCH (EPDCCH). The length information of the ending subframe may be transmitted through the ending subframe or the previous subframe of the ending subframe. For example, when the ending subframe is the subframe #n, the length information of the subframe #n may be transmitted through the subframe #n or the subframe #(n−1). The length information of the subframe (e.g., the ending subframe) included in the unlicensed band frame may be represented by 4 bits based on Table 4 below. Alternatively, the length information may be not limited to Table 4 and may be expressed in various ways.

TABLE 4

| Length information | Description |
| --- | --- |
| 0000 | Indicates that the next subframe has the length of 14 symbols |
| 0001 | Indicates that the next subframe has the length of 12 symbols |
| 0010 | Indicates that the next subframe has the length of 11 symbols |
| 0011 | Indicates that the next subframe has the length of 10 symbols |
| 0100 | Indicates that the next subframe has the length of 9 symbols |
| 0101 | Indicates that the next subframe has the length of 6 symbols |
| 0110 | Indicates that the next subframe has the length of 3 symbols |
| 0111 | Indicates that the current subframe has the length of 14 symbols |
| 1000 | Indicates that the current subframe has the length of 12 symbols |
| 1001 | Indicates that the current subframe has the length of 11 symbols |
| 1010 | Indicates that the current subframe has the length of 10 symbols |
| 1011 | Indicates that the current subframe has the length of 9 symbols |
| 1100 | Indicates that the current subframe has the length of 6 symbols |
| 1101 | Indicates that the current subframe has the length of 3 symbols |
| 1110 | Reserved |
| 1111 | Reserved |

Here, in the case that the length information is transmitted through the subframe #n, the next subframe may be the subframe #(n+1). In the case that the length information is transmitted through the subframe #n, the current subframe may be the subframe #n.

Meanwhile, the unlicensed band frame including only downlink subframes may be terminated when the transmission of the ending subframe among the downlink subframes is completed. In the unlicensed band frame including downlink subframes and uplink subframes, the uplink subframes may be located after the downlink subframes. For example, the uplink subframes may be located after the ending subframe (e.g., the ending partial subframe) of the downlink subframes.

In the case that the unlicensed band frame includes downlink subframes and uplink subframes, the base station may generate an uplink grant for scheduling the uplink subframes, and may transmit a DCI including the uplink grant (e.g., DCI for the uplink grant) through at least one of PDCCH and EPDCCH. For example, the uplink grant for scheduling the subframe #n may be transmitted through the subframe #(n−1). Here, l may be an integer equal to or greater than 4.

The terminal may determine whether the unlicensed band frame includes uplink subframes based on reception of the uplink grant. For example, when the uplink grant is received through the downlink subframe of the unlicensed band frame, the terminal may determine that the unlicensed band frame includes the uplink subframes. On the other hand, when the uplink grant is not received through the downlink subframe of the unlicensed band frame, the terminal may determine that the corresponding unlicensed band frame does not include the uplink subframes. For example, when the uplink grant is not received from the base station and length information in Table 4 indicating the length of the current subframe (e.g., 1000, 1001, 1010, 1011, 1100, 1101) is received, the terminal may determine that the unlicensed band frame is terminated when the transmission of the current subframe is completed. Alternatively, when the uplink grant is not received from the base station and length information in Table 4 indicating the length of the next subframe (e.g., 0001, 0010, 0011, 0100, 0101, 0110) is received, the terminal may determine that the unlicensed band frame is terminated when the transmission of the next subframe is completed.

Meanwhile, the uplink grant for scheduling the subframe #n in the unlicensed band may be transmitted through the subframe #(n−1). When a cross-carrier scheduling scheme is used in the unlicensed band, the uplink grant is transmitted through the licensed band, so that the uplink grant may be transmitted based on the conventional scheme. When a self-carrier scheduling scheme is used in the unlicensed band, the subframe #(n−1) through which the uplink grant for scheduling the subframe #n is transmitted may be a downlink subframe or a special subframe.

Thus, when the unlicensed band frame includes uplink subframes and the self-carrier scheduling scheme is used, the unlicensed band frame may include at least one downlink subframe. For example, if the starting downlink subframe among the downlink subframes of the unlicensed band frame is a partial subframe, l downlink subframes may include a partial subframe (e.g., the starting downlink subframe).

Alternatively, the l downlink subframes may not include a partial subframe (e.g., the starting downlink subframe).

When the ending downlink subframe among the downlink subframes of the unlicensed band frame is a partial subframe, l downlink subframes may include a partial subframe (e.g., the ending downlink subframe). Alternatively, the l downlink subframes may not include a partial subframe (e.g., the ending downlink subframe).

Meanwhile, when the unlicensed band frame includes downlink subframes and uplink subframes and length information indicating the length of the current subframe in Table 4 (e.g., 0111, 1000, 1001, 1010, 1011, 1100, 1101) is received through the subframe #n, the terminal may determine that the uplink transmission starts in the subframe #n or the subframe #(n+1). Alternatively, when the unlicensed band frame includes downlink subframes and uplink subframes and length information indicating the length of the next subframe in Table 4 (e.g., 0001, 0010, 0011, 0100, 0101, 0110) is received through the subframe #n, the terminal may determine that uplink transmission starts in the subframe #(n+1).

When downlink transmission and uplink transmission are performed in the subframe #n in the unlicensed band, the subframe #n may be the same as or similar to the special subframe of the type 2 frame. That is, the subframe #n in the unlicensed band may include a downlink transmission period, a guard period, and an uplink transmission period. For example, the downlink transmission period of the subframe #n may be the same as or similar to the DwPTS of the special subframe, the guard period of the subframe #n may be the same as or similar to the GP of the special subframe, and the uplink transmission period of subframe #n may be the same as or similar to the UpPTS of the special subframe. In the unlicensed band, the subframe including the downlink transmission period, the guard period, and the uplink transmission period may be referred to as the special subframe. Alternatively, the special subframe of the unlicensed band may not include the uplink transmission period. In this case, the special subframe of the unlicensed band may include the downlink transmission period and the guard period. The special subframe of the unlicensed band may be configured as follows.

FIG. 14 is a conceptual diagram illustrating an embodiment of a special subframe of an unlicensed band.

Referring to FIG. 14, the unlicensed band frame may include a downlink subframe, a special subframe, and an uplink subframe. The special subframe of the unlicensed band may include a downlink transmission period, a guard period, and an uplink transmission period. Alternatively, the special subframe of the unlicensed band may include a downlink transmission period and a guard period. The downlink transmission may be performed in the downlink transmission period of the unlicensed band, and the uplink transmission may be performed in the uplink transmission period of the unlicensed band.

The downlink transmission period of the unlicensed band may be configured to be the same as or similar to the DwPTS of the type 2 frame. When the special subframe of the unlicensed band includes 14 symbols, the downlink transmission period may include 12 or fewer symbols. For example, in order to prevent the channel from being occupied by other communication nodes, the downlink transmission period may be configured to minimize the guard period.

The guard period of the unlicensed band may be configured to be equal to or similar to the guard period (GP) of the type 2 frame. The guard period of the unlicensed band may include no more than two symbols. The uplink transmission period of the unlicensed band may be configured to be equal to or similar to the UpPTS of the type 2 frame. Also, in order to increase the number of SRS transmissions, the uplink transmission period of the unlicensed band may include at most 6 symbols, and the SRS may be transmitted through the corresponding symbols.

The special subframe of the unlicensed band may be configured in various ways. For example, the special subframe of the unlicensed band may be configured based on Table 5.

TABLE 5

| Special subframe configuration | DL transmission period | Guard period | UL transmission period |
| --- | --- | --- | --- |
| 0 | 6 | 2 | 6 |
| 1 | 7 | 1 | 6 |
| 2 | 10 | 1 | 3 |
| 3 | 10 | 2 | 2 |
| 4 | 11 | 1 | 2 |
| 5 | 11 | 2 | 1 |
| 6 | 12 | 1 | 1 |
| 7 | 12 | 2 | 0 |

Hereinafter, communication methods based on uplink scheduling in a communication network supporting licensed bands and unlicensed bands will be described. Here, an uplink subframe may include PUSCH. For example, an uplink subframe scheduled by an uplink grant may include PUSCH. The uplink grant may be classified into a single-uplink grant and a multi-uplink grant.

FIG. 15 is a conceptual diagram illustrating an embodiment of a subframe scheduled by a single-uplink grant in an unlicensed band.

Referring to FIG. 15, the unlicensed band frame may include six downlink subframes, one special subframe, and three uplink subframes. The uplink subframe may be the same as or similar to the uplink subframe shown in FIG. 10. A single-uplink grant may be an uplink grant scheduling one subframe. For example, a single-uplink grant transmitted through the subframe #0 may schedule the subframe #4, a single-uplink grant transmitted through the subframe #1 may schedule the subframe #5, a single-uplink grant transmitted through the subframe #2 may schedule the subframe #6. That is, the single-uplink grant transmitted through the subframe #n may schedule the subframe #(n+4). FIG. 16 is a conceptual diagram illustrating a first embodiment of a subframe scheduled by a multi-uplink grant in an unlicensed band.

Referring to FIG. 16, an unlicensed band frame may include three downlink subframes, one special subframe, and six uplink subframes. The uplink subframe may be the same as or similar to the uplink subframe shown in FIG. 10. The multi-uplink grant may be an uplink grant scheduling a plurality of subframes. For example, a multi-uplink grant transmitted through the subframe #0 may schedule the subframes #4 to #6. That is, the multi-uplink grant transmitted through the subframe #n may schedule the subframes #(n+4) to #(n+4+($N_{SF}$−1)). Here, the $N_{SF}$ may be the number of subframes scheduled by the multi-uplink grant.

Among the plurality of uplink subframes scheduled by the multi-uplink grant, the first uplink subframe in time domain may be referred to as a 'starting uplink subframe'. For example, the uplink subframe #4 may be a starting uplink subframe. Among the plurality of uplink subframes scheduled by the multi-uplink grant, the last uplink subframe in time domain may be referred to as an 'ending uplink subframe'. For example, the uplink subframe #6 may be an ending uplink subframe.

The multi-uplink grant may be classified into a 'multi-uplink grant type 1' and a 'multi-uplink grant type 2'.

When the multi-uplink grant type 1 is used, a multi-uplink grant that schedules each of a plurality of uplink subframes may be configured. For example, a multi-uplink grant A for scheduling the uplink subframe #4 may be configured, a multi-uplink grant B for scheduling the uplink subframe #5 may be configured, and a multi-uplink grant C for scheduling the uplink subframe #6 may be configured. In this case, each of the multi-uplink grants A, B, and C may be included in a different DCI. For example, the multi-uplink grant A may be included in a first DCI, the multi-uplink grant B may be included in a second DCI, and the multi-uplink grant C may be included in a third DCI. Also, each of the multi-uplink grants A, B, and C may be scrambled based on the same radio network temporary identifier (RNTI), and transmitted through the same subframe #0.

When the multi-uplink grant type 2 is used, a multi-uplink grant that schedules a plurality of uplink subframes may be configured. The multi-uplink grant may include one common field and a plurality of individual fields. For example, the multi-uplink grant may include a common field for the uplink subframes #4 to #6, an individual field A for the uplink subframe #4, an individual field B for the uplink subframe #5, and an individual field C for the uplink subframe #6.

The common field may include at least one parameter commonly used in the plurality of uplink subframes. For example, the common field may include resource block assignment information, a modulation and coding scheme (MCS), a transmit power control (TPC) command, and the like for the uplink subframes #4 to #6. The individual field may be configured for each of the plurality of uplink subframes and may include different parameters used for each of the plurality of uplink subframes. For example, each of the individual fields A, B, and C may include a hybrid automatic repeat request (HARQ) process number, a redundancy version (RV), a new data indicator (NDI), and the like.

Hereinafter, communication methods based on the single-uplink grant in the unlicensed band will be described. The communication methods based on the single-uplink grant may be performed based on the self-carrier scheduling scheme or the cross-carrier scheduling scheme.

FIG. 17 is a sequence chart illustrating a communication method based on a single-uplink grant in an unlicensed band.

Referring to FIG. 17, a base station may be the base station shown in FIGS. 1 to 4, and the terminal may be connected to the base station. Each of the base station and the terminal may support cellular communications (e.g., LTE, LTE-A, LAA, eLAA, etc. defined in the 3GPP standard) and operate in the unlicensed band and the licensed band. Also, each of the base station and the terminal may be the same as or similar to the communication node 500 shown in FIG. 5.

The base station may configure a single-uplink grant (S1700). For example, when a message requesting uplink scheduling is received from a terminal, the base station may configure the single-uplink grant. The base station may configure a single-uplink grant commonly used by a plurality of terminals (e.g., all terminals belonging to the coverage of the base station). Alternatively, the base station may configure a single-uplink grant for each of the terminals. The single-uplink grant may include at least one of the parameters described in Table 6. For example, the at least one parameter described in Table 6 may be included in a DCI for the single-uplink grant and the remaining parameters may be included in another DCI (e.g., DCI other than the DCI for the single-uplink grant). Also, the single-uplink grant may further include parameters as well as the parameters described in Table 6.

TABLE 6

| Parameter | Description |
|---|---|
| Carrier indicator | Carrier indicator for cross-carrier scheduling |
| Resource block assignment information | Assignment information of resource blocks used for uplink transmission |
| Modulation and coding scheme (MCS) | MCS level (or, index) used for uplink transmission |
| Cyclic shift information for DMRS | — |
| Orthogonal cover code (OCC) index | — |
| Transmit power control (TPC) command for scheduled PUSCH | — |
| SRS request | |
| Channel state information (CSI) request | — |
| Hybrid automatic repeat request (HARQ) process number | — |
| Redundancy version (RV) | — |
| New data indicator (NDI) | — |
| Length information | starting position of uplink subframe ending position of uplink subframe |

TABLE 6-continued

| Parameter | Description |
|---|---|
| Channel access related information | Access indicator Channel access procedure type Contention window size Backoff counter Execution time Validity period |

Hereinafter, embodiments of each of 'length information' and 'channel access related information' among the parameters described in Table 6 will be described. Among the parameters described in Table 6, parameters other than the length information and the channel access related information may be used identically to or similarly to the conventional methods.

Length Information

The length of an uplink subframe scheduled by a single-uplink grant may be variably configured. For example, the length of the uplink subframe may be variably configured for performing a channel access procedure. The length information may indicate the length of an uplink subframe scheduled by a single-uplink grant. The length information may indicate at least one of a starting position and an ending position of the uplink subframe. The starting position of the uplink subframe indicated by the length information may be as follows.

FIG. 18 is a conceptual diagram illustrating a first embodiment of a starting position of an uplink subframe, FIG. 19 is a conceptual diagram illustrating a second embodiment of a starting position of an uplink subframe, FIG. 20 is a conceptual diagram illustrating a third embodiment of a starting position of an uplink subframe, and FIG. 21 is a conceptual diagram illustrating a fourth embodiment of a starting position of an uplink subframe.

Referring to FIGS. 18 to 21, an uplink subframe may be the same as or similar to the uplink subframe shown in FIG. 10. In the uplink subframe 1800 of FIG. 18, the starting position of the uplink subframe indicated by the length information may be the symbol #0 of the slot #0. In this case, the terminal may perform a channel access procedure in the symbol #6 of the slot #1 of the previous subframe of the uplink subframe 1800. Alternatively, the terminal may not perform the channel access procedure. If a result of the channel access procedure is determined to be an idle state or a channel access procedure is not performed, the terminal may configure the uplink subframe 1800 including the symbol #0 of the slot #0 to the symbol #6 of the slot #1, and transmit the uplink subframe 1800.

In the uplink subframe 1900 of FIG. 19, the starting position of the uplink subframe indicated by the length information may be a specific time (e.g., 25 μs) in the symbol #0 of the slot #0. In this case, the terminal may perform a channel access procedure for a fixed period (e.g., 25 μs) in the symbol #0 of the slot #0 of the uplink subframe 1900. The terminal may configure the uplink subframe 1900 including the specific time (e.g., 25 μs) in the symbol #0 of the slot #0 to the symbol #6 of the slot #1, and transmit the uplink subframe 1900.

In the uplink subframe 2000 of FIG. 20, the starting position of the uplink subframe indicated by the length information may be a specific time (e.g., (25+TA) μs) in the symbol #0 of the slot #0. Here, TA may indicate a timing advance or other value. The TA may be a maximum value among TAs of all terminals belonging to the cell formed by the base station. Alternatively, the TA may be a maximum value among TAs of terminals receiving the single-uplink grant. The TA may be configured by the base station, and the base station may notify the terminal of the TA. Alternatively, the TA may be preconfigured in the base station and the terminal.

The terminal may perform a channel access procedure for a fixed period (e.g., (25+TA) μs) in the symbol #0 of the slot #0 of the uplink subframe 2000. If a result of the channel access procedure is determined to be an idle state, the terminal may configure the uplink subframe 2000 including the specific time (25+TA) μs in the symbol #0 of the slot #0 to the symbol #6 of the slot #1, and transmit the uplink subframe 2000.

In the uplink subframe 2100 of FIG. 21, the starting position of the uplink subframe indicated by the length information may be the symbol #1 of the slot #0. In this case, the terminal may perform a channel access procedure in the symbol #0 of the slot #0 of the uplink subframe 2100. If a result of the channel access procedure is determined to be an idle state, the terminal may configure the uplink subframe 2100 including the symbol #1 of the slot #0 to the symbol #6 of the slot #1, and transmit the uplink subframe 2100.

The length information indicating the starting position of the uplink subframe may be configured based on Table 7 below.

TABLE 7

| Value | Starting position |
| --- | --- |
| 00 | Symbol #0 |
| 01 | 25 μs in symbol #0 |
| 10 | (25 + TA) μs in symbol #0 |
| 11 | Symbol #1 |

For example, when the length information (e.g., length information indicating the starting position) of the single-uplink grant transmitted through the subframe #0 is set to '00' in FIG. 15, the terminal may determine that the starting position of the subframe #4 is the symbol #0 of the slot #0. When the length information (e.g., length information indicating the starting position) of the single-uplink grant transmitted through the subframe #1 is set to '01', the terminal may determine that the starting position of the subframe #5 is the specific time (e.g., 25 μs) in the symbol #0 of the slot #1 of the subframe #5. When the length information (e.g., length information indicating the starting position) of the single-uplink grant transmitted through the subframe #2 is set to '11', the terminal may determine that the starting position of the subframe #6 is the symbol #1 of the slot #0.

The ending position of the uplink subframe indicated by the length information may be as follows.

FIG. 22 is a conceptual diagram illustrating a first embodiment of an ending position of an uplink subframe, and FIG. 23 is a conceptual diagram illustrating a second embodiment of an ending position of an uplink subframe.

Referring to FIG. 22 and FIG. 23, the ending uplink subframe may be the same as or similar to the uplink subframe shown in FIG. 10. In the uplink subframe 2200 of FIG. 22, the ending position of the uplink subframe indicated by the length information may be the symbol #6 of the slot #1. In this case, the terminal may configure the uplink subframe 2200 including the symbol #0 of the slot #0 to the symbol #6 of the slot #1. In the uplink subframe 2300 of FIG. 23, the ending position of the uplink subframe indicated by the length information may be the symbol #5 of the slot #1. In this case, the terminal may configure the uplink subframe 2300 including the symbol #0 of the slot #0 to the symbol #5 of the slot #1. Also, the terminal may perform a channel access procedure in the symbol #6 of the slot #1 of the uplink subframe 2300, and if a result of the channel connection procedure is determined to be an idle state, the terminal may transmit a subframe subsequent to the uplink subframe 2300.

The length information indicating the ending position of the uplink subframe may be expressed as shown in Table 8 below.

TABLE 8

| Value | Ending position |
| --- | --- |
| 0 | Symbol #6 |
| 1 | Symbol #5 |

For example, when the length information (e.g., length information indicating the ending position) of the single-uplink grant transmitted through the subframe #0 is set to '0' in FIG. 15, the terminal may determine that the ending position of the subframe #4 is the symbol #6 of the slot #1. When the length information (e.g., length information indicating the ending position) of the single-uplink grant transmitted through the subframe #1 is set to '1', the terminal may determine that the ending position of the subframe #5 is the symbol #5 of the slot #1.

Channel Access Related Information

When a single-uplink grant is received, the terminal may identify a channel status by performing a channel access procedure (e.g., a channel sensing procedure) before transmission of an uplink subframe scheduled by the single-uplink grant. The channel access procedure may be an LBT procedure. If the channel status is determined to be an idle state, the terminal may transmit the uplink subframe scheduled by the single-uplink grant. On the other hand, if the channel status is determined to be a busy state, the terminal may not transmit the uplink subframe scheduled by the single-uplink grant.

Alternatively, the channel access procedure may be omitted. For example, if an interval between an ending point of downlink transmission and a starting point of uplink transmission is less than or equal to a preset threshold value, the terminal may perform the uplink transmission without performing a channel access procedure. The preset threshold value may be set variously. For example, the preset threshold value may be 16 μs. In case that the type of data to be transmitted is classified into a 'data type 1' that requires a channel access procedure and 'data type 2' that does not require a channel access procedure, the terminal may transmit data corresponding to the data type 2 without performing a channel access procedure. For example, the terminal may transmit SRS or uplink control information without performing the channel access procedure.

The channel access related information may be configured for performing the channel access procedure. The channel access related information may include an access indicator, a channel access procedure type, a contention window size, a backoff counter, an execution time, a validity period, and the like. The at least one parameter included in the channel access related information may be transmitted to the terminal via a DCI for the single-uplink grant, another DCI (e.g., DCI other than DCI for the single-uplink grant) or RRC signaling.

Access Indicator

The access indicator may indicate whether to perform a channel access procedure. For example, the access indicator set to '0' may request to perform a channel access procedure, and the access indicator set to '1' may request to omit the channel access procedure. When the access indicator requests to perform the channel access procedure, the channel access related information may include at least one of the channel access procedure type, the contention window size, the backoff counter, the execution time, and the validity period. When the access indicator requests omission of the channel access procedure, the channel access related information may not include the channel access procedure type, the contention window size, the backoff counter, the execution time, and the validity period.

In FIG. 15, the access indicator included in the single-uplink grant transmitted through the subframe #0 may indicate whether or not to perform a channel access procedure for transmission of the subframe #4, the access indicator included in the single-uplink grant transmitted through the subframe #1 may indicate whether to perform a channel access procedure for transmission of the subframe #5, and the access indicator included in the single-uplink grant transmitted through the subframe #2 may indicate whether to perform a channel access procedure for transmission of the subframe #6.

Channel Access Procedure Type

The channel access procedure type may be classified into a 'channel access procedure type 1' and a 'channel access procedure type 2'. When the channel access procedure type 1 is used, the terminal may randomly select a backoff counter within a contention window, and if a channel status is idle during a period corresponding to the backoff counter, the terminal may transmit an uplink subframe. Alternatively, the terminal may transmit an uplink subframe if the channel status is idle during 'a period corresponding to the backoff counter+defer duration'. Alternatively, the terminal may transmit an uplink subframe if the channel status is idle during a period corresponding to 'fixed interval+(slot length×backoff counter)'. Here, the slot length may be 9 μs.

When the channel access procedure type 2 is used, the terminal may identify a channel status during a specific period (e.g., 25 μs) and transmit an uplink subframe if the channel status is idle. Alternatively, the terminal may identify the channel status during a period corresponding to 'specific period (e.g., 25 μs)+additional period', and may transmit an uplink subframe if the channel status is idle. Here, the additional period may be TA.

In FIG. 15, the channel access procedure type included in the single-uplink grant transmitted through the subframe #0 may indicate the type of channel access procedure used for transmission of the subframe #4, the channel access procedure type included in the single-uplink grant transmitted through the subframe #1 may indicate the type of channel access procedure used for transmission of the subframe #5, and the channel access procedure type included in the single-uplink grant transmitted through the subframe #2 may indicate the type of channel access procedure used for transmission of the subframe #6.

Contention Window Size

The contention window size may be included in the channel access related information when the channel access procedure type 1 is used. In this case, the terminal may perform a channel access procedure based on the contention window size indicated by the channel access related information. The contention window size may be set by the base station. The contention window size for uplink transmission of the terminal may be set to be the same as the contention window size for downlink transmission of the base station. The base station may configure a contention window size for each terminal.

Setting Contention Window Size Based on HARQ Response

The base station may set the contention window size based on HARQ response (e.g., acknowledgment (ACK), negative ACK (NACK)) for a downlink transmission. When an ACK is received in response to a downlink transmission, the base station may reduce or initialize the contention window size. When a NACK is received in response to a downlink transmission, the base station may increase the contention window size (e.g., increase the contention window size by a factor of two). Here, when a plurality of downlink subframes (e.g., downlink subframe #n to #(n+3)) are transmitted, the base station may adjust the contention window size based on a HARQ response for the first downlink subframe (e.g., the downlink subframe #n) among the plurality of downlink subframes #n to #(n+3). The first downlink subframe (e.g., the downlink subframe #n) may be a downlink subframe transmitted according to the channel access procedure.

Alternatively, the base station may set the contention window size according to a ratio of the HARQ responses. For example, if a ratio of ACKs is greater than or equal to a preset threshold value (or a ratio of NACKs is less than a preset threshold value) among the HARQ responses, the base station may reduce or initialize the contention window size. If the ratio of ACKs is less than a preset threshold value (or the ratio of NACKs is greater than or equal to a preset threshold value) among the HARQ responses, the base station may increase the contention window size (e.g., increase the contention window size by a factor of two).

Setting Contention Window Size Based on Whether an Uplink Subframe is Successfully Received The base station may set the contention window size based on whether or not an uplink subframe has been successfully received. If an uplink subframe is normally received, the base station may reduce or initialize the contention window size. If an uplink subframe is not successfully received, the base station may increase the contention window size (e.g., increase the contention window size by a factor of two). Here, when a plurality of uplink subframes (e.g., uplink subframe #n to #(n+3)) are received, the base station may adjust the contention window size based on whether or not the first uplink subframe (e.g., the uplink subframe #n) among the plurality of uplink subframes #n to #(n+3) is successfully received. The first uplink subframe (e.g., uplink subframe #n) may be an uplink subframe transmitted according to a channel access procedure.

Alternatively, the base station may set the contention window size according to a reception success ratio of uplink subframes. For example, if the reception success rate of uplink subframes is greater than or equal to a preset threshold value, the base station may reduce or initialize the contention window size. If the reception success rate of uplink subframes is less than a preset threshold value, the base station may increase the contention window size (e.g., increase the contention window size by a factor of two).

Setting Contention Window Size Based on Channel Access Priority

The contention window size may be determined based on a channel access priority. For example, the base station may determine the contention window size based on Table 9. $CW_{min}$ may indicate the minimum value of the contention window in a given channel access priority order, and $CW_{max}$ may indicate the maximum value of the contention window in the given channel access priority. Meanwhile, if the contention window size is not included in the channel access related information, the terminal may determine the contention window size based on Table 9.

TABLE 9

| Channel access priority | $CW_{min}$ | $CW_{max}$ |
|---|---|---|
| 1 | 3 | 7 |
| 2 | 7 | 15 |
| 3 | 15 | 1023 |
| 4 | 15 | 1023 |

Alternatively, the base station may transmit other information to the terminal instead of the contention window size. Other information may be included in the channel access related information instead of the contention window size. For example, the base station may transmit to the terminal information indicating increase, decrease or minimization of the contention window size. In this case, the terminal may set the contention window size based on the information received from the base station, and may perform a channel access procedure based on the set contention window size.

Alternatively, the base station may transmit an HARQ response (e.g., ACK, NACK) to the terminal in response to an uplink subframe received from the terminal. In this case, the terminal may set the contention window size based on the HARQ response received from the base station. In case that an ACK is received in response to the uplink subframe, the terminal may reduce or initialize the contention window size, and in case that a NACK is received in response to the uplink subframe, the terminal may increase the contention window size. The terminal may perform a channel access procedure based on the set contention window size.

Alternatively, the base station may transmit an NDI for a HARQ process number to the terminal in response to an uplink subframe received from the terminal. In this case, the terminal may set the contention window size based on the NDI received from the base station. For example, when the uplink subframe is normally received, the base station may set the NDI for the HARQ process number of the uplink subframe to '1', and transmit the HARQ process number for the corresponding uplink subframe and the NDI set to '1' to the terminal. The terminal receiving the HARQ process number of the corresponding uplink subframe and the NDI set to '1' may determine that the uplink subframe has been normally received by the base station and may reduce or minimize the contention window size. When the uplink subframe is not normally received, the base station may set the NDI for the HARQ process number of the corresponding uplink subframe to '0', and transmit the HARQ process number of the corresponding uplink subframe and the NDI set to '0' to the terminal. The terminal receiving the HARQ process number of the corresponding uplink subframe and the NDI set to '0' may determine that the uplink subframe is not normally received by the base station and may increase the contention window size.

Meanwhile, a reference subframe used for determining the contention window size (e.g., increasing, decreasing or minimizing the contention window size) may be a subframe of the latest uplink subframe among the uplink subframes received from the terminal. Also, the reference subframe may be the first uplink subframe among consecutive uplink subframes received from the terminal. Also, the reference subframe may be an uplink subframe transmitted based on the channel connection procedure type 1.

For example, when the terminal transmits uplink subframes #0 to #2, the uplink subframe #0 may be used to determine the contention window size. That is, the reference subframe may be the uplink subframe #0. In this case, the base station may transmit a response on whether or not the uplink subframe #0 has been normally received (e.g., HARQ process number and NDI of the uplink subframe #0) to the terminal, and the terminal may determine the contention window size based on the HARQ process number and the NDI of the uplink subframe #0.

Backoff Counter

The backoff counter may be included in the channel access related information when the channel access procedure type 1 is used. The base station may randomly select a backoff counter within the contention window set according to the manner described above. The base station may set a backoff counter for each of the terminals. Alternatively, the backoff counter may not be included in the channel access related information. In this case, the terminal may randomly select the backoff counter within the contention window (e.g., the contention window indicated by the channel access related information).

Execution Time

The execution time may indicate when the channel access procedure is performed. For example, the channel access procedure may be performed in an uplink subframe, a guard period (for example, the guard period shown in FIG. 14), or an uplink transmission period (e.g., the uplink transmission period shown in FIG. 14). The execution time may be set based on Table 10.

TABLE 10

| Value | Description |
|---|---|
| 00 | Symbol #0 of slot #0 in uplink subframe |
| 01 | Symbol #6 of slot #1 in uplink subframe |
| 10 | Guard period in special subframe |
| 11 | Uplink transmission period in subframe |

When the execution time of the channel access procedure indicates '00', the terminal may perform the channel access procedure (e.g. channel access procedure type 1 or channel access procedure type 2) in the symbol #0 of the slot #0 in the subframe #(n+1) scheduled by the single-uplink grant received through the subframe #n. When the execution time of the channel access procedure indicates '01', the terminal may perform the channel access procedure (e.g. channel access procedure type 1 or channel access procedure type 2) in the symbol #6 of the slot #1 in the previous subframe #(n+1-1) of the subframe #(n+1) scheduled by the single-uplink grant received through the subframe #n. When the execution time of the channel access procedure indicates '10', the terminal may perform the channel access procedure (e g channel access procedure type 1 or channel access procedure type 2) in the guard period of the subframe #(n+1) scheduled by the single-uplink grant received through the subframe #n (or, in the guard period of the subframe #(n+1-1)). When the execution time of the channel access procedure indicates '11', the terminal may perform the channel access procedure (e.g. channel access procedure type 1 or channel access procedure type 2) in the uplink transmission period of the subframe #(n+1) scheduled by the single-uplink grant received through the subframe #n (or, in the uplink transmission period of the subframe #(n+1-1)).

In the guard period, the channel access procedure may be performed as follows. Also, the channel access procedure in the uplink transmission period may be performed in the same or similar manner as the channel access procedure in the guard period described below. Alternatively, the channel access procedure in the uplink transmission period may be performed in the same or similar manner as the channel access procedure according to each of the channel access procedure type 1 and the channel access procedure type 2.

FIG. 24 is a conceptual diagram illustrating a first embodiment of a channel access procedure performed in a guard period.

Referring to FIG. 24, when the execution time of the channel access procedure indicates '10', the terminal may perform the channel access procedure (e.g., channel access procedure type 1 or channel access procedure type 2) at $T_1$ of the guard period. For example, the terminal may perform the channel access procedure during '$T_2$-$T_1$'. In this case, the base station may notify the terminal of $T_1$ (or an offset between $T_1$ and $T_2$) via a DCI (e.g., DCI for the single-uplink grant) or a broadcast channel.

FIG. 25 is a conceptual diagram illustrating a second embodiment of a channel access procedure performed in a guard period.

Referring to FIG. 25, when the execution time of the channel access procedure indicates '10', the terminal may perform the channel access procedure (e.g., channel access procedure type 1 or channel access procedure type 2) at $T_1$ of the guard period. For example, the terminal may perform the channel access procedure during '$T_2$-$T_1$'. In this case, the base station may notify the terminal of $T_1$ (or an offset between $T_1$ and $T_3$) and $T_2$ (or an offset between $T_2$ and $T_3$) via a DCI (e.g., DCI for the single-uplink grant) or a broadcast channel Here, the offset between $T_2$ and $T_3$ may be TA. The TA may be the maximum value among TAs of all the terminals belonging to the cell formed by the base station. Alternatively, the TA may be the maximum value among TAs of terminals receiving the single-uplink grant. The TA may be set by the base station, and the base station may notify the terminal of the TA. Alternatively, the TA may be preconfigured in the base station and the terminal.

In the embodiments shown in FIGS. 24 and 25, if a result of the channel access procedure performed in the guard period is determined to be an idle state and the uplink transmission period includes two symbols, the terminal may transmit SRS or PRACH through the first symbol of the uplink transmission period, and may transmit SRS through the second symbol of the uplink transmission period. If the result of the channel access procedure performed in the guard period is determined to be an idle state and the uplink transmission period includes one symbol, the terminal may transmit SRS in the uplink transmission period. If the result of the channel access procedure performed in the guard period is determined to be an idle state and the uplink transmission period is not included in the special subframe, the terminal may perform the uplink transmission through an uplink subframe subsequent to the special subframe.

Meanwhile, the channel access related information may include an ending time and an execution period of the channel access procedure instead of the execution time. In this case, the terminal may estimate the execution time based on the ending time and the execution period of the channel access procedure, and may perform the channel access procedure at the estimated execution time.

Alternatively, the execution time may be deduced based on the length information included in the single-uplink grant (or DCI). In this case, the channel access related information may not include the execution time. For example, when the length information is set to one of '01', '10', and '11' in Table 7, the terminal may determine that the execution time of the channel access procedure is the symbol #0 of the slot #0 of the subframe #(n+1) scheduled by the single-uplink grant received through the subframe #n. When the length information is set to '1' in Table 8, the terminal may determine that the channel access procedure is performed in the symbol #6 of the slot #1 of the previous subframe #(n+1−1) of the subframe #(n+1) scheduled by the single-uplink grant received through the subframe #n.

Embodiments of the execution time of performing the channel access procedure according to the above-described methods may be as follows.

FIG. 26 is a conceptual diagram illustrating a first embodiment of an execution time at which a channel access procedure is performed.

Referring to FIG. 26, the channel access procedure may be performed in the symbol #0 of the slot #0 of the subframe #n, and when the channel status is determined to be in an idle state by the channel access procedure, the terminal may transmit the subframe #n including the symbol #1 of the slot #0 to the symbol #6 of the slot #1. The subframe #(n+1) including the symbol #0 of the slot #0 to the symbol #6 of the slot #1 may be transmitted without performing a channel access procedure. The channel access procedure may be performed in the symbol #0 of the slot #0 of the subframe #(n+2), and when the channel status is determined to be in an idle state by the channel access procedure, the terminal may transmit the subframe #(n+2) including the symbol the symbol #1 of the slot #0 to the symbol #6 of the slot #1.

FIG. 27 is a conceptual diagram illustrating a second embodiment of an execution time at which a channel access procedure is performed.

Referring to FIG. 27, the channel access procedure may be performed in the symbol #0 of the slot #0 of the subframe #n, and when the channel status is determined to be in an idle state by the channel access procedure, the terminal may transmit the subframe #n including the symbol #1 of the slot #0 to the symbol #5 of the slot #1. The channel access procedure may be performed in the symbol #6 of the slot #1 of the subframe #n and the symbol #0 of the slot #01 of the subframe #(n+1), and when the channel status is determined to be in an idle state by the channel access procedure, the terminal may transmit the subframe #(n+1) including the symbol #1 of the slot #0 to the symbol #6 of the slot #1. The channel access procedure may be performed in the symbol #0 of the slot #0 of the subframe #(n+2), and when the channel status is determined to be in an idle state by the channel access procedure, the terminal may transmit the subframe #(n+2) including the symbol #1 of the slot #0 to the symbol #6 of the slot #1.

FIG. 28 is a conceptual diagram illustrating a third embodiment of an execution time at which a channel access procedure is performed.

Referring to FIG. 28, the channel access procedure may be performed in the symbol #6 of the slot #1 of the subframe #(n−1) (not shown), and when the channel status is determined to be in an idle state by the channel access procedure, the terminal may transmit the subframe #n including the symbol #0 of the slot #0 to the symbol #5 of the slot #1. The channel access procedure may be performed in the symbol #6 of the slot #1 of the subframe #n, and when the channel status is determined to be in an idle state by the channel access procedure, the terminal may transmit the subframe #(n+1) including the symbol #0 of the slot #0 to the symbol #5 of the slot #1. The channel access procedure may be performed in the symbol #6 of the slot #1 of the subframe #(n+1), and when the channel status is determined to be in an idle state by the channel access procedure, the terminal may transmit the subframe #(n+2) including the symbol #0 of the slot #0 to the symbol #6 of the slot #1.

Validity Period

The validity period may indicate a period during which channel access related information (e.g., the access indicator, the channel access procedure type, the contention window size, the backoff counter, and the execution time) is effectively used. For example, when the validity period included in the channel access related information of the single-uplink grant transmitted through the subframe #n is set to '00', the channel access related information of the single-uplink grant transmitted through the subframe #n can be effectively used for transmission of the subframe #(n+1).

When the validity period included in the channel access related information of the single-uplink grant transmitted through the subframe #n is set to '01', the channel access related information of the single-uplink grant transmitted through the subframe #n can be effectively used for transmission of the subframe #(n+1) and #(n+1+1). In this case, the single-uplink grant scheduling the subframe #(n+1+1) may not include channel access related information, and the terminal may transmit the subframe #(n+1+1) based on the channel access related information included in the single-uplink grant transmitted through the subframe #n.

When the validity period included in the channel access related information of the single-uplink grant transmitted through the subframe #n is set to '10', the channel access related information of the single-uplink grant transmitted through the subframe #n can be effectively used for transmission of the subframes #(n+1) to #(n+1+2). In this case, the single-uplink grant scheduling for each of the subframe #(n+1+1) and #(n+1+2) may not include channel access related information, and the terminal may transmit the subframe #(n+1+1) and #(n+1+2) based on the channel access related information included in the single-uplink grant transmitted through the subframe #n.

When the validity period included in the channel access related information of the single-uplink grant transmitted through the subframe #n is set to '11', the channel access related information of the single-uplink grant transmitted through the subframe #n can be effectively used for transmission of the subframes #(n+1) to #(n+1+3). In this case, the single-uplink grant scheduling for each of the subframes #(n+1+1) to #(n+1+3) may not include channel access related information, and the terminal may transmit the subframes #(n+1+1) to #(n+1+3) based on the channel access related information included in the single-uplink grant transmitted through the subframe #n.

On the other hand, when new channel access related information is not received, the terminal may perform uplink transmission based on the latest channel access related information. For example, if the single-uplink grant that schedules the subframe #(n+1) is received through the subframe #n and the single-uplink grant that schedules the subframe #(n+1+3) is received through the subframe #(n+3), the terminal may transmit the subframes #(n+1) and #(n+2) based on the channel access related information included in the single-uplink grant received through the subframe #n.

Also, the channel access related information may further include the execution period. The execution period may indicate a period during which the channel access procedure is performed. For example, the execution period set to '00' may indicate that no execution period exists. The execution period set to '01' may indicate that the channel access procedure is performed during one symbol. The execution period set to '10' may indicate that the channel access procedure is performed during two symbols. The execution period set to '11' may indicate that the channel access procedure is performed during three symbols.

Referring again to FIG. 17, when a DCI (e.g., a common DCI) is generated that includes a single-uplink grant commonly used by a plurality of terminals (e.g., all terminals that are within the coverage of the base station), the base station may scramble the DCI based on a common RNTI. Here, the common RNTI may be an RNTI commonly used in a cell formed by the base station. The base station may transmit the scrambled DCI through at least one of PDCCH and EPDCCH (S1710). Here, the scrambled DCI may be transmitted via a common search space. Alternatively, when a DCI (e.g., a specific DCI) is generated that includes a single-uplink grant for each of the terminals, the base station may scramble the DCI based on a cell-RNTI (C-RNTI) (e.g., a UE-specific RNTI). The base station may transmit the scrambled DCI through at least one of PDCCH and EPDCCH (S1710). Here, the scrambled DCI may be transmitted through a UE-specific search space. The single-uplink grant scheduling subframe #(n+1) may be transmitted through the subframe #n. Here, l may be an integer equal to or greater than zero. For example, l may be 4. The format of the DCI including the single-uplink grant may be 0A, 0B, 4A, or 4B.

The terminal may receive the single-uplink grant (e.g., DCI for the single-uplink grant) by monitoring at least one of the PDCCH and the EPDCCH. For example, the terminal may acquire the DCI including the single-uplink grant commonly used by the plurality of terminals (e.g., all terminals belonging to the coverage of the base station) by monitoring the common search space, and obtain the single-uplink grant by descrambling the DCI based on the common RNTI. Alternatively, the terminal may acquire the DCI including the single-uplink grant configured for each of the terminals by monitoring the UE-specific search space, and obtain the single-uplink grant by descrambling the corresponding DCI based on the C-RNTI.

The terminal may identify the parameters included in the single-uplink grant (S1720). For example, the terminal may identify an access indicator, a channel access procedure type, a contention window size, a backoff counter, an execution time, and a validity period based on channel access related information included in the single-uplink grant. The execution time of the channel access procedure may be identified based on at least one of the length information included in the single-uplink grant and the channel access related information. The execution time at which the channel access procedure is performed may be a guard period of a special subframe, an uplink transmission period of a special subframe, or an uplink subframe.

When the execution of the channel access procedure is requested, the terminal may perform the channel access procedure at the identified execution time. For example, the terminal may randomly select a backoff counter within the contention window and may check a channel status during a period based on the selected backoff counter. Alternatively, the terminal may check a channel status during a fixed period. The terminal may configure a subframe based on the parameter (e.g., length information, channel access related information) included in the single-uplink grant when the channel status is determined to be in the idle state or when the channel access procedure is not requested. The UE terminal transmit the configure subframe #(n+1) to the base station based on the single-uplink grant received via the subframe #n (S1730). The base station may receive the subframe #(n+1) based on the single-uplink grant transmitted through the subframe #n. After the uplink transmission is completed, the corresponding channel may be used by another communication node. Alternatively, each of the base station and the terminal may transmit another unlicensed band frame based on a channel access procedure.

Meanwhile, the channel access procedure described above may be performed by a terminal receiving an SRS trigger (e.g., the SRS request in Table 6) as well as the terminal receiving the single-uplink grant, and the terminal may transmit SRS when a channel status is determined to be in the idle state by the channel access procedure. The SRS may be transmitted through the uplink transmission period in the special subframe of the unlicensed band.

Then, communication methods based on a multi-uplink grant in the unlicensed band will be described. The communication methods based on the multi-uplink grant may be performed based on the self-carrier scheduling scheme or the cross-carrier scheduling scheme.

FIG. 29 is a sequence chart illustrating a communication method based on a multi-uplink grant in an unlicensed band.

Referring to FIG. 29, a base station may be the base station shown in FIGS. 1 to 4, and the terminal may be connected to the base station. Each of the base station and the terminal may support cellular communications (e.g., LTE, LTE-A, LAA, eLAA, etc. defined in the 3GPP standard) and operate in the unlicensed band and the licensed band. Also, each of the base station and the terminal may be the same as or similar to the communication node 500 shown in FIG. 5.

The base station may inform the terminal of the scheduling of transmission of a plurality of uplink subframes by a multi-uplink grant through an upper layer signaling (e.g., RRC signaling) (S2900). The scheduling of the uplink transmission based on the multi-uplink grant may be necessary in a specific situation (e.g., when the number of uplink subframes is larger than the number of downlink subframes), and thus the step S2900 may be performed for this case.

Also, the base station may inform the terminal through an upper layer signaling (e.g., RRC signaling) of a multi-uplink grant type, the maximum number of uplink subframes that can be scheduled by a multi-uplink grant, and the like. The maximum number of uplink subframes that can be scheduled by the multi-uplink grant may be referred to as '$M_{SF}$'. The $M_{SF}$ may be an integer greater than or equal to zero. For example, the $M_{SF}$ may be 4.

The terminal may identify that the transmission of a plurality of uplink subframes is scheduled by a multi-uplink grant through the upper layer signaling (e.g., RRC signaling). In this case, the terminal may activate a receiving function of the multi-uplink grant that schedules a plurality of uplink subframes. Also, the terminal may identify the multi-uplink grant type (e.g., type 1 or type 2), the $M_{SF}$, etc. through the upper layer signaling (e.g., RRC signaling).

Meanwhile, if the uplink transmission is required, the terminal may transmit to the base station a message requesting scheduling of uplink transmission to the base station (S2910). The message for requesting the scheduling of the uplink transmission may include an indicator indicating that the terminal supports the multi-uplink grant, the multi-uplink grant type, and the like. When the scheduling of the uplink transmission is requested from the terminal, the base station may configure an uplink grant (S2920). If the terminal supports the multi-uplink grant, the base station may determine the multi-uplink grant type and may configure the multi-uplink grant based on the determined type. The multi-uplink grant type may be determined according to the request of the terminal. The base station may configure a multi-uplink grant commonly used by a plurality of terminals (e.g., all terminals belonging to the coverage of the base station). Alternatively, the base station may configure a multi-uplink grant used by each of the terminals.

The number of uplink subframes scheduled by the multi-uplink grant may be equal to or less than the $M_{SF}$. The uplink subframes scheduled by the multi-uplink grant may be consecutive uplink subframes in time domain. For example, the consecutive uplink subframes #2 to #7 shown in FIG. 16 can be scheduled by a multi-uplink grant.

The multi-uplink grant may include at least one parameter described in Table 6 and Table 11. Also, the multi-uplink grant may further include necessary parameters as well as the parameters described in Table 6 and Table 11.

TABLE 11

| Parameter | Description |
|---|---|
| $N_{SF}$ | The number of uplink subframes scheduled by a multi-uplink grant |
| l | Interval between a transmission time of a multi-uplink grant (e.g., subframe #n) and a transmission time of a starting uplink subframe (e.g., subframe #(n + 1) |
| k | Scheduling delay offset from subframe #(n + 1) when a multi-uplink grant is transmitted via subframe #n |
| i | Index of each uplink subframe scheduled by a multi-uplink grant (e.g., i = 0, 1, . . . ,($N_{SF}$ − 1)) |
| SRS index | Uplink subframe through which SRS is transmitted |
| Validity indicator | A period during which a multi-uplink grant is applied |

In FIG. 16, when a 'multi-uplink grant type 1' is used, a multi-uplink grant A for scheduling the uplink subframe #4 may be configured, and the multi-uplink grant A may include at least one of the parameters described in Table 6 and Table 11. A multi-uplink grant B for scheduling the uplink subframe #5 may be configured, and the multi-uplink grant B may include at least one of the parameters described in Table 6 and Table 11. A multi-uplink grant C for scheduling the uplink subframe #6 may be configured, and the multi-uplink grant C may include at least one of the parameters described in Table 6 and Table 11.

In FIG. 16, when a 'multi-uplink grant type 2' is used, a multi-uplink grant including a common field and a plurality of individual fields may be configured. The common field may include at least one parameter commonly used by the uplink subframes #4 to #6 among the parameters described in Table 6 and Table 11. Each of the individual fields may comprise different parameters used for each of the uplink subframes #4 to #6 among the parameters described in Table 6 and Table 11. An individual field A for the uplink subframe #4 may be configured, an individual field B for the uplink subframe #5 may be configured, and an individual field C for the uplink subframe #6 may be configured. For example, at least one of HARQ process number, RV, NDI, k, i, length information, channel access related information, and SRS index among the parameters described in Table 6 and Table 11 may be included in each of the individual fields A, B, and C. Among the parameters listed in Table 6 and Table 11, the remaining parameters (e.g., MCS, resource block assignment information, TPC command, etc.) except for the at least one parameter included in the individual field may be included in the common field. The types of parameters included in the common field and the individual fields of the multi-uplink grant are not limited to the above-described examples, and may be variously configured.

Hereinafter, embodiments of each of the parameters described in Table 6 and Table 11 when the multi-uplink grant type 1 is used or when the multi-uplink grant type 2 is used will be described. Among the parameters described in Table 6 and Table 11, the parameters not described below may be used in the same way as or similarly to the conventional methods.

HARQ Process Number

When the multi-uplink grant type 1 is used, a HARQ process number may be included in a multi-uplink grant. In FIG. 16, a HARQ process number of the uplink subframe #4 may be included in the multi-uplink grant A, a HARQ process number of the uplink subframe #5 may be included in the multi-uplink grant B, and a HARQ process number of the uplink subframe #6 may be included in the multi-uplink grant C. Therefore, the terminal may identify the HARQ process numbers of the uplink subframes #4 to #6 based on the multi-uplink grants A, B, and C, respectively.

Alternatively, only the HARQ process number of the starting uplink subframe (e.g., the uplink subframe #4) among the plurality of uplink subframes scheduled by the multi-uplink grant may be transmitted through the multi-uplink grant A, and the HARQ process numbers of the remaining uplink subframes (e.g., the uplink subframes #5 and #6) may not be transmitted through the corresponding uplink grant (e.g., the multi-uplink grants B and C). In this case, the terminal may identify the HARQ process number of the uplink subframe #4 based on the multi-uplink grant A, and deduce the HARQ process numbers of the remaining uplink subframes (e.g., the uplink subframes #5 and #6) using the HARQ process number of the starting uplink subframe (e.g., the uplink subframe #4). The HARQ process number may increase according to the increase of the uplink subframe number, and when the HARQ process number of the uplink subframe #4 obtained through the multi-uplink grant A is x, the HARQ process number of the uplink subframe #5 may be deduced to be (x+1), and the HARQ process number of the uplink subframe #6 may be deduced to be (x+2). In this case, the terminal may deduce the HARQ processor numbers using i described in Table 11. When the maximum value of the HARQ process number is y, the terminal may determine the HARQ process number of the uplink subframe #4 using 'x mod y', determine the HARQ process number of the uplink subframe #5 using '(x+1) mod y', and determine the HARQ process number of the uplink subframe #6 using '(x+2) mod y'. Here, y may be preset in the base station and the terminal. For example, the base station may inform y to the terminal through an upper layer signaling (e.g., RRC signaling), and y may be 16.

Alternatively, an actual value of the HARQ process number of the starting uplink subframe (e.g., the uplink subframe #4) among the plurality of uplink subframes scheduled by the multi-uplink grant may be transmitted through the multi-uplink grant A, and an offset (hereinafter referred to as '$H_{off}$') to the HARQ process number of the starting uplink subframe (e.g., the uplink subframe #4) may be transmitted through the corresponding multi-uplink grant (e.g., the multi-uplink grants B and C). In this case, the terminal may use $H_{off}$ and the HARQ process number of the staring uplink subframe (e.g., the uplink subframe #4) among the plurality of uplink subframes scheduled by the multi-uplink grant to deduce HARQ process numbers of the remaining subframes (e.g., the uplink subframes #5 and #6). Here, $H_{off}$ may be set to 0, 1, 2, . . . , $N_{SF}$−1.

When the HARQ process number of the uplink subframe #4 is x and the $H_{off}$ included in the multi-uplink grant B is 1, the HARQ processor number of the uplink subframe #5 may be deduced to be (x+1). When the HARQ subframe number of the uplink subframe #4 is x and the $H_{off}$ included in the multi-uplink grant C is 2, the HARQ processor number of the uplink subframe #6 may be deduced to be (x+2). On the other hand, when the maximum value of the HARQ process number is y, the terminal may determine the HARQ process number of the uplink subframe #4 using 'x mod y', determine the HARQ process number of the uplink subframe #5 using '(x+$H_{off}$ (i.e., 1)) mod y', and determine the HARQ process number of the uplink subframe #6 using '(x+$H_{off}$ (i.e., 2)) mod y'.

When the multi-uplink grant type 2 is used, the HARQ process number may be included in the individual fields of the multi-uplink grant. In FIG. 16, the HARQ process number of the uplink subframe #4 may be included in the individual field A of the multi-uplink grant, the HARQ process number of the uplink subframe #5 may be included in the individual field B of the multi-uplink grant, and the HARQ process number of the uplink subframe #6 may be included in the individual field C of the multi-uplink grant. Therefore, the terminal may identify the HARQ process numbers of the uplink subframes #4 to #6 based on the individual fields A, B, and C, respectively.

Alternatively, only the HARQ process number of the starting uplink subframe (e.g., the uplink subframe #4) among the plurality of uplink subframes scheduled by the multi-uplink grant may be transmitted through the individual field A of the multi-uplink grant, and the HARQ process numbers of the remaining uplink subframes (e.g., the uplink subframes #5 and #6) may not be transmitted through the corresponding individual fields (e.g., the individual fields B and C). In this case, the terminal may identify the HARQ process number of the uplink subframe #4 based on the multi-uplink grant A, and deduce the HARQ process numbers of the remaining uplink subframes (e.g., the uplink subframes #5 and #6) using the HARQ process number of the starting uplink subframe (e.g., the uplink subframe #4).

The HARQ process number may increase according to the increase of the uplink subframe number, and when the HARQ process number of the uplink subframe #4 obtained through the individual field A (or, the common field) of the multi-uplink grant is x, the HARQ process number of the uplink subframe #5 may be deduced to be (x+1), and the HARQ process number of the uplink subframe #6 may be deduced to be (x+2). Meanwhile, when the maximum value of the HARQ process number is y, the terminal may determine the HARQ process number of the uplink subframe #4 using 'x mod y', determine the HARQ process number of the uplink subframe #5 using '(x+1) mod y', and determine the HARQ process number of the uplink subframe #6 using '(x+2) mod y'. Here, y may be preset in the base station and the terminal. For example, the base station may inform y to the terminal through an upper layer signaling (e.g., RRC signaling), and y may be 16.

Alternatively, an actual value of the HARQ process number of the starting uplink subframe (e.g., the uplink subframe #4) among the plurality of uplink subframes scheduled by the multi-uplink grant may be transmitted through the individual field A (or, the common field) of the multi-uplink grant, and an offset (hereinafter referred to as '$H_{off}$') to the HARQ process number of the starting uplink subframe (e.g., the uplink subframe #4) may be transmitted through the corresponding individual fields (e.g., the individual fields A, B, and C) of the multi-uplink grant.

In this case, the terminal may use $H_{off}$ and the HARQ process number of the staring uplink subframe (e.g., the uplink subframe #4) among the plurality of uplink subframes scheduled by the multi-uplink grant to deduce HARQ process numbers of the remaining subframes (e.g., the uplink subframes #5 and #6). Here, $H_{off}$ may be set to 0, 1, 2, . . . , $N_{SF}$−1.

When the HARQ process number of the uplink subframe #4 is x and the $H_{off}$ included in the individual field B is 1, the HARQ processor number of the uplink subframe #5 may be deduced to be (x+1). When the HARQ subframe number of the uplink subframe #4 is x and the $H_{off}$ included in the individual field C is 2, the HARQ processor number of the uplink subframe #6 may be deduced to be (x+2). On the other hand, when the maximum value of the HARQ process number is y, the terminal may determine the HARQ process number of the uplink subframe #4 using 'x mod y', determine the HARQ process number of the uplink subframe #5 using '(x+$H_{off}$ (i.e., 1)) mod y', and determine the HARQ process number of the uplink subframe #6 using '(x+$H_{off}$ (i.e., 2)) mod y'.

Based on the above-described scheme, the base station may inform the terminal of the HARQ process number, and the terminal may identify the HARQ process number based on the information included in the multi-uplink grant.

RV

When the multi-uplink grant type 1 is used, the RV may be included in the multi-uplink grant. In FIG. 16, the RV may be included in each of the multi-uplink grants A, B, and C. Therefore, the terminal may identify the RVs of the uplink subframes #4 to #6 based on the multi-uplink grants A, B, and C, respectively.

When the multi-uplink grant type 2 is used, the RV may be included in the common field or the individual fields of the multi-uplink grant. In FIG. 16, when the same RV is used in the uplink subframes #4 to #6, the corresponding RV may be included in the common field of the multi-uplink grant. Therefore, the terminal may identify the RVs for the uplink subframes #4 to #6 based on the common field. Alternatively, when different RVs are used in the respective uplink subframes #4 to #6, the RV for the uplink subframe #4 may be included in the individual field A, the RV for the uplink subframe #5 may be included in the individual field B, and the RV for the uplink subframe #6 may be included in the individual field C. Therefore, the terminal may identify the RVs of the uplink subframes #4 to #6 on the basis of the individual fields A, B and C, respectively.

Alternatively, the RV may be deduced based on the NDI. In this case, the RV may not be included in the multi-uplink grant. For example, a change order of the RV may be predefined, the RV may be set according to the predefined change order when the NDI is '0', and the RV may be initialized to an initial value (e.g., '0') when the NDI is '1'. In case that the predefined change order is '0→2→1', once the multi-uplink grant (or individual field) including the NDI set to '0' is received, the RV of the uplink subframe may be set to 2, and if the multi-uplink grant (or individual field) including the NDI set to '0' is received twice, the RV of the uplink subframe may be set to '1'.

In case that the multi-uplink grant type 1 is used, when the multi-uplink grant A includes the NDI set to '1', the terminal may set the RV of the uplink subframe #4 to the initial value (e.g., '0'). When the multi-uplink grant B includes the NDI set to '0', the terminal may set the RV of the uplink subframe #5 to '2'. When the multi-uplink grant C includes the NDI set to '0', the terminal may set the RV of the uplink subframe #6 to '2'.

In case that the multi-uplink grant type 2 is used, when the individual field A includes the NDI set to '1', the terminal may set the RV of the uplink subframe #4 to the initial value (e.g., '0'). When the individual field B includes the NDI set to '0', the terminal may set the RV of the uplink subframe #5 to '2'. When the individual field C includes the NDI set to '0', the terminal may set the RV of the uplink subframe #6 to '2'.

Based on the above-described schemes, the base station may inform the terminal of the RV, and the terminal may identify the RV based on the information included in the multi-uplink grant.

$N_{SF}$

The $N_{SF}$ may indicate the number of uplink subframes scheduled by the multi-uplink grant. The $N_{SF}$ may be set below the $M_{SF}$.

When the multi-uplink grant type 1 is used, the $N_{SF}$ may be included in the multi-uplink grant. In FIG. 16, the $N_{SF}$ may be included in each of the multi-uplink grants A, B, and C. Alternatively, since the same $N_{SF}$ is configured for the uplink subframes #4 to #6, the $N_{SF}$ may be included only in the multi-uplink grant A. Alternatively, the $N_{SF}$ may not be included in each of the multi-uplink grants A, B, and C. In this case, the $N_{SF}$ may be preset in the base station and the terminal. When the multi-uplink grant type 2 is used, the $N_{SF}$ may be included in the common field of the multi-uplink grant. In FIG. 16, the $N_{SF}$ may be included in the common field of the multi-uplink grant that schedules the uplink subframes #4 to #6.

The number of uplink subframes scheduled by the multi-uplink grant may be deduced based on the HARQ process number and the NDI instead of the $N_{SF}$. In this case, the $N_{SF}$ may not be included in the multi-uplink grant.

For example, the number of uplink subframes scheduled by the multi-uplink grant may be deduced based on a valid HARQ process number. In FIG. 16, when the HARQ process number of the uplink subframe #4 is x, the HARQ process number of the uplink subframe #5 is (x+1), the HARQ process number of the uplink subframe #6 is (x+2), and the HARQ process number of the uplink subframe #7 is x, the HARQ process number of the uplink subframe #4 may be the same as the HARQ process number of the uplink subframe #7. That is, when $M_{SF}$ is 4 and $N_{SF}$ is 3, the multi-uplink grant may include a field indicating the HARQ process number of the uplink subframe #7. In this case, the base station may configure the HARQ process number of the uplink subframe #7 to be the same as the HARQ process number (e.g., x, (x+1), or (x+2)) of one uplink subframe among the previous uplink subframes #4 to #6.

When there are a plurality of uplink subframes having the same HARQ process number, the terminal may determine a first uplink subframe in time domain among the plurality of uplink subframes having the same HARQ process number as an effective uplink subframe. Accordingly, the terminal may determine the uplink subframe #4 before the uplink subframe #7 as the effective uplink subframe. The terminal may determine that the uplink subframes #4 to #6 are scheduled by the multi-uplink grant and that the uplink subframe #7 is not scheduled by the multi-uplink grant. In this case, since the effective uplink subframes determined based on the HARQ process number are the uplink subframes #4 to #6, the terminal may determine that the multi-uplink grant schedules 3 uplink subframes.

Alternatively, the number of uplink subframes scheduled by the multi-uplink grant may be deduced based on the HARQ process number and the NDI. That is, the NDI may be further considered to deduce the number of uplink subframes scheduled by the multi-uplink grant.

In the example described above, the NDI of at least one uplink subframe excluding the first uplink subframe among the plurality of uplink subframes having the same HARQ process number may be identified. The terminal may determine that the uplink subframe including the NDI set to '0' is scheduled by the multi-uplink grant, and determine that the uplink subframe including the NDI set to '1' it is not scheduled by the multi-uplink grant. For example, when the NDI for the uplink subframe #7 is set to '0', the terminal may determine that the uplink subframe #7 is scheduled by the multi-uplink grant. Therefore, the terminal may determine that the multi-uplink grant schedules 4 uplink subframes. Alternatively, if the NDI for the uplink subframe #7 is set to '1', the terminal may determine that the uplink subframe #7 is not scheduled by the multi-uplink grant. Therefore, the terminal may determine that the multi-uplink grant schedules 3 uplink subframes.

Based on the schemes described above, the base station may inform the terminal of the number of uplink subframes scheduled by the multi-uplink grant, and the terminal may identify the number of uplink subframes scheduled by the multi-uplink grant on the basis of the information included in the multi-uplink grant.

l, k, i l may denote an interval between a transmission time of the multi-uplink grant and a transmission time of the first uplink subframe (e.g., the starting uplink subframe) among the plurality of uplink subframes scheduled by the multi-uplink grant. l may be an integer equal to or greater than zero. For example, l may be set to 4.

l may be transmitted to the terminal via an upper layer signaling (e.g., RRC signaling) in step S2900. Alternatively, when the multi-uplink grant type 1 is used, l may be included in the multi-uplink grant. In FIG. 16, l may be included in each of the multi-uplink grants A, B and C, respectively. Alternatively, since the same l is configured for the uplink subframes #4 to #6, l may be included in the multi-uplink grant A for the starting uplink subframe (e.g., the uplink subframe #4) among the plurality of uplink subframes scheduled by the multi-uplink grant. When the multi-uplink grant type 2 is used, l may be included in the common field of the multi-uplink grant. In FIG. 16, l may be included in the common field of the multi-uplink grant for the uplink subframes #4 to #6.

Meanwhile, transmission of the uplink subframes #(n+1) to #(n+1+($N_{SF}$-1))) may be scheduled generally by the multi-uplink grant transmitted through the subframe #n. However, due to a network environment (e.g., a subframe structure, etc.), transmission of the uplink subframe #(n+1) may not be scheduled by the multi-uplink grant transmitted through the subframe #n. For example, the scheduling of the starting uplink subframe by the multi-uplink grant may be delayed by k.

In this case, k may indicate the scheduling delay offset. When the multi-uplink grant is transmitted through the subframe #n, k may indicate an offset between the subframe #(n+1) and the actual starting uplink subframe (e.g., the subframe #(n+1+k)). That is, k may be the scheduling delay offset from the subframe #(n+1). k may be an integer greater than or equal to zero. The maximum value of k may be limited. For example, the maximum value of k may be 8 or 16.

When the multi-uplink grant type 1 is used, k may be included in the multi-uplink grant. In FIG. 16, k may be included in each of the multi-uplink grants A, B and C, respectively. Alternatively, since the same k is set for the uplink subframes #4 to #6, k may be included in the multi-uplink grant A for the starting uplink subframe (e.g., the uplink subframe #4) among the plurality of uplink subframes scheduled by the multi-uplink grant. When the multi-uplink grant type 2 is used, k may be included in the common field of the multi-uplink grant. In FIG. 16, k may be included in the common field of the multi-uplink grant for the uplink subframes #4 to #6.

Meanwhile, a time at which the multi-uplink grant is applied may be dynamically set based on the above-described k.

FIG. 30 is a conceptual diagram illustrating a second embodiment of a subframe scheduled by a multi-uplink grant in an unlicensed band.

Referring to FIG. 30, in an unlicensed band, a radio frame may include 10 subframes. For example, a radio frame may comprise six uplink subframes, three downlink subframes, and one special subframe. The base station may transmit a multi-uplink grant through the subframe #0 to schedule uplink transmissions of the subframes #5 and #6. P (i.e., 1+k) may indicate an interval between a starting uplink subframe among a plurality of uplink subframes scheduled by a multi-uplink grant and a subframe through which the multi-uplink grant is transmitted. P may be variably set. If l is a fixed value, P may be indicated by l and k. For example, when l=4, P may be indicated by l=4 and k=1. Alternatively, if l is a variable value, P may be indicated by l. That is, l may be set to 5.

Meanwhile, i may indicate the index of each of the uplink subframes scheduled by the multi-uplink grant. i may be set to 0, 1, . . . , $N_{SF}$-1. For example, among the uplink subframes scheduled by the multi-uplink grant, i for the first uplink subframe (e.g., the starting uplink subframe) may be set to '0', i for the second uplink subframe may be set to 1', and i for the last uplink subframe may be set to '$N_{SF}$-1'.

When the multi-uplink grant type 1 is used, i may be included in the multi-uplink grant. In FIG. 16, i may be included in each of the multi-uplink grants A, B, and C. For example, the multi-uplink grant A may include i set to '0', the multi-uplink grant B may include i set to '0', and the multi-uplink grant C may include i set to '0'. Alternatively, i may not be included in each of the multi-uplink grants A, B and C. In this case, the terminal may deduce i according to a subframe order.

When the multi-uplink grant type 2 is used, i may be included in an individual field of the multi-uplink grant. In FIG. 16, i may be included in each of the individual fields A, B and C of the multi-uplink grant. For example, the individual field A may include i set to '0', the individual field B may include i set to 1', and the individual field C may include i set to '2'.

Meanwhile, the base station may indicate a subframe number scheduled by the multi-uplink grant (or, the common field, the individual field) using l, k and i, and the terminal may identify the subframe number scheduled by the multi-uplink grant (or, the common field, the individual field) using l, k, and i. In FIG. 16, when the multi-uplink grant type 1 is used, the multi-uplink grant A may include k set to '0' and i set to '0' (or, l set to '4', k set to '0', and i set to '0'), the multi-uplink grant B may include k set to '1' and i set to '0' (or, l set to '4', k set to '1', and i set to '0'), and the multi-uplink grant C may include k set to '2' and i set to '0' (or, l set to '4', k set to '2', and i set to '0'). In this case, based on l, k and i, the terminal may identify that the uplink subframe #4 is scheduled by the multi-uplink grant A, the uplink subframe #5 is scheduled by the multi-uplink grant B, and the uplink subframe #6 is scheduled by the multi-uplink grant C.

In FIG. 16, when the multi-uplink grant type 2 is used, the common field may include k set to '0' (or, l set to '4' and k set to '0'), the individual field A may include i set to '0', the individual field B may include 1 set to '1', and the individual field C may include 1 set to '2'. In this case, based on l, k and i, the terminal may identify that the uplink subframe #4 is scheduled by the common field and the individual field A, the uplink subframe #5 is scheduled by the common field and the individual field B, and the uplink subframe #6 is scheduled by the common filed and the individual field C. Alternatively, each of the individual fields A, B and C may not include i. In this case, the terminal may deduce i according to a subframe order and identify the uplink subframe scheduled by each of the individual fields based on the l, k and deduced i.

That is, when the multi-uplink grant is transmitted through the subframe #n, the subframe #(n+1+k+i) may be scheduled by the multi-uplink grant. If the radio frame includes 10 subframes, the terminal may identify the subframe scheduled by the multi-uplink grant based on 'n+1+k+i mod 10'.

Based on the scheme described above, the base station may inform l, k and i to the terminal, and the terminal may determine a subframe number to be scheduled by the multi-uplink grant based on l, k and i included in the multi-uplink grant.

Length Information

The length of the uplink subframe scheduled by the multi-uplink grant may be variably set. For example, the length of the uplink subframe may be variably set for performing a channel access procedure.

When a plurality of uplink subframes are scheduled by a multi-uplink grant, the length information includes a starting position of a starting uplink subframe and an ending position of an ending uplink subframe among the plurality of uplink subframes, and may include a starting position and an ending position of each of the plurality of uplink subframes.

The length information indicating at least one of the starting position of the starting uplink subframe and the ending position of the ending uplink subframe among the plurality of uplink subframes scheduled by the multi-uplink grant may be referred to as 'length type 1'. The length information indicating at least one of the starting position and the ending position of each of the plurality of uplink subframes scheduled by the multiple uplink grant may be referred to as 'length type 2'.

The starting position of the starting uplink subframe indicated by the length type 1 may be the same as or similar to the starting position shown in FIGS. 18 to 21. The length type 1 indicating the starting position of the starting uplink subframe may be set based on Table 7. The ending position of the ending uplink subframe indicated by the length type 1 may be the same or similar to the ending position shown in FIGS. 22 and 23. The length type 1 indicating the ending position of the ending uplink subframe may be set based on Table 8.

The starting position of the uplink subframe indicated by the length type 2 may be the same as or similar to the starting position shown in FIGS. 18 to 21. The length type 2 indicating the starting position of the uplink subframe may be set based on Table 7. The ending position of the uplink subframe indicated by the length type 2 may be the same or similar to the ending position shown in FIGS. 22 and 23. The length type 2 indicating the ending position of the uplink subframe may be set based on Table 8.

When the multi-uplink grant type 1 and the length type 1 are used, the multi-uplink grant may include the length type 1 for the plurality of uplink subframes scheduled by the multi-uplink grant. In FIG. 16, the length type 1 may be included in each of the multi-uplink grants A, B and C. In this case, the terminal may configure the uplink subframe #4 based on the starting position indicated by the length type 1 included in the multi-uplink grant A, the uplink subframe #5 including 14 SC-FDMA symbols, and the uplink subframe #6 based on the ending position indicated by the length type 1 included in the multi-uplink grant C. Alternatively, the length type 1 may be included only in the multi-uplink grant A. In this case, the terminal may configure the uplink subframe #6 based on the ending position indicated by the length type 1 included in the multi-uplink grant A. Here, when the starting position field of the length type 1 indicates the symbol #0 of the slot #0, the corresponding starting position field may be omitted. When the ending position field of the length type 1 indicates the symbol #6 of the slot #1, the ending position field may be omitted.

When the multi-uplink grant type 1 and the length type 2 are used, the multi-uplink grant may include the length type 2 for the plurality of uplink subframes scheduled by the multi-uplink grant. The length type 2 may be configured for each of the plurality of uplink subframes scheduled by the multi-uplink grant. In FIG. 16, the length type 2 for the uplink subframe #4 may be included in the multi-uplink grant A, the length type 2 for the uplink subframe #5 may be included in the multi-uplink grant B, and the length type 2 for the uplink subframe #6 may be included in the multi-uplink grant C. In this case, the terminal may configure the uplink subframe #4 based on at least one of the starting position and the ending position indicated by the length type 2 included in the multi-uplink grant A, the uplink subframe #5 based on at least one of the starting position and the ending position indicated by the length type 2 included in the multi-uplink grant B, and the uplink subframe #6 based on at least one of the starting position and the ending position indicated by the length type 2 included in the multi-uplink grant C. Here, when the starting position field of the length type 2 indicates the symbol #0 of the slot #0, the corresponding starting position field may be omitted. When the ending position field of the length type 2 indicates the symbol #6 of the slot #1, the ending position field may be omitted.

When the multi-uplink grant type 2 and the length type 1 are used, the common field of the multi-uplink grant may include the length type 1 for the plurality of uplink subframes scheduled by the multi-uplink grant. In FIG. 16, the length type 1 may be included in the common field of the multi-uplink grant scheduling the uplink subframes #4 to #6. In this case, the terminal may configure the uplink subframe #4 based on the starting position indicated by the length type 1 included in the common filed of the multi-uplink grant, the uplink subframe #5 including 14 SC-FDMA symbols, and the uplink subframe #6 based on the ending position indicated by the length type 1 included in the common filed of the multi-uplink grant. Here, when the starting position field of the length type 1 indicates the symbol #0 of the slot #0, the corresponding starting position field may be omitted. When the ending position field of the length type 1 indicates the symbol #6 of the slot #1, the ending position field may be omitted.

When the multi-uplink grant type 2 and the length type 2 are used, at least one of the common field and the individual field of the multi-uplink grant may include the length type 2. In case that the same length type 2 is used for the uplink subframes #4 to #6 (e.g., when the starting positions and ending positions are the same in the uplink subframes #4 to #6), the common field of the multi-uplink grant may include the length type 2. Alternatively, when the starting position fields of the length type 2 are set identically and the ending position fields of the length type 2 are set differently in the uplink subframe #4 to #6, the common field of the multi-uplink grant may include the starting position filed for the uplink subframes #4 to #6, the individual field A of the multi-uplink grant may include the ending position field for the uplink subframe #4, the individual field B of the multi-uplink grant may include the end position field for the uplink subframe #5, and the individual field C of the multi-uplink grant may include the ending position field for the uplink subframe #6.

Alternatively, when the starting position fields of the length type 2 are set differently and the ending position field of the length type 2 is set the same in the uplink subframe #4 to #6, the common field of the multi-uplink grant may include the ending position field for the uplink subframes #4 to #6, the individual field A of the multi-uplink grant may include the starting position field for the uplink subframe #4, the individual field B of the multi-uplink grant may include the starting position field for the uplink subframe #5, and the individual field C of the multi-uplink grant may include the starting position field for the uplink subframe #6. Here, when the starting position field of the length type 2 indicates the symbol #0 of the slot #0, the corresponding starting position field may be omitted. When the ending position field of the length type 2 indicates the symbol #6 of the slot #1, the ending position field may be omitted.

When the multi-uplink grant type 2, the length type 1, and the length type 2 are used, the common field of the multi-uplink grant may include the length type 1 and the individual field of the multi-uplink grant may include the length type 2. In FIG. 16, the common field for the uplink subframes #4 to #6 may include the starting position field of the length type 1, the individual field A of the multi-uplink grant may include the ending position field of the length type 2 for the uplink subframe #4, the individual field B of the multi-uplink grant may include the ending position field of the length type 2 for the uplink subframe #5, and the individual field C of the multi-uplink grant may include the ending position field of the length type 2 for the uplink subframe #6. In this case, the terminal may configure the uplink subframe #4 including a region formed by the starting position indicated by the length type 1 and the ending position indicated by the length type 2 of the individual field A, the uplink subframe #5 including a region formed by the symbol #0 and the slot #0 and the ending position indicated by the length type 2 of the individual field B, and the uplink subframe #6 including a region formed by the symbol #0 of the slot #0 and the ending position indicated by the length type 2 of the individual field C.

Alternatively, the common field for the uplink subframes #4 to #6 may include the ending position field of the length type 1, the individual field A may include the starting position field of the length type 2 for the uplink subframe #4, the individual field B may include the starting position field of the length type 2 for the uplink subframe #5, and the individual field C may include the starting position field of the length type 2 for the uplink subframe #6. In this case, the terminal may configure the uplink subframe #4 including a region formed by the starting position indicated by the length type 2 of the individual field A and the symbol #6 of the slot #1, the uplink subframe #5 including a region formed by the starting position indicated by the length type 2 of the individual field B and the symbol #6 and the slot #1, and the uplink subframe #6 including a region formed by the starting position indicated by the length type 2 of the individual field C and the ending position indicated by the length type 1 of the common field.

Based on the above-described scheme, the base station may inform the terminal of the length information of the uplink subframe scheduled by the multi-uplink grant, and the terminal may identify the length information of the uplink subframe scheduled by the multi-uplink grant based on the information included in the multi-uplink grant.

Channel Access Related Information

The channel access related information may be the same as or similar to the channel access related information described in the communication method based on the single-uplink grant. The channel access related information may include at least one of an access indicator, a channel access procedure type, a contention window size, a backoff counter, an execution time, and a validity period. The parameters included in the channel access related information may be the same as or similar to the parameters described in the communication method based on the single-uplink grant.

Access Indicator

The access indicator may be classified into an 'access indicator type 1' and an 'access indicator type 2'. The access indicator type 1 may indicate whether to perform the channel access procedure in the starting uplink subframe. The access indicator type 2 may indicate whether to perform the channel access procedure in each of the uplink subframes.

In FIG. 16, when the multi-uplink grant type 1 and the access indicator type 1 are used, the access indicator type 1 may be included in each of the multi-uplink grants A, B, and C. Since the same access indicator type 1 is set in the uplink subframes #4 to #6, the access indicator type 1 may be included only in the multi-uplink grant A. In this case, the multi-uplink grant A may include a validity period set to '10'.

Alternatively, when the multi-uplink grant type 1 and the access indicator type 2 are used, the access indicator type 2 for the uplink subframe #4 may be included in multi-uplink grant A, the access indicator type 2 for the uplink subframe #5 may be included in the multi-uplink grant B, and the access indicator type 2 for the uplink subframe #6 may be included in the multi-uplink grant C. When the same access indicator type 2 is set in the uplink subframes #4 to #6, the access indicator type 2 may be included only in the multi-uplink grant A. In this case, the multi-uplink grant A may include a validity period set to '10', and the terminal may determine whether to perform the channel access procedure in the uplink subframes #4 to #6 based on the access indicator type 2 included in the multi-uplink grant A.

In FIG. 16, when the multi-uplink grant type 2 and the access indicator type 1 are used, the access indicator type 1 may be included in the common field of the multi-uplink grant scheduling the uplink subframes #4 to #6. In this case, the common field of the multi-uplink grant may include a validity period set to '10'.

Alternatively, when the multi-uplink grant type 2 and the access indicator type 2 are used, the access indicator type 2 for the uplink subframe #4 may be included in the individual field A, the access indicator type 2 for the uplink subframe #5 may be included in the individual field B, and the access indicator type 2 for the uplink subframe #6 may be included in the individual field C. When the same access indicator type 2 is set in the uplink subframes #4 to #6, the access indicator type 2 may be included in the common field. In this case, the common field of the multi-uplink grant may include a validity period set to '10', Channel Access Procedure Type In FIG. 16, when the multi-uplink grant type 1 is used, the channel access procedure type (e.g., type 1 or type 2) for the uplink subframe #4 may be included in the multi-uplink grant A, the channel access procedure type (e.g., type 1 or type 2) for uplink subframe #5 may be included in the multi-uplink grant B, and the channel access procedure type (e.g., type 1 or type 2) for the plink subframe #6 may be included in the multi-uplink grant C. When the channel access procedure type is set to the same in the uplink subframes #4 to #6, the channel access procedure type (e.g., type 1 or type 2) may be included only in the multi-uplink grant A. In this case, the multi-uplink grant A may include a validity period set to '10', and the terminal may perform the channel access procedure for transmission of the uplink subframes #4 to #6 based on the channel access procedure type (e.g., type 1 or type 2) included in the multi-uplink grant A.

In FIG. 16, when the multi-uplink grant type 2 is used and the channel access procedure type is set to the same in the uplink subframes #4 to #6, the channel access procedure type (e.g., type 1 or type 2) may be included in the common field of the multi-uplink grant that schedules the uplink subframes #4 to #6. In this case, the common field of the multi-uplink grant may include a validity period set to '10'. Alternatively, when the multi uplink grant type 2 is used and the channel access procedure types are set differently in the respective uplink subframes #4 to #6, the channel access procedure type (e.g., type 1 or type 2) for the uplink subframe #4 may be included in the individual field A, the channel access procedure type (e.g., type 1 or type 2) for the uplink subframe #5 may be included in the individual field B, and the channel access procedure type (e.g., type 1 or type 2) for the uplink subframe #6 may be included in the individual field C.

Contention Window Size and Backoff Counter

In FIG. 16, when the multi-uplink grant type 1 is used, the contention window size (or backoff counter) for the uplink subframe #4 may be included in the multi-uplink grant A, the contention window size (or backoff counter) for the uplink subframe #5 may be included in the multi-uplink grant B, and the contention window size (or backoff counter) for the uplink subframe #6 may be included in the multi-uplink grant C. When the contention window sizes (or backoff counters) in the uplink subframes #4 to #6 are set to be the same, the contention window size (or backoff counter) may be included only in the multi-uplink grant A. In this case, the multi-uplink grant A may include a validity period set to '10', and the terminal may perform the channel access procedure for the transmission of the uplink subframes #4 to #6 based on the contention window size (or backoff counter) included in the multi-uplink grant A.

In FIG. 16, when the multi-uplink grant type 2 is used and the contention window sizes (or backoff counters) in the uplink subframes #4 to #6 are set to be the same, the contention window size (or backoff counter) may be included only in the common field of the multi-uplink grant scheduling the uplink subframes #4 to #6. In this case, the common field of the multi-uplink grant may include a validity period set to '10'. Alternatively, when the multi-uplink grant type 2 is used and the contention window sizes (or backoff counters) in the uplink subframes #4 to #6 are set differently, the contention window size (or backoff counter) for the uplink subframe #4 may be included in the individual field A, the contention window size (or backoff counter) for the uplink subframe #5 may be included in the individual field B, and the contention window size (or backoff counter) for the uplink subframe #6 may be included in the individual field C.

Execution Time

The execution time at which the channel access procedure is performed may be set based on Table 10 described above. Also, the channel access related information may further include an execution period, and the execution period may indicate a period during which the channel access procedure is performed.

In FIG. 16, when the multi-uplink grant type 1 is used, the execution time (or the execution period) of the channel access procedure in the uplink subframe #4 may be included in the multi-uplink grant A, the execution time (or execution period) of the channel access procedure in the uplink subframe #5 may be included in the multi-uplink grant B, and the execution time (or execution period) of the channel access procedure in the uplink subframe #6 may be included in the multi-uplink grant C. Alternatively, when the execution time (or execution period) of the channel access procedure is the same in the uplink subframes #4 to #6, the execution time (or execution period) of the channel access procedure may be included only in the multi-uplink grant A. In this case, the terminal may perform the channel access procedure in the uplink subframes #4 to #6 based on the execution time (or execution period) of the channel access procedure included in the multi-uplink grant A.

In FIG. 16, when the multi-uplink grant type 2 is used and the execution time (or execution period) of the channel access procedure in the uplink subframes #4 to #6 are set to be the same, the execution time (or execution period) of the channel access procedure may be included only in the common field of the multi-uplink grant. The common field of the multi-uplink grant may include a validity period set to '10'. Alternatively, when the multi-uplink grant type 2 is used and the execution time (or execution period) of the channel access procedure in the uplink subframes #4 to #6 are set differently, the execution time (or execution period) of the channel access procedure for the uplink subframe #4 may be included in the individual field A, the execution time (or execution period) of the channel access procedure for the uplink subframe #5 may be included in the individual field B, and the execution time (or execution period) of the channel access procedure for the uplink subframe #6 may be included in the individual field C.

Based on the above-described scheme, the base station may inform the terminal about the channel access related information, and the terminal may identify the channel access related information included in the multi-uplink grant.

SRS Index

The SRS index may indicate at least one uplink subframe in which the SRS is transmitted among the plurality of uplink subframes scheduled by the multi-uplink grant. For example, the SRS index may be set based on the first uplink subframe (e.g., the starting uplink subframe) among the plurality of uplink subframes scheduled by the multi-uplink grant. For example, the SRS index for the uplink subframes #4 to #6 shown in FIG. 16 may be set based on Table 12.

TABLE 12

| SRS index | Subframe number |
|---|---|
| 00 | #4 |
| 01 | #5 |
| 10 | #6 |
| 11 | Reserved |

When the SRS index includes '00', '01', and '10', the terminal may transmit SRS through each of the uplink subframes #4 to #6. Alternatively, if the SRS index includes only '01', the terminal may transmit SRS through the uplink subframe #5 and may not transmit SRS through the uplink subframes #4 and #6.

Also, in the multi-uplink grant, the SRS request and the SRS index may be configured as a single field (hereinafter referred to as 'SRS field'). When the SRS transmission is requested in the uplink subframe, the SRS field may be included in the multi-uplink grant. If the SRS transmission is not requested in the uplink subframe, the SRS field may not be included in the multi-uplink grant.

When the multi-uplink grant type 1 is used, the SRS index (or SRS field) may be included in each of the multi-uplink grants A, B and C. For example, when SRS is transmitted in the uplink subframe #4, the SRS index set to '00' may be included in the multi-uplink grant A, and when SRS is not transmitted in the uplink subframe #4, the SRS index may not be included in multi-uplink grant A. When SRS is transmitted in the uplink subframe #5, the SRS index set to '01' may be included in the multi-uplink grant B, and when SRS is not transmitted in the uplink subframe #5, the SRS index may not be included in the multi-uplink grant B. When SRS is transmitted in the uplink subframe #6, the SRS index set to '10' may be included in the multi-uplink grant C, and when SRS is not transmitted in the uplink subframe #6, the SRS index may not be included in the multi-uplink grant C.

When the multi-uplink grant type 2 is used, the SRS index (or SRS field) may be included in the common field of the multi-uplink grant that schedules the uplink subframes #4 to #6. Alternatively, the SRS index (or SRS field) may be included in each of the individual fields of the multi-uplink grant. For example, when SRS is transmitted in the uplink subframe #4, the SRS index set to '00' may be included in the individual field A, and when SRS is not transmitted in the uplink subframe #4, the SRS index may not be included in the individual field A. When SRS is transmitted in the uplink subframe #5, the SRS index set to '01' may be included in the individual field B, and when SRS is not transmitted in the uplink subframe #5, the SRS index may not be included in the individual field B. When SRS is transmitted in the uplink subframe #6, the SRS index set to '10' may be included in the individual field C, and when SRS is not transmitted in the uplink subframe #6, the SRS index may not be included in the individual field C.

Based on the above-described scheme, the base station may inform the terminal of the SRS index, and the terminal may identify the SRS index included in the multi-uplink grant.

Validity Indicator

The multi-uplink grant may further include the validity indicator. The validity indicator may indicate a period during which the multi-uplink grant is applied. For example, when the validity indicator included in the multi-uplink grant transmitted through the subframe #n is set to '00', the multi-uplink grant transmitted through the subframe #n may be effectively used for transmission of the subframe #(n+1).

When the validity indicator included in the multi-uplink grant transmitted through the subframe #n is set to '01', the multi-uplink grant transmitted through the subframe #n may be effectively used for transmission of the subframes #(n+1) and #(n+1+1). In this case, the terminal may transmit the subframe #(n+1+1) based on the multi-uplink grant received through the subframe #n.

When the validity indicator included in the multi-uplink grant transmitted through the subframe #n is set to '10', the multi-uplink grant transmitted through the subframe #n may be effectively used for transmission of the subframes #(n+1) to #(n+1+2). In this case, the terminal may transmit the subframes #(n+1+1) and #(n+1+2) based on the multi-uplink grant received through the subframe #n. When the validity indicator included in the multi-uplink grant transmitted through the subframe #n is set to '11', the multi-uplink grant transmitted through the subframe #n may be effectively used for transmission of the subframes #(n+1) to #(n+1+3). In this case, the terminal may transmit the subframes #(n+1+1) to #(n+1+3) based on the multi-uplink grant received through the subframe #n.

In FIG. 16, when the multi-uplink grant type 1 is used and the same multi-uplink grant is used for the uplink subframes #4 to #6, the validity indicator (e.g., the validity indicator set to '10') may be included in the multi-uplink grant A. When the multi-uplink grant type 2 is used, the common field for the uplink subframes #4 to #6 may include the validity indicator (e.g., the validity indicator set to '10').

Meanwhile, based on the validity indicator, the terminal may deduce the ending time of the uplink subframes included in the unlicensed band frame (e.g., the ending uplink subframe). For example, the terminal may deduce the last uplink subframe indicated by the validity indicator as the ending uplink subframe in the unlicensed band frame. That is, the terminal may deduce that there is no uplink subframe after the last uplink subframe indicated by the validity indicator.

Referring again to FIG. 29, when a DCI (e.g., a common DCI) is generated that includes a multi-uplink grant commonly used by a plurality of terminals (e.g., all terminals that are within the coverage of the base station), the base station may scramble the DCI based on a common RNTI. Here, the common RNTI may be an RNTI commonly used in a cell formed by the base station. Alternatively, when a DCI (e.g., a specific DCI) is generated that includes a multi-uplink grant for each of the terminals, the base station may scramble the DCI based on a cell-RNTI (C-RNTI) (e.g., a UE-specific RNTI). The format of the DCI including the multi-uplink grant may be 0A, 0B, 4A, or 4B.

When the multi-uplink grant type 1 is used, a DCI for each of the plurality of multi-uplink grants may be generated. In FIG. 16, a DCI for the multi-uplink grant A may be generated, a DCI for the multi-uplink grant B may be generated, and a DCI for the multi-uplink grant C may be generated. Each of the DCIs (or the multi-uplink grants A, B, and C) may be generated based on the common RNTI.

When the multi-uplink grant type 2 is used, a single DCI for the common field and the individual fields included in the multi-uplink grant may be generated. In FIG. 16, a single DCI may be generated that includes the common field, the individual field A, the individual field B, and the individual field C.

The base station may transmit the DCI through at least one of PDCCH and EPDCCH (S2930). Here, the DCI scrambled based on the common RNTI may be transmitted via a common search space, and the DCI scrambled based on the C-RNTI may be transmitted via a UE-specific search space. The terminal may receive the DCI by monitoring at least one of the PDCCH and the EPDCCH (e.g., the common search space or the UE-specific search space), and obtain the multi-uplink grant from the received DCI (S2940). Here, the terminal may acquire the DCI (i.e., the multi-uplink grant) by performing descrambling based on the RNTI (e.g., common RNTI, C-RNTI). In FIG. 16, when the multi-uplink grant type 1 is used, the terminal may acquire the multi-uplink grants A, B and C for each of the uplink subframes #4 to #6 using the same RNTI. Alternatively, when the multi-uplink grant type 2 is used, the terminal may acquire the multi-uplink grant for the uplink subframes #4 to #6 (i.e., the common field, and the individual fields A, B, and C).

Meanwhile, the terminal may receive the multi-uplink grant when the receiving function of the multi-uplink grant is activated. In this case, the terminal may not perform a reception operation of a single-uplink grant.

The terminal may perform uplink transmission based on the information included in the multi-uplink grant (S2950). In FIG. 16, the terminal may confirm that the transmission of the uplink subframes #4 to #6 is scheduled by the multi-uplink grant.

The terminal may confirm whether or not a channel access procedure is performed based on the channel access related information or the length information included in the multi-uplink grant. When the channel access procedure is performed before the transmission of the uplink subframes #4 to #6, the terminal may confirm the execution time and the channel access procedure type based on the channel access related information, the length information, and the like.

The terminal may perform the channel access procedure based on the identified channel access procedure type at the execution time of the channel access procedure. For example, the terminal may perform the channel access procedure in the symbol #0 of the slot #0 of the uplink subframe #4 (or the symbol #6 of the slot #1 of the uplink subframe #3), and when a channel status is determined to be in idle state, the terminal may transmit the uplink subframes #4 to #6. That is, the transmission of the uplink subframes #5 and #6 may be performed without additional channel access procedures.

Alternatively, the terminal may perform the channel access procedure in the symbol #0 of the slot #0 of the uplink subframe #4 (or the symbol #6 of the slot #1 of the uplink subframe #3), and when a channel status is determined to be in idle state, the terminal may transmit the uplink subframe #4. The terminal may perform the channel access procedure in the symbol #0 of the slot #0 of the uplink subframe #5 (or the symbol #6 of the slot #1 of the uplink subframe #4), and when a channel status is determined to be in idle state, the terminal may transmit the uplink subframe #5. The terminal may perform the channel access procedure in the symbol #0 of the slot #0 of the uplink subframe #6 (or the symbol #6 of the slot #1 of the uplink subframe #5), and when a channel status is determined to be in idle state, the terminal may transmit the uplink subframe #6. That is, the channel access procedure may be performed in each of the uplink subframes #4 to #6.

When the channel status is determined to be in idle state or the uplink transmission is performed without the channel access procedure, the terminal may configure an uplink subframe. Specifically, the terminal may identify a subframe number used for uplink transmission based on at least one of $N_{SF}$, 1, k, and i included in the multi-uplink grant. In FIG. 16, the terminal may determine the subframes #4 to #6 as the uplink subframes. The terminal may identify the length of the uplink subframe used for the uplink transmission based on the length information included in the multi-uplink grant. For example, the terminal may identify the length of the uplink subframe based on Table 7 and Table 8, and configure the uplink subframe based on the identified length. Also, the terminal may identify a subframe number in which SRS is transmitted based on the SRS index included in the multi-uplink grant. For example, the terminal may identify the subframe number in which SRS is transmitted based on Table 12, and may configure the uplink subframe based on the identified subframe number.

That is, the terminal may perform the channel access procedure based on the information included in the multi-uplink grant, and when the channel status is determined to be in idle state by the channel access procedure, the terminal may transmit the uplink subframe configured based on the information included in the multi-uplink grant to the base station.

The base station may receive the uplink subframe from the terminal. For example, the base station may receive the uplink subframe based on the multi-uplink grant configured in the step S2920. After the uplink transmission is completed, the corresponding channel may be used by another communication node. Alternatively, each of the base station and the terminal may transmit another unlicensed band frame based on a channel access procedure.

Next, SRS configuration and transmission in the unlicensed band will be described.

The SRS may be configured based on a sequence (e.g., $r_{SPS}^{(\tilde{p})}(n)=r_{u,v}^{(\alpha_{\tilde{p}})}(n))$. $r_{SPS}^{(\tilde{p})}(n)=r_{u,v}^{(\alpha_{\tilde{p}})}(n))$ may be defined based on Equations 1 to 4.

$$\alpha_{\tilde{p}} = 2\pi \frac{n_{SRS}^{cs,\tilde{p}}}{8} \quad \text{[Equation 1]}$$

$$n_{SRS}^{cs,\tilde{p}} = \left[n_{SRS}^{cs} + \frac{8\tilde{p}}{N_{ap}}\right] \bmod 8 \quad \text{[Equation 2]}$$

$$\tilde{p} \in \{0, 1, \ldots, N_{ap} + 1\} \quad \text{[Equation 3]}$$

$$n_{SRS}^{cs} = \{0, 1, 2, 3, 4, 5, 6, 7\} \quad \text{[Equation 4]}$$

The sequence $r_{u,v}(n)$ may be defined based on Equation 5.

$$r_{u,v}(n)=x_q(n \bmod N_{ZC}^{RS}) \quad \text{[Equation 5]}$$

In Equation 5, the q-th order Zadoff-Chu (ZC) sequence may be defined based on Equations 6 to 8.

$$x_q(m) = e^{-j\frac{\pi qm(m+1)}{N_{ZC}^{RS}}}, 0 \leq m < N_{ZC}^{RS} - 1 \quad \text{[Equation 6]}$$

$$q = \lfloor \bar{q} + 1/2 \rfloor + v \cdot (-1)^{\lfloor 2\bar{q} \rfloor} \quad \text{[Equation 7]}$$

$$\bar{q} = N_{ZC}^{RS} \cdot (u+1)/31 \quad \text{[Equation 8]}$$

In Equation 4, $n_{SRS}^{cs}$ may be set by an upper layer. For example, $n_{SRS}^{cs}$ may be set based on an RRC configuration. $N_{ap}$ may indicate the number of antenna ports used for the SRS transmission. When an amplitude value according to a transmission power limitation is $\beta_{SRS}$ and an antenna port is p, the SRS transmitted through a resource element corresponding to the k-th subcarrier and the l-th symbol (e.g., the resource element shown in FIG. 9) may be defined according to Equation 9.

$$\alpha_{2k'+k_0^{(p)},l}^{(p)} = \begin{cases} \frac{1}{\sqrt{N_{ap}}} \beta_{SRS} r_{SRS}^{(p)}(k'), & k' = 0, 1, 2, \ldots, M_{sc,b}^{RS} - 1 \\ 0, & \text{otherwise} \end{cases} \quad \text{[Equation 9]}$$

$k_0^{(p)}$ may indicate a starting position of the SRS in frequency domain. In case that '$b=B_{SRS}$', $M_{sc,b}^{RS}$ may indicate the length of the SRS sequence. $M_{sc,b}^{RS}$ may be defined based on Equation 10

$$M_{sc,b}^{RS} = m_{SRS,b} N_{SC}^{RB}/2 \quad \text{[Equation 10]}.$$

Referring to Tables 13 to 16, $m_{SRS,b}$ may be defined based on an uplink system bandwidth $N_{RB}^{UL}$. A bandwidth configuration value of a cell-specific SRS and a bandwidth configuration value of a UE-specific SRS may be set by the upper layer.

The bandwidth configuration value of the cell-specific SRS may be defined as '$C_{SRS} \in \{0,1,2,3,4,5,6,7\}$'. The bandwidth configuration value of the UE-specific SRS may be defined as '$B_{SRS} \in \{0,1,2,3\}$'.

When the uplink system bandwidth is defined as '$6 \leq N_{RB}^{UL} \leq 40$', $m_{SRS,b}$ may be defined based on Table 13.

TABLE 13

| SRS bandwidth configuration | SRS bandwidth $B_{SRS}=0$ | | SRS bandwidth $B_{SRS}=1$ | | SRS bandwidth $B_{SRS}=2$ | | SRS bandwidth $B_{SRS}=3$ | |
| --- | --- | --- | --- | --- | --- | --- | --- | --- |
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

When the uplink system bandwidth is defined as '$40 \leq N_{RB}^{UL} \leq 60$', $m_{SRS,b}$ may be defined based on Table 14.

TABLE 14

| SRS bandwidth configuration | SRS bandwidth $B_{SRS}=0$ | | SRS bandwidth $B_{SRS}=1$ | | SRS bandwidth $B_{SRS}=2$ | | SRS bandwidth $B_{SRS}=3$ | |
| --- | --- | --- | --- | --- | --- | --- | --- | --- |
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

When the uplink system bandwidth is defined as '$60 \leq N_{RB}^{UL} \leq 80$', $m_{SRS,b}$ may be defined based on Table 15.

TABLE 15

| SRS bandwidth configuration | SRS bandwidth $B_{SRS}=0$ | | SRS bandwidth $B_{SRS}=1$ | | SRS bandwidth $B_{SRS}=2$ | | SRS bandwidth $B_{SRS}=3$ | |
| --- | --- | --- | --- | --- | --- | --- | --- | --- |
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

When the uplink system bandwidth is defined as '$80 \leq N_{RB}^{UL} \leq 110$', $m_{SRS,b}$ may be defined based on Table 16.

TABLE 16

| SRS bandwidth configuration | SRS bandwidth $B_{SRS}=0$ | | SRS bandwidth $B_{SRS}=1$ | | SRS bandwidth $B_{SRS}=2$ | | SRS bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

Meanwhile, when the SRS is transmitted through the UpPTS, the SRS may be transmitted considering the resources through which the PRACH is transmitted. When the SRS transmission through the UpPTS is restricted by the upper layer, '$m_{SRS,0}^{max} = m_{c \in C}\{m_{SRS,0}^c\} \leq (N_{RB}^{UL} - 6N_{RA})$' may be defined. $N_{RA}$ may indicate the number of PRACH format 4 configured in the corresponding UpPTS. If there is no constraint by the upper layer, '$m_{SRS,0}^{max} = m_{SRS,0}$' may be defined.

The starting position in frequency domain $k_0^{(p)}$ may be defined based on Equation 11.

$$k_0^{(p)} = \bar{k}_0^{(p)} + \Sigma_{b=0}^{B_{SRS}} 2 M_{SC,b}^{RS} n_b \quad \text{[Equation 11]}$$

$\bar{k}_0^{(p)}$ may be defined in a normal uplink subframe according to Equation 12.

$$\bar{k}_0^p = \left(\left\lfloor \frac{N_{RB}^{UL}}{2} \right\rfloor - \frac{m_{SRS,0}}{2}\right) N_{SC}^{RB} + k_{TC}^{(p)} \quad \text{[Equation 12]}$$

$\bar{k}_0^{(p)}$ may be defined in a special uplink subframe according to Equation 13.

$$\bar{k}_0^{(p)} = \begin{cases} (N_{RB}^{UL} - m_{SRS,0}) N_{SC}^{RB} + k_{TC}^{(p)}, & \text{if} \\ \quad ((n_f \bmod 2) \cdot (2 - N_{SP}) + n_{hf}) \bmod 2 = 0 \\ k_{TC}^{(p)}, & \text{otherwise} \end{cases} \quad \text{[Equation 13]}$$

$k_{TC}^{(p)}$ may be defined based on Equation 14. $\bar{k}_{TC}$ may be set to 0 or 1 by the upper layer.

$$k_{TC}^{(p)} = \begin{cases} 1 - \bar{k}_{TC}, & \text{if } n_{SRS}^{cs} \in \{4,5,6,7\} \text{ and} \\ & \tilde{p} \in \{1,3\} \text{ and } Nap = 4 \\ \bar{k}_{TC}, & \text{otherwise} \end{cases} \quad \text{[Equation 114]}$$

In case that the UpPTS is located in the subframes #0 to #4, $n_{hf}$ may be located in the subframes #0 and #5 to #9. In this case, $n_{hf}$ may be 1.

The frequency hopping of the SRS may be configured based on an environment variable (e.g., '$b_{hop} \in \{0,1,2,3\}$') set by the upper layer. A periodic transmission of the SRS may support the frequency hopping. On the other hand, aperiodic transmission of the SRS may not support the frequency hopping. In case that the frequency hopping is not performed, $n_b$ in Equation 11 may be defined based on Equation 15.

$$n_b = \lfloor 4n_{RRC}/m_{SRS,b} \rfloor \bmod N_b \quad \text{[Equation 15]}$$

In case that the frequency hopping is performed, $n_b$ in Equation 11 may be defined based on Equation 16.

$$n_b = \begin{cases} \lfloor 4n_{RRC}/m_{SRS,b} \rfloor \bmod N_b, & b \leq b_{hop} \\ F_b(n_{SRS}) + \lfloor 4n_{RRC}/m_{SRS,b} \rfloor \bmod N_b, & \text{otherwise} \end{cases} \quad \text{[Equation 16]}$$

$F_b$ in Equation 16 may be defined based on Equation 17.

$$f_b(n_{SRS}) = \begin{cases} (N_b/2)\left\lfloor \frac{n_{SRS} \bmod \Pi_{b'=b_{hop}}^{b} N_{b'}}{\Pi_{b'=b_{hop}}^{b-1} N_{b'}} \right\rfloor + \left\lfloor \frac{n_{SRS} \bmod \Pi_{b'=b_{hop}}^{b} N_{b'}}{2 \Pi_{b'=b_{hop}}^{b-1} N_{b'}} \right\rfloor & \text{if } N_b \text{ even} \\ \lfloor N_b/2 \rfloor \lfloor n_{SRS}/\Pi_{b'=b_{hop}}^{b-1} N_{b'} \rfloor & \text{if } N_b \text{ odd} \end{cases} \quad \text{[Equation 17]}$$

$N_{b_{hop}}$ may be 1. $n_{SRS}$ may be defined based on Equation 18.

$$n_{SRS} = \begin{cases} 2N_{SP} n_f + 2(N_{SP}-1)\left\lfloor \frac{n_s}{10} \right\rfloor + \left\lfloor \frac{T_{offset}}{T_{offset\_max}} \right\rfloor, & \text{for 2 msSRS periodicity of frame structure type 2} \\ \lfloor (n_f \times 10 + \lfloor n_s/2 \rfloor)/T_{SRS} \rfloor, & \text{otherwise} \end{cases} \quad \text{[Equation 18]}$$

The $T_{SRS}$ may indicate a transmission cycle of the UE-specific SRS. A UE-specific SRS subframe may be a subframe in which the UE-specific SRS is transmitted, and a cell-specific SRS subframe may be a subframe in which the cell-specific SRS is transmitted. The $T_{offset}$ may be an offset of the UE-specific SRS subframe. The configuration cycle ($T_{SFC}$) and the offset ($\Delta_{SFC}$) of the cell-specific SRS subframe may be defined according to a value of 'srs-SubframeConfig (SRS subframe configuration)' set by the upper layer. For example, the configuration cycle ($T_{SFC}$) and offset ($\Delta_{SFC}$) of the cell-specific SRS subframe may be defined based on Tables 15 and 16. The SRS subframe (e.g., the subframe in which the SRS is transmitted) may be indicated by Equation 19. $n_s$ may indicate a slot number.

$$\lfloor n_s/2 \rfloor \bmod T_{SFC} \in \Delta_{SFC} \quad \text{[Equation 19]}$$

Each of the base station and the terminal may determine whether an SRS transmission period exists in a subframe based on the SRS subframe configuration and configure an uplink channel (e.g., PUSCH, PUCCH, etc.) based on the determination result. Also, the terminal may transmit the SRS through the SRS subframe, and the base station may receive the SRS through the SRS subframe.

Table 17 may indicate the configuration cycle and the transmission offset of the cell-specific SRS subframe when a Type 1 frame is used.

TABLE 17

| SRS subframe configuration | Binary | Configuration cycle $T_{SFC}$ (subframes) | Transmission offset $\Delta_{SFC}$ (subframes) |
| --- | --- | --- | --- |
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | Reserved | Reserved |

Table 18 may indicate the configuration cycle and the transmission offset of the cell-specific SRS subframe when a Type 2 frame is used.

TABLE 18

| SRS subframe configuration | Binary | Configuration cycle $T_{SFC}$ (subframes) | Transmission offset $\Delta_{SFC}$ (subframes) |
| --- | --- | --- | --- |
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | Reserved | Reserved |
| 15 | 1111 | Reserved | Reserved |

When the SRS transmission is triggered by the base station, the terminal may transmit the SRS through the SRS subframe described above. A "trigger type" for the SRS transmission may be classified into a 'trigger type 0' and a 'trigger type 1'. When the trigger type 0 is used, the terminal may perform the SRS transmission according to a configuration of the upper layer. When the trigger type 1 is used, the terminal may perform the SRS transmission according to a DCI.

When an FDD communication network supporting the trigger Type 0 is used (or, in case that $T_{SRS}>2$ in a TDD communication network), the terminal may perform the SRS transmission based on Equation 20. The use of the FDD communication network or TDD communication network may be indicated by an SRS configuration index ($I_{SRS}$) set by the upper layer. The FDD communication network may be a communication network using the type 1 frame, and the TDD communication network may be a communication network using the type 2 frame.

$$(10 \cdot n_f + k_{SRS} - T_{offset}) \bmod T_{SRS} = 0 \quad \text{[Equation 20]}$$

The $n_f$ may indicate a system frame (e.g., a radio frame) number. When the FDD communication network is used, $k_{SRS}$ may indicate a subframe number (e.g., subframes #0 to #9). When the TDD communication network is used, $k_{SRS}$ may be defined based on Table 21.

In case that $T_{SRS,1}=2$ in the TDD communication network, the terminal may perform the SRS transmission based on Equation 21.

$$(k_{SRS} - T_{offset}) \bmod 5 = 0 \quad \text{[Equation 21]}$$

Table 19 may indicate SRS configuration indexes, SRS periodicities, and SRS subframe offsets in the FDD communication network that supports the trigger type 0.

TABLE 19

| SRS configuration index $I_{SRS}$ | SRS periodicity $T_{SRS}$ (ms) | SRS subframe offset $T_{offset}$ |
| --- | --- | --- |
| 0-1 | 2 | $I_{SRS}$ |
| 2-16 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | Reserved | Reserved |

Table 20 may indicate SRS configuration indexes, SRS periodicities, and SRS subframe offsets in the TDD communication network that supports the trigger type 0.

TABLE 20

| SRS configuration index $I_{SRS}$ | SRS periodicity $T_{SRS}$ (ms) | SRS subframe offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ − 10 |
| 15-24 | 10 | $I_{SRS}$ − 15 |
| 25-44 | 20 | $I_{SRS}$ − 25 |
| 45-84 | 40 | $I_{SRS}$ − 45 |
| 85-164 | 80 | $I_{SRS}$ − 85 |
| 165-324 | 160 | $I_{SRS}$ − 165 |
| 325-644 | 320 | $I_{SRS}$ − 325 |
| 645-1023 | Reserved | Reserved |

Table 21 may indicate $k_{SRS}$ according to the length of UpPTS in the TDD communication network.

TABLE 21

| | Subframe number | | | | | | | | | |
|---|---|---|---|---|---|---|---|---|---|---|
| | | 1 | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in UpPTS including 2 symbols | | 0 | 1 | 2 | 3 | 4 | | 5 | 6 | 7 | 8 | 9 |
| $k_{SRS}$ in UpPTS including 1 symbol | | 1 | | 2 | 3 | 4 | | 6 | | 7 | 8 | 9 |

When the FDD communication network is used, the SRS periodicity and SRS subframe offset according to the SRS Configuration Index ($I_{SRS}$) in the trigger type 1 in which the SRS transmission is triggered by a DCI (e.g., common DCI) may be defined based on Table 22.

TABLE 22

| SRS configuration index $I_{SRS}$ | SRS periodicity $T_{SRS}$ (ms) | SRS subframe offset $T_{offset, 1}$ |
|---|---|---|
| 0-1 | 2 | $I_{SRS}$ |
| 2-6 | 5 | $I_{SRS}$ − 2 |
| 7-16 | 10 | $I_{SRS}$ − 7 |
| 17-31 | Reserved | Reserved |

When the TDD communication network is used, the SRS periodicity and SRS subframe offset according to the SRS Configuration Index ($I_{SRS}$) in the trigger type 1 in which the SRS transmission is triggered by a DCI (e.g., common DCI) may be defined based on Table 23.

TABLE 23

| SRS configuration index $I_{SRS}$ | SRS periodicity $T_{SRS}$ (ms) | SRS subframe offset $T_{offset, 1}$ |
|---|---|---|
| 0 | Reserved | Reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ − 10 |
| 15-24 | 10 | $I_{SRS}$ − 15 |
| 25-31 | Reserved | Reserved |

In the FDD communication network supporting the trigger type 1 and the TDD communication network in which $T_{SRS,1} > 2$, the terminal may transmit SRS via a subframe based on Equation 22.

$$(10 \cdot n_f + k_{SRS} - T_{offset,1}) \bmod T_{SRS,1} = 0 \quad \text{[Equation 22]}$$

When an SRS request (e.g., a DCI including an SRS request) is received via the subframe #n, the terminal may transmit SRS from the subframe #(n+k). Here, k may be an integer of 4 or more. In the TDD communication network in which $T_{SRS,1} = 2$, the terminal may transmit SRS via a subframe based on Equation 23.

$$(k_{SRS} - T_{offset,1}) \bmod 5 = 0 \quad \text{[Equation 23]}$$

Meanwhile, in the licensed band, the base station may inform the terminal of SRS-related information (e.g., SRS transmission cycle, transmission positions, etc.). The terminal may receive the SRS-related information from the base station and may transmit SRS in positions indicated by the SRS-related information (e.g., a symbol in a subframe or a subframe). That is, the SRS transmission in the licensed band may be performed based on a preset cycle.

On the other hand, since the unlicensed band is shared by a plurality of communication systems, periodic transmission of SRS may not be guaranteed. For example, if a subframe allocated for SRS transmission in the unlicensed band is occupied by another communication node, the SRS may not be transmitted based on the preset cycle. Also, the SRS transmission may be delayed in accordance with the execution of the channel access procedure in the unlicensed band, in which case the SRS may not be transmitted based on the preset cycle. Then, SRS transmission methods in the unlicensed band will be described.

FIG. 31 is a sequence chart illustrating a first embodiment of a SRS transmission method in an unlicensed band.

Referring to FIG. 31, a base station may be the base station shown in FIGS. 1 to 4, and the terminal may be connected to the base station. Each of the base station and the terminal may support cellular communications (e.g., LTE, LTE-A, LAA, eLAA, etc. defined in the 3GPP standard) and operate in the unlicensed band and the licensed band. Also, each of the base station and the terminal may be the same as or similar to the communication node 500 shown in FIG. 5.

The base station may transmit the SRS-related information to the terminal (S3100). The SRS related information may include the SRS configuration index (or the SRS subframe configuration index), and the SRS configuration index (or the SRS subframe configuration index) may indicate the SRS periodicity and the SRS subframe offset. For example, the SRS transmission based on the SRS configuration index may be performed based on Equation 19. Also, when the trigger type 0 is used in the unlicensed band, the SRS transmission based on the SRS configuration index may be performed based on Equation 20 and Equation 21. When the trigger type 1 is used in the unlicensed band, the SRS transmission based on the SRS configuration index may be performed based on Equations 19, 22 and 23.

The SRS-related information may be transmitted to the terminal through RRC signaling. In this case, the base station may transmit a DCI (e.g., a DCI including an SRS request) for triggering the SRS transmission to the terminal. Here, the DCI may further include configuration information of the subframe in the unlicensed band. The configuration information of the subframe in the unlicensed band may be the length information of Table 4, the length information of Table 6 (e.g., the starting position shown in Table 7, the ending position shown in Table 8), and the like.

Alternatively, the SRS-related information may be transmitted to the terminal via a DCI. Here, the DCI may be a common DCI or a specific DCI for an uplink grant, and the uplink grant may schedule the allocated subframe for SRS transmission. That is, when the subframe indicated by the SRS-related information is scheduled by the uplink grant, the SRS transmission may be performed in the corresponding subframe. On the other hand, when the subframe indicated by the SRS-related information is not scheduled by the uplink grant, the SRS transmission may not be performed in the corresponding subframe. Here, the common DCI may include SRS-related information used in common by a plurality of terminals (e.g., all terminals belonging to a cell formed by the base station). The specific DCI may include SRS-related information used independently by each of the terminals.

Meanwhile, the SRS subframe in the unlicensed band may be set dynamically, and the SRS-related information may further include a slot number used for acquiring the SRS subframe offset to support the dynamic setting of the SRS subframe. Here, the slot number may be $n_s$ in Equation 19. Alternatively, the slot number may be $\lfloor n_s/2 \rfloor$ in Equation 19. Also, the SRS-related information may further include the subframe number in which the SRS is transmitted. Here, the subframe number may be $k_{SRS}$ in Equations 20 to 23.

The terminal may receive the SRS-related information from the base station, and identify transmission positions of the SRS based on the SRS-related information (or the SRS-related information and the DCI) (S3110). For example, if it is determined that a subframe (e.g., a downlink transmission period) includes 12 symbols based on the configuration information of the subframe included in the SRS-related information (or the DCI), the terminal may determine that the SRS is transmitted in a period corresponding to one symbol in the corresponding subframe (e.g., an uplink transmission period). Alternatively, if it is determined that a subframe (e.g., a downlink transmission period) includes 11 symbols based on the configuration information of the subframe included in the SRS-related information (or the DCI), the terminal may determine that the SRS is transmitted in a period corresponding to two symbols (e.g., an uplink transmission period). That is, the terminal may derive the length of the SRS transmission period in the special subframe of the unlicensed band based on the configuration information of the subframe included in the SRS-related information (or the DCI), and use the $k_{SRS}$ in Table 21 in order to transmit the SRS.

Alternatively, the terminal may identify the subframe numbers of subframes scheduled by the multi-uplink grant based on the information included in the multi-uplink grant (e.g., l, k, i in Table 11), and identify the subframe in which the SRS is transmitted based on the identified subframe numbers and the SRS index included in the multi-uplink grant. Alternatively, when the base station transmits an indicator indicating the first subframe among the plurality of subframes scheduled by the multi-uplink grant to the terminal through RRC signaling or DCI, the terminal may identify the subframe numbers of subframes scheduled by the multi-uplink grant based on the indicator and the information included in the multi-uplink grant (e.g., l, k, i in Table 11), and identify the subframe in which the SRS is transmitted based on the identified subframe numbers and the SRS index included in the multi-uplink grant. Here, the length of the indicator may be one bit. The indicator set to '0' may indicate that the corresponding subframe is a starting subframe, and the indicator set to '1' may indicate that the corresponding subframe is not a starting subframe.

Alternatively, when the SRS is transmitted in the special subframe of the unlicensed band, the terminal may identify the position of the special subframe (i.e., the transmission position of the SRS) based on the SRS-related information (or the SRS-related information and the DCI). For example, the terminal may identify the position of the special subframe based on the length information in Table 4 included in the SRS-related information. If the length information indicates that the length of the next subframe is less than the length of 14 symbols, the terminal may determine that the next subframe is a special subframe. If the length information indicates that the length of the current subframe is less than the length of 14 symbols, the terminal may determine that the current subframe is a special subframe.

Alternatively, the SRS-related information may further include an indicator indicating whether the corresponding subframe is a special subframe including a downlink transmission period and an uplink transmission period. In this case, the terminal may identify the special subframe based on the indicator included in the SRS-related information.

Alternatively, the terminal may confirm the position of the special subframe based on the uplink grant. For example, when the single uplink grant received through the subframe #n schedules the subframe #(n+1), the terminal may determine the subframe #(n+1-1) as a special subframe. When the multi-uplink grant received through the subframe #n schedules the subframes #(n+1) to #(n+l+($N_{SF}$−1)), the terminal may determine the subframe #(n+1−1) as a special subframe.

The terminal may transmit the SRS in the subframe (e.g., the special subframe or the uplink subframe) identified by the SRS-related information (or the SRS-related information and the DCI) (S3120). For example, the terminal may transmit the SRS in the subframe based on a RRC configuration. In this case, the terminal may transmit the SRS after performing the channel access procedure in a guard period, an uplink transmission period, or an uplink subframe. Meanwhile, the SRS transmission in the special subframe of the unlicensed band may be performed irrespective of the uplink grant, and a channel access procedure may be performed before the SRS transmission.

Meanwhile, in order to improve a SRS transmission possibility in the unlicensed band, a terminal that is not scheduled to transmit PUSCH may also transmit SRS. In order to prevent redundant executions of a channel access procedure for PUSCH transmission and a channel access procedure for SRS transmission, the transmission position of SRS in the unlicensed band can be changed. For example, the SRS may be transmitted in the last symbol of the subframe (e.g., the symbol #6 of the slot #1) or the first symbol (e.g., the symbol #0 of the slot #0). Alternatively, when a period during which the channel access procedure is performed exists in a subframe, the transmission position of SRS may be changed. For example, when a channel access procedure is performed in the first symbol of the subframe (e.g., the symbol #0 of the slot #0), the SRS may be transmitted in the second symbol (e.g., the symbol #1 of the slot #0) of the corresponding subframe. When a channel access procedure is performed in the first symbol (e.g., the symbol #0 of the slot #0) and the second symbol (e.g., the symbol #1 of the slot #0) of the subframe, the SRS may be transmitted in the third symbol (e.g., the symbol #2 in the slot #0) of the corresponding subframe.

On the other hand, the base station may dynamically configure the SRS subframe independently of Equation 19 (or Equations 20 to 23). For example, the base station may inform the terminal of an indicator indicating whether the SRS is configured in the subframe #(n+1) through the subframe #n. Here, the indicator may be transmitted to the terminal via a common DCI or a specific DCI. The length of the indicator may be one bit. For example, the indicator set to '0' may indicate that the SRS is configured in the corresponding subframe, and the indicator set to '1' may indicate that the SRS is not configured in the corresponding subframe. The terminal may receive the common DCI (or the specific DCI) through the subframe #n, and the SRS transmission in the subframe #(n+1) is requested based on the indicator included in the common DCI (or the specific DCI). In this case, the terminal may transmit the SRS in the subframe #(n+1) based on an RRC configuration.

Then, a method for improving efficiency in transmission of unlicensed band frames will be described.

FIG. 32 is a conceptual chart illustrating a second embodiment of an unlicensed band frame.

Referring to FIG. 32, unlicensed band frames may be transmitted consecutively. For example, after transmission of an unlicensed band frame #0, the communication node (e.g., the base station or the terminal) may perform a channel access procedure, and when a result of the channel access procedure is determined to be an idle state, the communication node may transmit an unlicensed band frame #1.

Meanwhile, when the transmission of the unlicensed band frame #0 ends at a boundary of a subframe, the channel connection procedure may be performed for the transmission of the unlicensed band frame #1. Therefore, the transmission of the unlicensed band frame #1 may not start at the boundary of the subframe. For example, the communication node may perform the channel access procedure in the symbol #0 of the slot #0 of the subframe #4 after the transmission of the unlicensed band frame #0, and when the result of the channel access procedure is determined to be the idle state, the communication node may occupy the channel until the symbol #6 of the slot #0 of the subframe #4 and transmit the unlicensed band frame #1 in the symbol #0 of the slot #1 of the subframe #4. Alternatively, the communication node may perform the channel access procedure in the symbols #5 and #6 (or the symbol #6) of the slot #0 of the subframe #4 after the transmission of the unlicensed band frame #0, and when the result of the channel access procedure is determined to be the idle state, the communication node may transmit the unlicensed band frame #1 in the symbol #0 of the slot #1 of the subframe #4.

In this case, since the slot #0 (e.g., 7 symbols) in the subframe #4 is not used for data transmission, the efficiency of channel may deteriorate. In order to resolve this problem, the communication node may operate as follows.

The base station may schedule transmission of the subframes #2 and #3 based on the uplink grant. In this case, the base station may not allocate PUSCH and PUCCH for SRS transmission to the last symbol (e.g., the symbol #6 of the slot #1) of the ending subframe (e.g., the subframe #3) of the unlicensed band frame #0. The terminal may determine that the subframe #3 is the ending subframe of the unlicensed band frame #0 based on the information (e.g., $N_{SF}$) included in the uplink grant (or DCI) received from the base station, and may not transmit the SRS in the symbol #6 of the slot #1 of the subframe #3.

Since a signal (e.g., the SRS) is not transmitted in the symbol #6 of the slot #1 of the subframe #3, the communication node (e.g., the base station or the terminal) may perform the channel access procedure in the symbol #6 of the slot #1 of the subframe #3. When a result of the channel access procedure is determined to be idle state, the communication node may transmit the unlicensed band frame #1 from the boundary of subframe #4 (e.g., the symbol #0 in the slot #0).

Meanwhile, considering the characteristics of the unlicensed band shared by communication systems, a method for increasing a SRS transmission opportunity is needed. For example, SRS may be transmitted at a symbol #0 in a slot #0 of a subframe after the unlicensed band frame.

Referring to FIG. 32, the unlicensed band frame #0 may include four subframes. When the length of the unlicensed band frame #0 is smaller than a predetermined maximum length (e.g., 5 ms), the terminal (e.g., the terminal receiving the uplink grant for the subframes #2 and #3) may transmit a signal (e.g., SRS) in the subframe (e.g., the subframe #4) after the ending subframe (e.g., the subframe #3) of the unlicensed band frame #0. Here, the terminal may deduce the ending subframe of the unlicensed band frame #0 based on the uplink grant (or DCI) received from the base station.

The terminal may transmit the SRS in the first symbol (e.g., the symbol #0 of the slot #0) instead of the last symbol of the subframe #4 (e.g., the symbol #6 of the slot #1). Here, the SRS transmitted through the first symbol of the subframe #4 may be the SRS scheduled to be transmitted in the subframe #4 by the SRS configuration index (e.g., the SRS periodicity and the SRS subframe offset).

Also, the uplink grant may include an indicator indicating that the SRS is transmitted in the first symbol of a subframe (e.g., the subframe #4) after the ending subframe (e.g., the subframe #3) of the unlicensed band frame #0. In this case, the terminal may transmit the SRS in the first symbol of the subframe #4 based on the indicator included in the uplink grant.

The embodiments of the present disclosure may be implemented as program instructions executable by a variety of computers and recorded on a computer readable medium.

The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal in a communication network, the operation method comprising:
   detecting a control channel of a subframe #n transmitted from a base station;
   obtaining a downlink control information (DCI) for an uplink grant from the control channel;
   performing channel sensing based on channel access related information included in the DCI; and
   transmitting an uplink channel in a subframe #(n+I) to the base station when a result of the channel sensing is an idle state,
   wherein the subframe #(n+I) is an unlicensed band subframe, n is an integer equal to or greater than 0, and I is an integer equal to or greater than 0,
   wherein the channel access related information includes information indicating a channel access type 2 among a channel access type 1 and the channel access type 2, wherein the channel access type 1 indicates that the channel sensing is performed during a period corresponding to a backoff counter selected within a contention window, and the channel access type 2 indicates that the channel sensing is performed during a preconfigured period without a random backoff operation.

2. The operation method according to claim 1, wherein the preconfigured period is 25 µs or 25 µs+timing advance (TA).

3. The operation method according to claim 1, wherein a size of the contention window is configured based on a channel access priority.

4. The operation method according to claim 1, wherein the DCI further includes a new data indicator (NDI), and a size of the contention window is configured based on the NDI.

5. The operation method according to claim 1, wherein the DCI further includes a starting position of a physical uplink shared channel (PUSCH) included in a subframe scheduled by the DCI.

6. The operation method according to claim 5, wherein the starting position is a first symbol of a first slot of the subframe scheduled by the DCI, a time point after 25 µs from a starting position of the first symbol, a time point after 25 µs+timing advance (TA) from the starting position of the first symbol, or a second symbol of the first slot.

7. The operation method according to claim 1, wherein the DCI further includes an ending position of a physical uplink shared channel (PUSCH) included in a subframe scheduled by the DCI.

8. The operation method according to claim 7, wherein the ending position is a last symbol of a second slot of a subframe scheduled by the DCI or a symbol which is prior to the last symbol in the second slot.

9. An operation method of a base station in a communication network, the operation method comprising:
   generating a downlink control information (DCI) including a channel access related information;
   transmitting the DCI to a terminal via a subframe #n; and
   receiving an uplink channel in a subframe #(n+I) scheduled by the DCI from the terminal,
   wherein the subframe #(n+I) is received from the terminal when a result of a channel sensing based on the channel access related information is determined to be an idle state, n is an integer equal to or greater than 0, and I is an integer equal to or greater than 0,
   wherein the channel access related information includes information indicating a channel access type 2 among a channel access type 1 and the channel access type 2, wherein the channel access type 1 indicates that the channel sensing is performed during a period corresponding to a backoff counter selected within a contention window, and the channel access type 2 indicates that the channel sensing is performed during a preconfigured period without a random backoff operation.

10. The operation method according to claim 9, wherein the preconfigured period is 25 µs or 25 µs+timing advance (TA).

11. The operation method according to claim 9, wherein the DCI further includes a starting position of a physical uplink shared channel (PUSCH) included in a subframe scheduled by the DCI.

12. The operation method according to claim 11, wherein the starting position is a first symbol of a first slot of the subframe scheduled by the DCI, a time point after 25 µs from a starting position of the first symbol, a time point after 25 µs+timing advance (TA) from the starting position of the first symbol, or a second symbol of the first slot.

13. The operation method according to claim 9, wherein the DCI further includes an ending position of a physical uplink shared channel (PUSCH) included in a subframe scheduled by the DCI.

14. The operation method according to claim 13, wherein the ending position is a last symbol of a second slot of a subframe scheduled by the DCI or a symbol which is prior to the last symbol in the second slot.

15. A terminal in a communication network, the terminal comprising a processor and a memory storing at least one instruction executed by the processor, wherein the at least one instruction is configured to:
   detect a control channel of a subframe #n transmitted from a base station;
   obtain a downlink control information (DCI) for an uplink grant from the control channel;
   perform channel sensing based on channel access related information included in the DCI; and
   transmit an uplink channel in a subframe #(n+I) to the base station when a result of the channel sensing is determined to be an idle state,
   wherein the subframe #(n+I) is an unlicensed band subframe, n is an integer equal to or greater than 0, and I is an integer equal to or greater than 0, wherein the channel access related information includes information indicating a channel access type 2 among a channel access type 1 and the channel access type 2, wherein the channel access type 1 indicates that the channel sensing is performed during a period corresponding to a backoff counter selected within a contention window, and the channel access type 2 indicates that the channel sensing is performed during a preconfigured period without a random backoff operation.

16. The terminal according to claim 15, wherein the DCI further includes a starting position of a physical uplink shared channel (PUSCH) included in a subframe scheduled by the DCI.

17. The terminal according to claim 15, wherein the DCI further includes an ending position of a physical uplink shared channel (PUSCH) included in a subframe scheduled by the DCI.

18. An operation method of a terminal in a communication network, the operation method comprising:
receiving, from a base station, information indicating a channel access type 2 among a channel sensing type 1 and the channel sensing type 2 which is used for transmitting an uplink channel;
performing a channel sensing operation according to the channel sensing type 2 indicated by the information in an unlicensed band; and
transmitting, to the base station, the uplink channel in the unlicensed band when a result of the channel sensing operation is an idle state,
wherein the channel sensing operation is performed based on a random backoff operation when the information indicates the channel sensing type 1, and the channel sensing operation is performed without the random backoff operation when the information indicates the channel sensing type 2.

19. The operation method according to claim 18, wherein the information is included in a radio resource control (RRC) message or downlink control information (DCI).

20. The operation method according to claim 18, wherein the channel sensing operation is performed in duration corresponding to a backoff counter selected within a contention window when the information indicates the channel sensing type 1, and the channel sensing operation is performed in preconfigured duration without the random backoff operation when the information indicates the channel sensing type 2.

* * * * *